(12) United States Patent
Igaki et al.

(10) Patent No.: US 9,080,758 B2
(45) Date of Patent: Jul. 14, 2015

(54) LED LAMP

(75) Inventors: Masaru Igaki, Kyoto (JP); Masahide Tanaka, Toyonaka (JP)

(73) Assignee: ROHM CO., LTD., Kyoto (JP)

(*) Notice: Subject to any disclaimer, the term of this patent is extended or adjusted under 35 U.S.C. 154(b) by 461 days.

(21) Appl. No.: 13/448,989

(22) Filed: Apr. 17, 2012

(65) Prior Publication Data

US 2012/0306377 A1 Dec. 6, 2012

(30) Foreign Application Priority Data

| Apr. 22, 2011 | (JP) | 2011-096345 |
| Apr. 27, 2011 | (JP) | 2011-099779 |
| Jun. 14, 2011 | (JP) | 2011-132339 |
| Jun. 29, 2011 | (JP) | 2011-144585 |
| Jun. 29, 2011 | (JP) | 2011-144714 |
| Apr. 6, 2012 | (JP) | 2012-087644 |

(51) Int. Cl.

| H05B 37/02 | (2006.01) |
| F21V 23/04 | (2006.01) |
| F21K 99/00 | (2010.01) |
| H05B 33/08 | (2006.01) |
| F21S 8/02 | (2006.01) |
| F21S 8/04 | (2006.01) |
| F21Y 101/02 | (2006.01) |
| F21Y 103/00 | (2006.01) |
| F21Y 103/02 | (2006.01) |

(52) U.S. Cl.
CPC .............. *F21V 23/0464* (2013.01); *F21K 9/175* (2013.01); *F21V 23/0471* (2013.01); *H05B 33/0803* (2013.01); *H05B 37/0218* (2013.01); *H05B 37/0227* (2013.01); *F21S 8/026* (2013.01); *F21S 8/04* (2013.01); *F21Y 2101/02* (2013.01); *F21Y 2103/003* (2013.01); *F21Y 2103/02* (2013.01); *Y02B 20/383* (2013.01); *Y02B 20/46* (2013.01)

(58) Field of Classification Search
USPC .......................................... 315/134, 149–159
See application file for complete search history.

(56) References Cited

U.S. PATENT DOCUMENTS

| 8,207,676 B2 * | 6/2012 | Hilgers | 315/152 |
| 8,531,386 B1 * | 9/2013 | Kerr et al. | 345/102 |
| 2010/0045191 A1 * | 2/2010 | Aendekerk | 315/152 |
| 2010/0308737 A1 | 12/2010 | Hilgers | |
| 2010/0327757 A1 * | 12/2010 | Chung et al. | 315/158 |
| 2011/0175536 A1 | 7/2011 | Fujita et al. | |

FOREIGN PATENT DOCUMENTS

| CN | 201373265 Y | 12/2009 |
| CN | 101802571 A | 8/2010 |
| WO | WO2010/018682 | 2/2010 |

OTHER PUBLICATIONS

Chinese Office Action, Mar. 20, 2015; Chinese Application No. 201210120654.9 (7 pages).

\* cited by examiner

*Primary Examiner* — Douglas W Owens
*Assistant Examiner* — James H Cho
(74) *Attorney, Agent, or Firm* — Hamre, Schumann, Mueller & Larson, P.C.

(57) ABSTRACT

An LED lamp (1) is employed in a state mounted on a lighting fixture. The LED lamp (1) includes an LED source portion (2) including a plurality of LED chips, an illuminance sensor module (12) detecting ambient illuminance, and a controller controlling the LED source portion (2) in response to illuminance of ambient light other than light emitted by the LED source portion (2) on the basis of an output signal received from the illuminance sensor module (12) when the LED source portion (2) is in a lighting-up state. When the LED source portion (2) is in the lighting-up state, there is a possibility that the illuminance sensor module (12) detects not only the ambient light illuminance but also spontaneous light illuminance. The controller eliminates influence by the spontaneous light illuminance, and controls the LED source portion (2) in response to the illuminance of the ambient light.

19 Claims, 55 Drawing Sheets

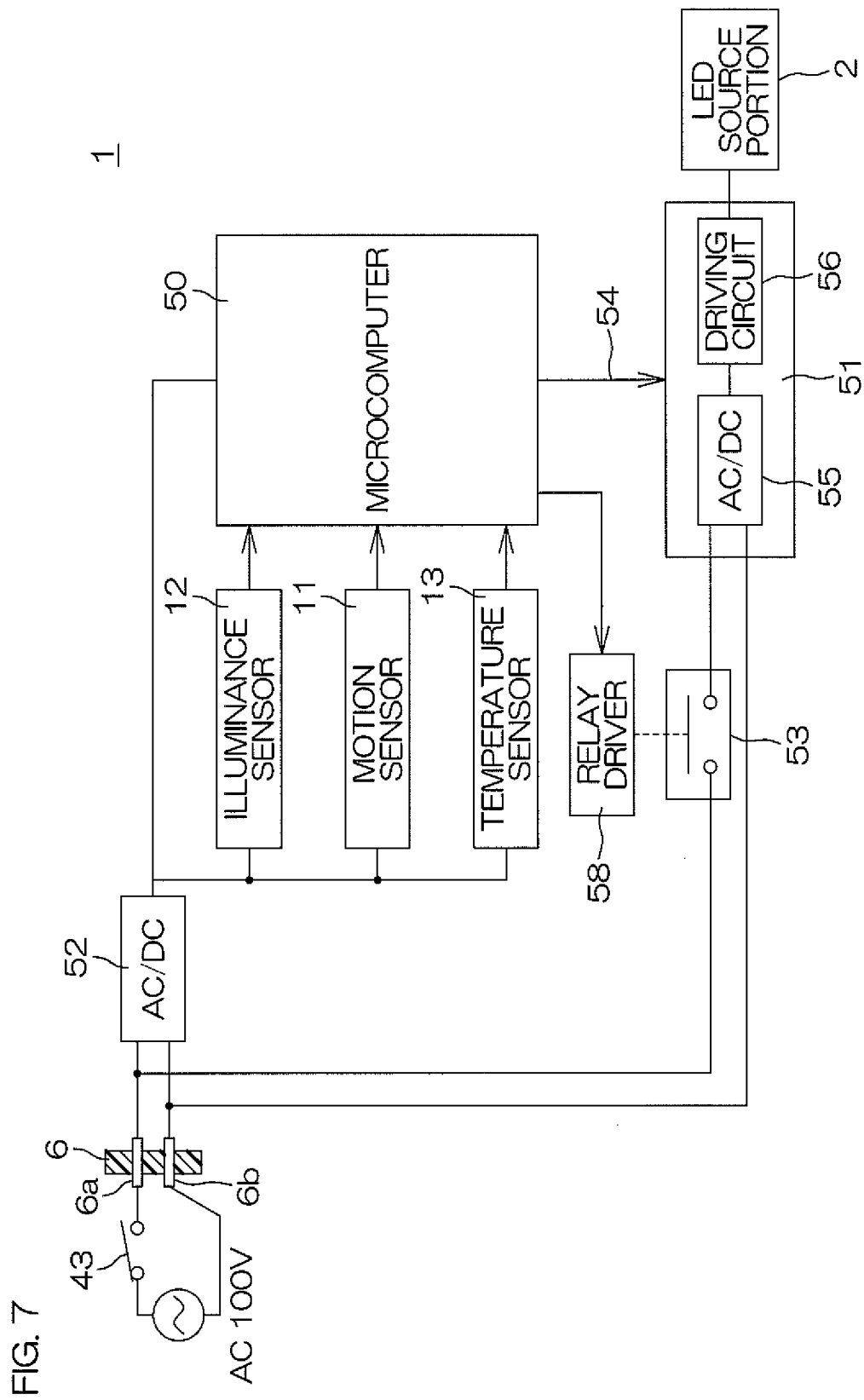

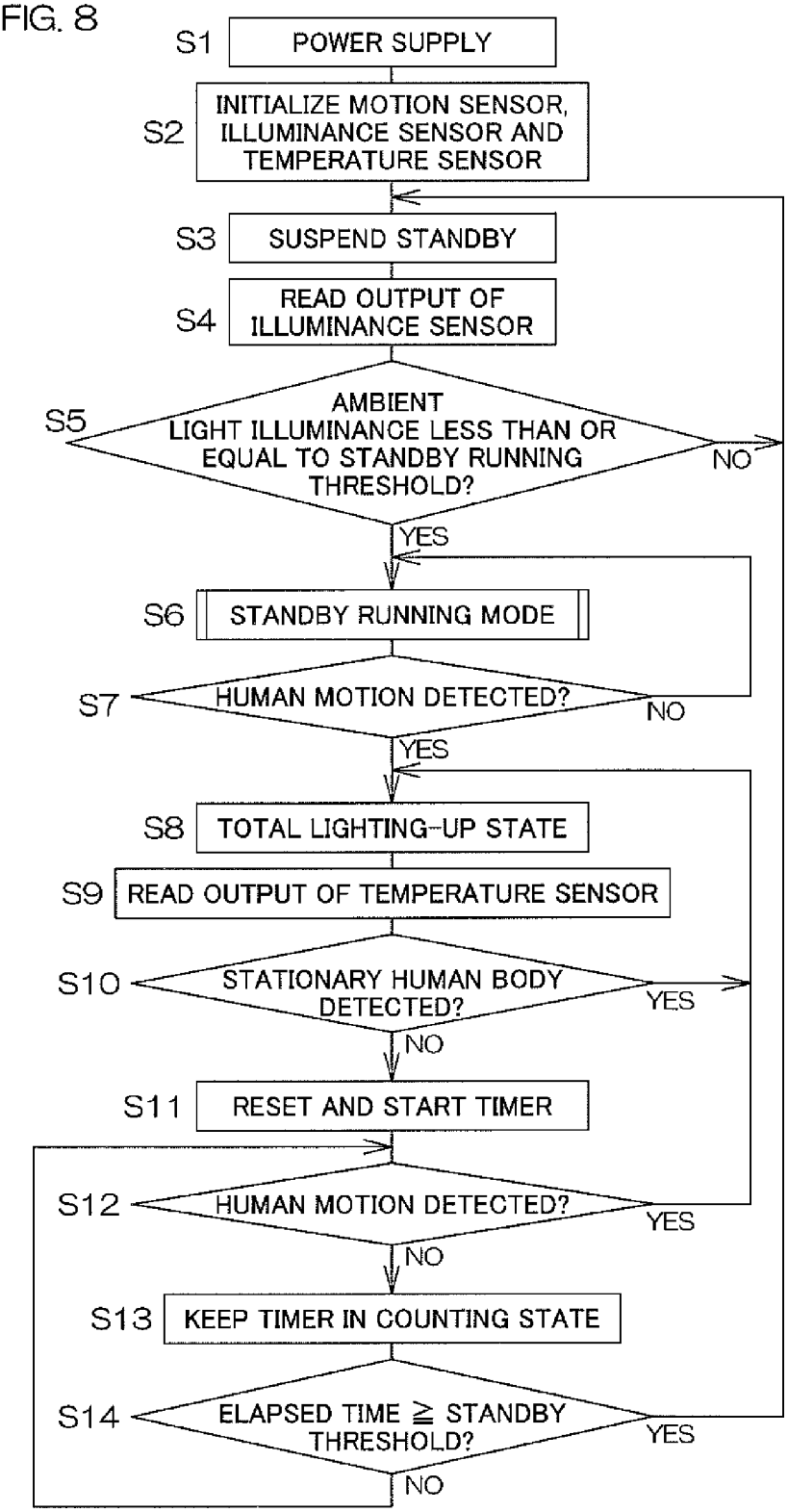

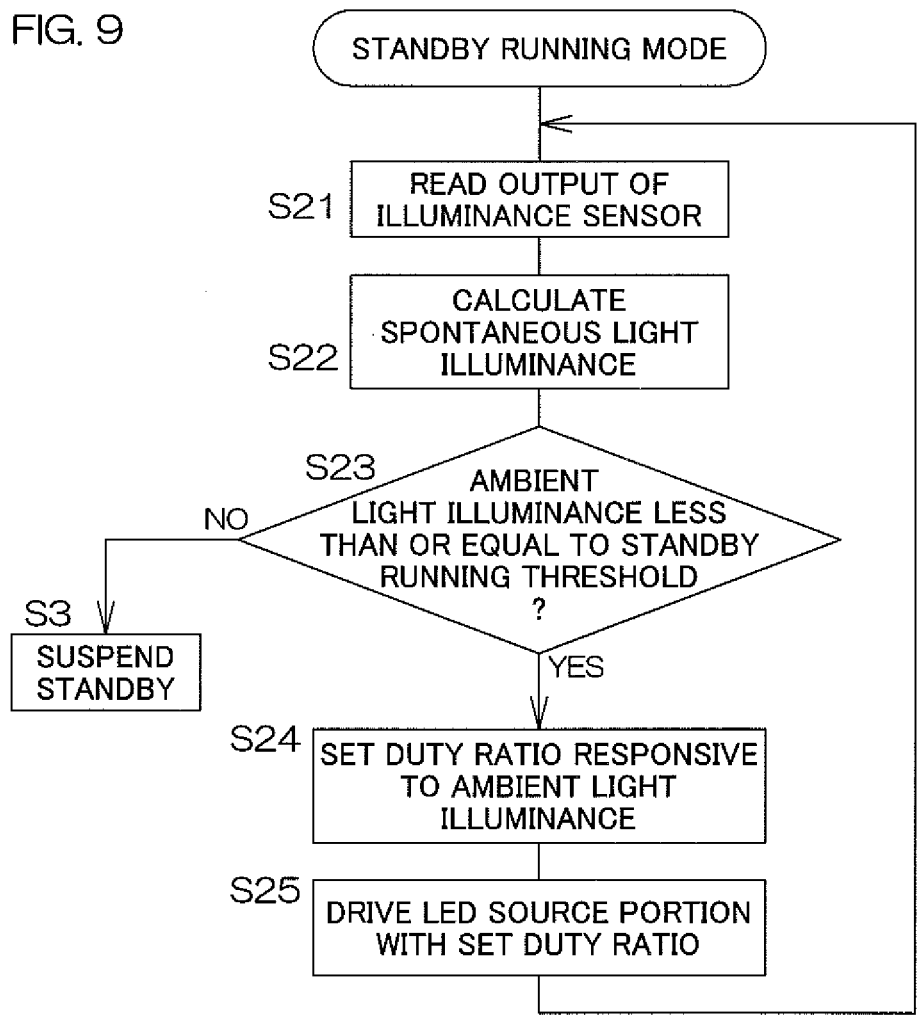

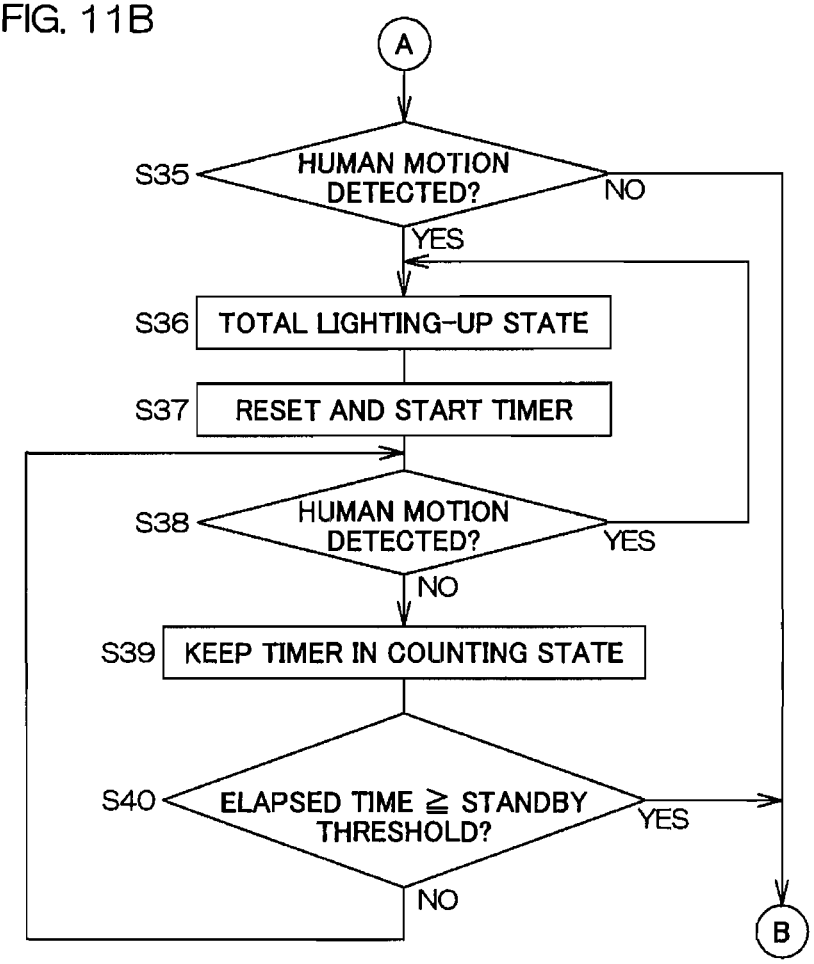

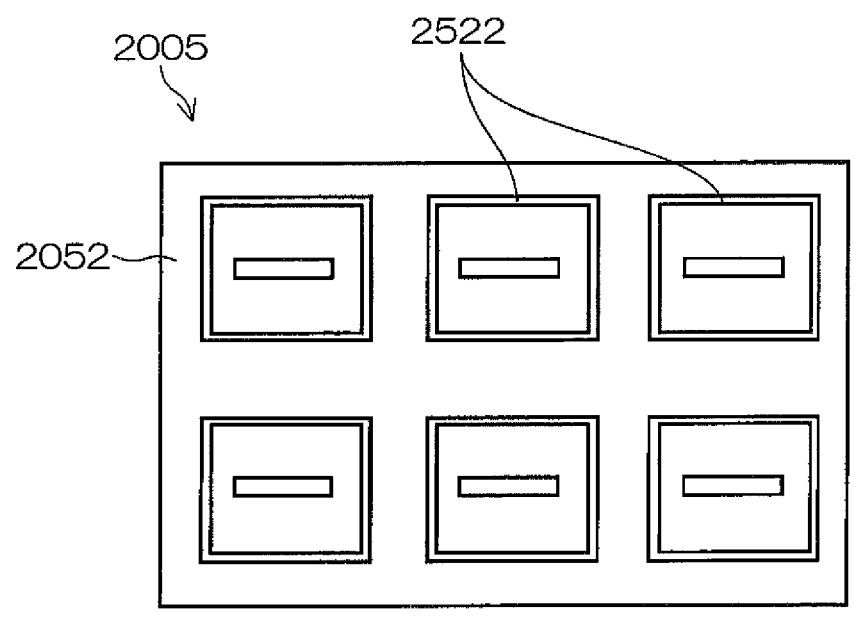
FIG. 45
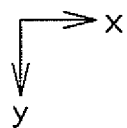

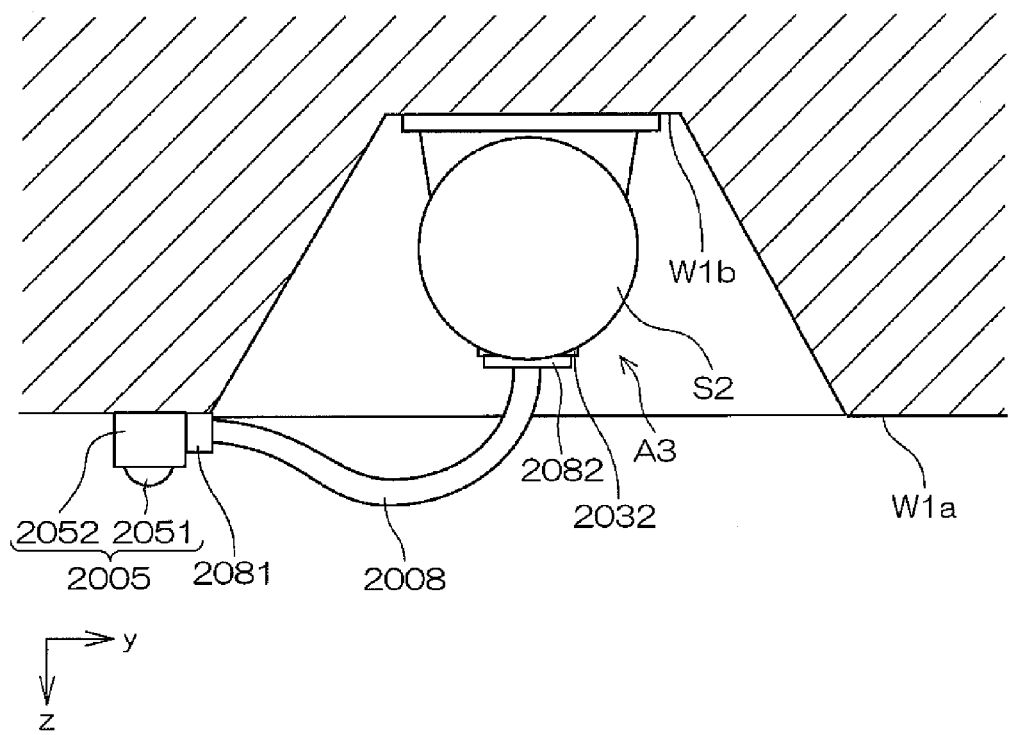
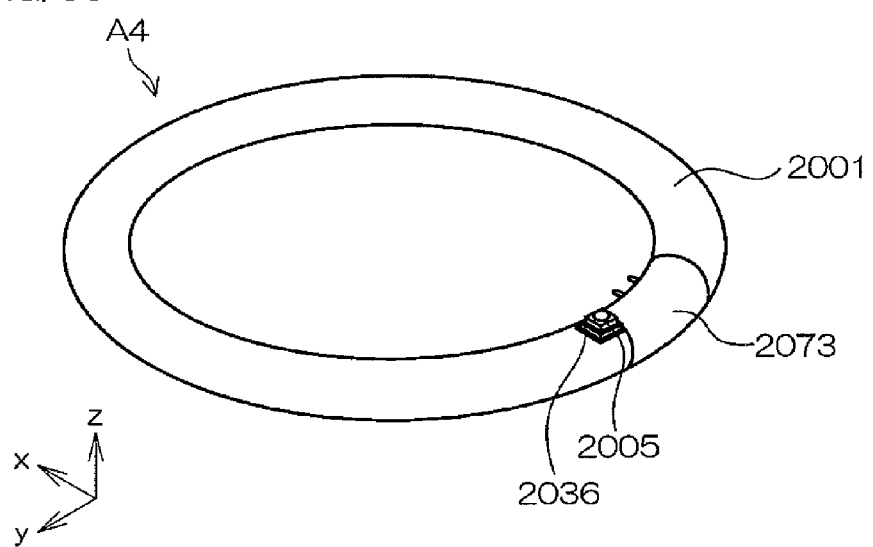

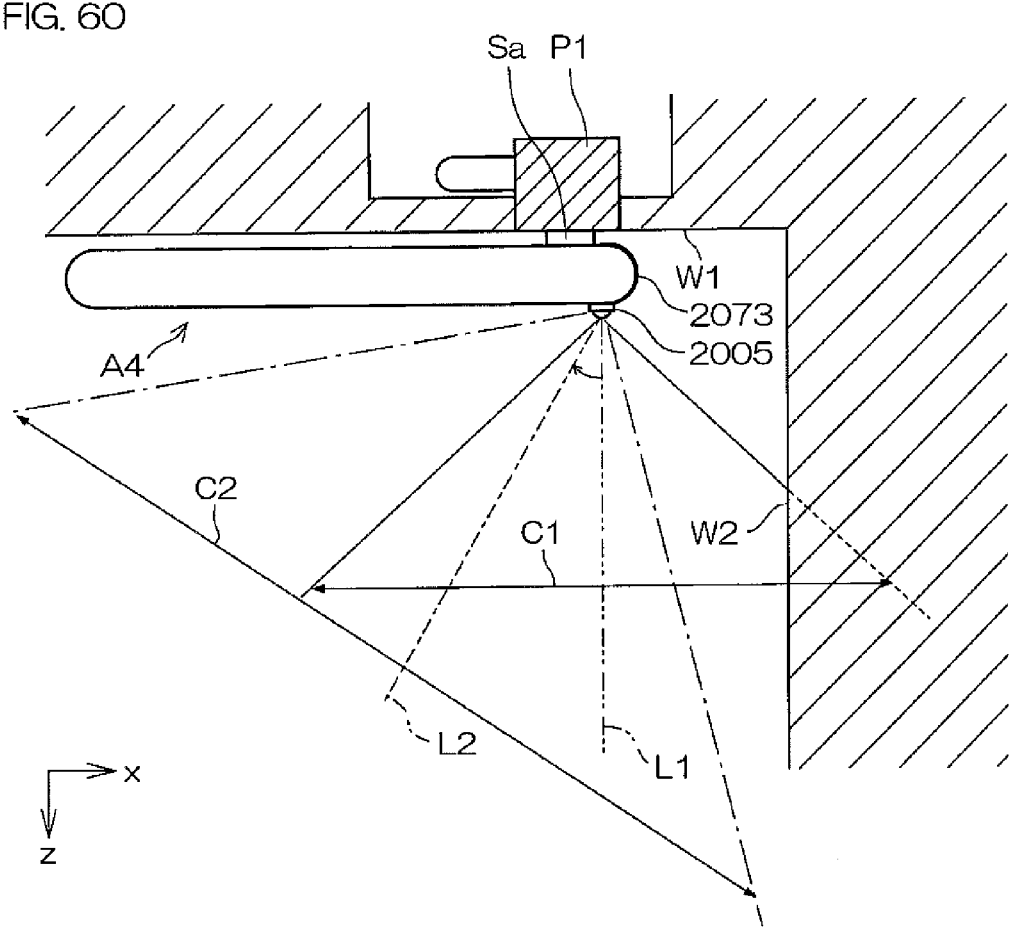

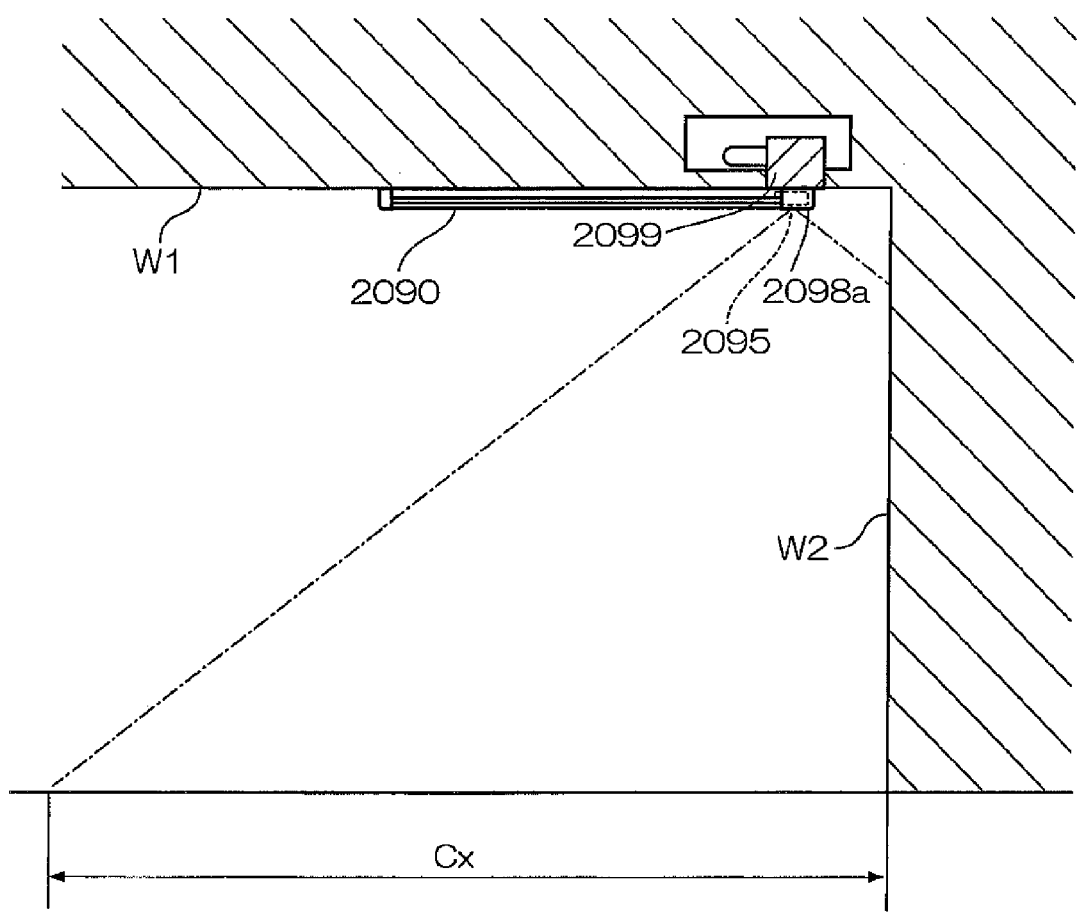

LED LAMP

BACKGROUND OF THE INVENTION

1. Field of the Invention

The present invention relates to an LED lamp, mounted on a lighting fixture to be employed, having a plurality of LED (light-emitting diode) chips.

2. Description of Related Art

An LED lamp having a light source formed by LEDS (light-emitting diodes) is disclosed in Patent Document 1 (International Unexamined Patent Publication No. 2010/018682). The LED lamp has a sheetlike light source portion constituted of a substrate and a plurality of LED chips arranged on the substrate.

SUMMARY OF THE INVENTION

The present invention provides an LED lamp controllable in response to ambient brightness.

The present invention provides an LED lamp, mounted mounted on a lighting fixture, including an LED source portion including a plurality of LED chips, an illuminance sensor detecting ambient illuminance, and a controller controlling the LED source portion in response to the illuminance of ambient ambient light other than light emitted by the LED source portion portion on the basis of an output signal received from the illuminance sensor when the LED source portion is in a lighting-up state (Claim 1). According to this structure, the LED lamp includes the illuminance sensor, which may detect not only the illuminance of the ambient light but also the illuminance of spontaneous light emitted by the LED source portion when the LED source portion is in the lighting-up state. According to the present invention, the controller controls the LED source portion in response to the illuminance of the ambient light while eliminating influence by the spontaneous light illuminance, thereby properly controlling the LED source portion in response to ambient brightness. In other words, the controller can vary a driven state of the LED source portion with the ambient illuminance even if the lighting fixture includes no illuminance sensor.

The illuminance sensor may be arranged to detect the light emitted by the LED source portion and the ambient light (Claim 2). Also in this arrangement, the controller controls the LED source portion in response to the illuminance of the ambient light while eliminating the influence by the spontaneous light illuminance, whereby flexibility in the arrangement of the illuminance sensor is improved, and the controller implements excellent control responsive to the ambient brightness.

According to one embodiment of the present invention, the controller includes a spontaneous light illuminance calculating means calculating spontaneous light illuminance contributed to the output signal of the illuminance sensor by the light emitted by the LED source portion on the basis of a driven state of the LED source portion, and an on-off control means turning on the LED source portion when ambient light illuminance obtained by subtracting the spontaneous light illuminance from the output signal of the illuminance sensor is less than or equal to a prescribed threshold and turning off the LED source portion when the ambient light illuminance is in excess of the threshold (Claim 3). The driven state of the LED source portion and the spontaneous light illuminance are correlated with each other. Therefore, the spontaneous light illuminance calculating means can calculate the spontaneous light illuminance on the basis of the driven state of the LED source portion. The on-off control means can properly evaluate the ambient light illuminance by employing the calculated spontaneous light illuminance. In other words, the on-off control means can properly on-off control the LED source portion by comparing the ambient light illuminance obtained by subtracting the spontaneous light illuminance from the output signal of the illuminance sensor with the threshold and employing the result of the comparison.

Preferably, the controller further includes an illuminance-adaptive driving means driving the LED source portion with power responsive to the ambient light illuminance when the ambient light illuminance is less than or equal to the threshold (Claim 4). According to this structure, the controller can properly drive the LED source portion in response to the ambient light illuminance. In other words, the controller can bring the LED source portion into a proper light-emitting state and contribute to energy saving by reducing driving power for the LED source portion as the ambient light illuminance is increased.

According to another embodiment of the present invention, the controller includes a storage means storing the output signal received from the illuminance sensor, a comparison means comparing the output signal of the illuminance sensor and the value stored in the storage means with each other, and an on-off control means turning on/off the LED source portion in response to the result of the comparison of the comparison means (Claim 5). When the on-off control means turns on the LED source portion in a state where the ambient light illuminance is zero (i.e., a state with no external light), for example, it follows that the output of the illuminance sensor expresses the spontaneous light illuminance. Therefore, the controller can store the spontaneous light illuminance in the storage means by storing the output of the illuminance sensor therein.

The storage means may be formed to store the output signal received from the illuminance sensor when the LED source portion is in a predetermined lighting-up state (Claim 6). Thus, the storage means can store the spontaneous light illuminance in the lighting-up state. Therefore, the controller can correctly estimate the ambient light illuminance from the output of the illuminance by referring to the value stored in the storage means when driving the LED source portion in the lighting-up state.

The LED lamp preferably further includes a writing instruction means operated by an operator for writing the output signal of the illuminance sensor in the storage means, and in this case, the controller preferably further includes a writing means writing the output signal of the illuminance sensor in the storage means in response to an operation of the writing instruction means (Claim 7). Thus, the controller can reliably write the output signal of the illuminance sensor in the storage means.

According to still another embodiment of the present invention, the writing instruction means includes a lighting-up instruction means for turning on the LED source portion in a predetermined state, and the controller further includes a writing control means inhibiting the writing means from writing the output signal when the output signal of the illuminance sensor has already been written in the storage means and allowing the writing means to write the output signal when the output signal of the illuminance sensor is not yet written in the storage means (Claim 8). According to this structure, the controller can write the output signal currently received from the illuminance sensor in the storage means as the spontaneous light illuminance, when turning on the LED source portion in the predetermined state. Once the output signal is written in the storage means, the control means inhibits the writing means from writing the output signal in the storage means. Therefore, the controller first turns on the LED source portion in the predetermined state in a proper environment with no external light, so that the writing means can easily write correct spontaneous light illuminance in the storage means.

Preferably, the LED lamp further includes an inhibition canceling operation means operated by the operator for canceling inhibition of the writing operation by the writing means, and the writing control means is formed to allow the writing means to write the output signal in the storage means once in response to the operation of the inhibition canceling operation means (Claim 9). According to this structure, the operator cancels the inhibition of the writing operation in the storage means by operating the inhibition canceling operation means, whereby he/she can correct an improper value written in the storage means, for example.

The comparison means preferably includes a means determining whether or not the ambient light illuminance obtained by subtracting the value stored in the storage means from the output signal of the illuminance sensor is less than or equal to the prescribed threshold, and in this case, the on-off control means is preferably formed to turn on the LED source portion when the ambient light illuminance is less than or equal to the threshold and to turn off the LED source portion when the ambient light illuminance is in excess of the threshold (Claim 10). When the spontaneous light illuminance is correctly written in the storage means, the value obtained by subtracting the value stored in the storage means from the output signal of the illuminance sensor correctly expresses the ambient light illuminance. The on-off control means can properly turn on/off the LED source portion in response to the ambient brightness by employing the correct ambient light illuminance.

According to a further embodiment of the present invention, the controller includes a PWM (pulse width modulation) control means PWM-controlling the LED source portion, and a sampling means sampling the output signal of the illuminance sensor as ambient light illuminance in an OFF-period when power supply to the LED source portion is stopped in a PWM cycle when the PWM control means PWM-controls the LED source portion, and is formed to control the LED source portion in response to the ambient light illuminance sampled by the sampling means (Claim 11). The LED source portion is in a lighting-up state in an ON-period of the PWM cycle, and in a lighting-out state in the OFF-period. When the sampling means samples the output signal of the illuminance sensor in the OFF-period of the PWM cycle, therefore, the sampled signal correctly expresses the ambient light illuminance. Therefore, the controller can properly control the LED source portion in response to the ambient brightness by employing the correct ambient light illuminance.

Preferably, the controller further includes a duty ratio setting means setting a duty ratio in the PWM control on the basis of the ambient light illuminance sampled by the sampling means (Claim 12). According to this structure, the controller properly drives the LED source portion with power responsive to the illuminance of the ambient light.

According to a further embodiment of the present invention, the LED lamp further includes a motion sensor having a predetermined sensitivity region, and the controller is formed to control the LED source portion in response to an output signal received from the motion sensor (Claim 13). According to this structure, the controller can drive the LED source portion in response to the presence or absence of a human entrance into the sensitivity region. The LED lamp stores the motion sensor, whereby an illuminator having a motion sensing function can be provided also when the lighting fixture includes no motion sensor.

Preferably, the controller is formed to increase driving power for the LED source portion in response to detection of a human being by the motion sensor (Claim 14). According to this structure, the quantity of light emitted by the LED source portion is increased when a human being enters the sensitivity region. Thus, the LED source portion emits a necessary quantity of light only when required, whereby an energy-saving property can be improved.

According to a further embodiment of the present invention, the LED lamp further includes a noncontact temperature sensor detecting the temperature of an object present in a predetermined temperature-sensing area in a noncontact manner, and the controller is formed to control the LED source portion in response to the temperature detected by the noncontact temperature sensor (Claim 15). While the motion sensor responds to a motion of a human being, the noncontact temperature sensor detects the temperature of the object in a noncontact manner, whereby the same can detect a human being standing still in the temperature-sensing area. Therefore, the controller can properly drive the LED source portion when a stationary human being is present in the temperature-sensing area. The LED lamp stores the noncontact temperature sensor, whereby an illuminator having a stationary human body sensing function can be provided also when the lighting fixture includes no noncontact temperature sensor.

According to a further embodiment of the present invention, the motion sensor includes a pyroelectric infrared sensor, and the LED lamp further includes a shutter unit opening/closing (e.g. periodically shutting) an infrared incidence path to a photoreceiving surface of the pyroelectric infrared sensor (Claim 16). If the shutter unit opens/closes (e.g. periodically shuts) the infrared incidence path when a human being is present in a sensitivity region of the pyroelectric infrared sensor, the pyroelectric infrared sensor outputs a signal resulting from a pyroelectric effect even if the human being is stationary. If no human being is present in the sensitivity region, no significant change appears in the output of the pyroelectric infrared sensor also when the shutter unit opens/closes the infrared incidence path. Thus, the stationary human body sensing function can be implemented with the pyroelectric infrared sensor at a remarkably lower cost as compared with a temperature sensor. Further, the pyroelectric infrared sensor provided on the motion sensor can also be employed for sensing a stationary human body, whereby the cost for the LED lamp can be effectively reduced.

According to a further embodiment of the present invention, the LED lamp further includes a pyroelectric infrared sensor having a predetermined sensitivity region, and a shutter unit opening/closing (e.g. periodically shutting) an infrared incidence path to a photoreceiving surface of the pyroelectric infrared sensor, and the controller is formed to determine the presence or absence of a human being in the sensitivity region on the basis of an output signal received from the pyroelectric infrared sensor and to control the LED source portion in response to the result of the determination (Claim 17). Also according to this structure, the stationary human body sensing function can be provided without employing a temperature sensor, due to a principle similar to the above. Further, the pyroelectric infrared sensor is provided separately from the motion sensor, whereby the sensitivity regions of the pyroelectric infrared sensor and the motion sensor can be individually set. Thus, the controller can more properly sense the presence or absence of a stationary human being, for properly controlling the LED source portion in response to the result of the sensing.

The foregoing and other objects, features and effects of the present invention will become more apparent from the following detailed description of the embodiments with reference to the attached drawings.

BRIEF DESCRIPTION OF THE DRAWINGS

FIG. 7 is a block diagram for illustrating the electrical structure of the LED lamp.

FIG. 8 is a flowchart showing examples of control contents of processing repeated by a microcomputer provided on the LED lamp every prescribed control cycle.

FIG. 9 is a flowchart for illustrating a control operation of the microcomputer in a standby running mode (at a step S6 in FIG. 8).

FIG. 45 is a bottom plan view of the motion sensor shown in FIG. 43.

FIG. 58 illustrates an example of usage of the LED lamp with a motion sensor shown in FIG. 57.

FIG. 59 is a perspective view of an LED lamp with a motion sensor according to a fourth embodiment of the third structural example of the present invention.

FIG. 60 illustrates a used state of the LED lamp with a motion sensor shown in FIG. 59.

FIG. 63 illustrates a used state of the conventional LED lamp with a motion sensor.

DETAILED DESCRIPTION OF THE EMBODIMENTS

Embodiments of the present invention are now described in detail with reference to the attached drawings.

[1] First Structural Example

Figure 1:
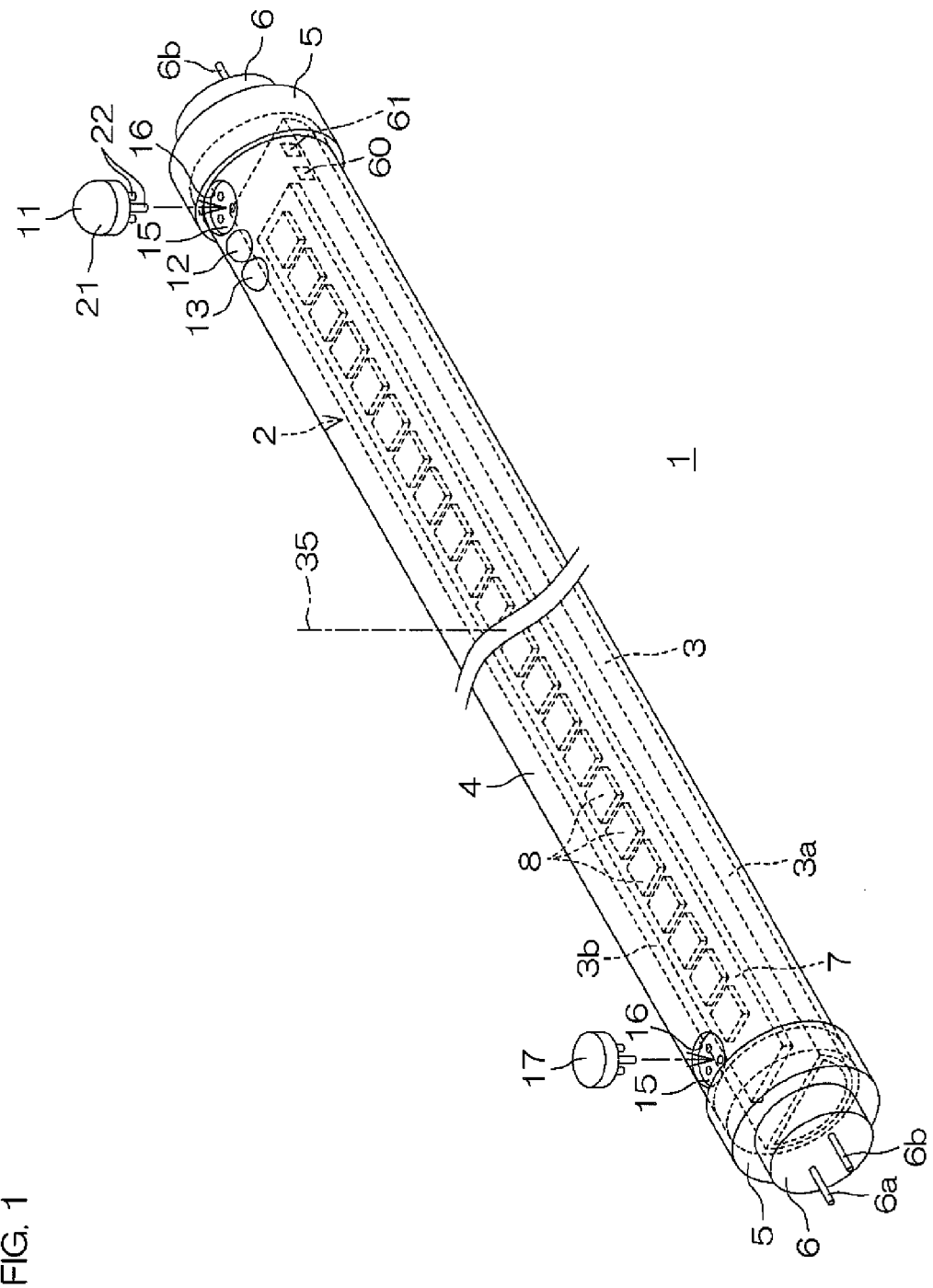
FIG. 1 is a perspective view of an LED lamp according to a first embodiment of a first structural example of the present invention, upwardly showing a lower portion in a normal used state.
Figure 2:
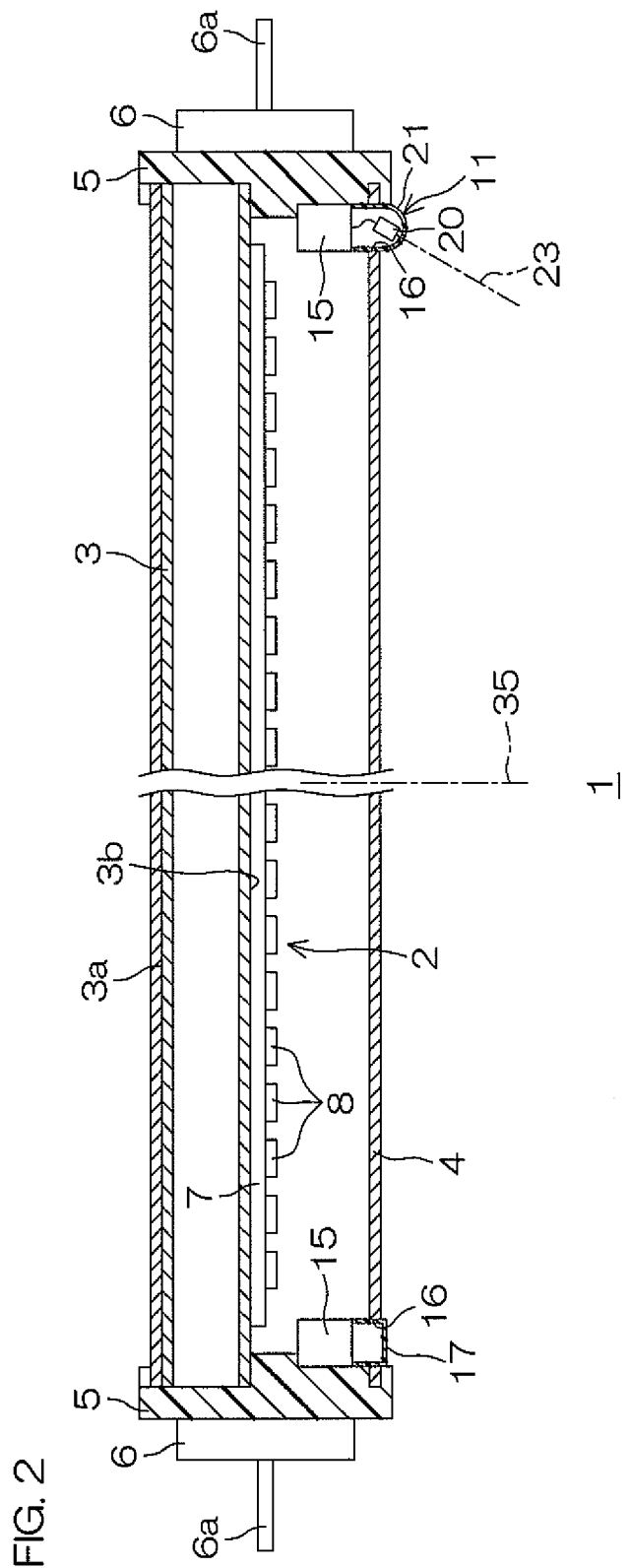
FIG. 2 is a longitudinal sectional view showing the internal structure of the LED lamp in a vertical section in the normal used state.
Figure 3:
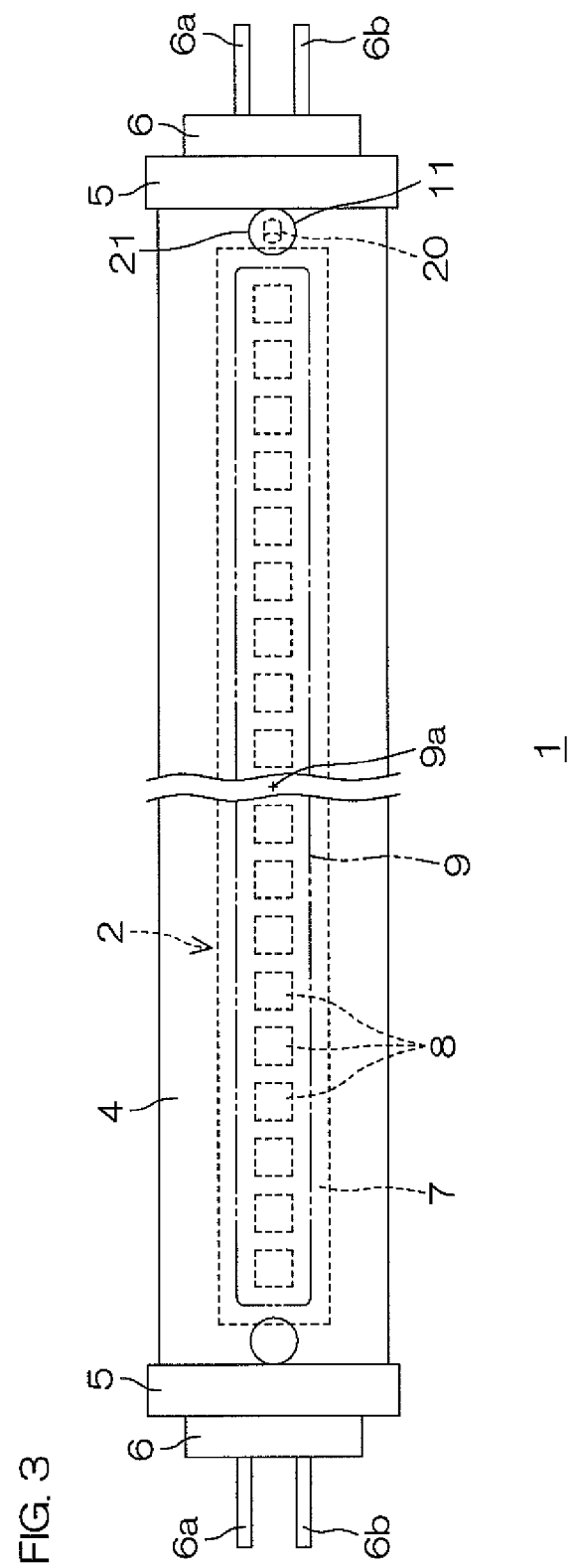
FIG. 3 is a bottom plan view showing the internal structure of the LED lamp (a diagram showing the LED lamp in the attitude shown in FIG. 1 as viewed from above).

FIG. 1 is a perspective view of an LED lamp 1 according to a first embodiment of a first structural example of the present invention, upwardly showing a lower portion in a normal used state. FIG. 2 is a longitudinal sectional view showing the internal structure of the LED lamp 1 in a vertical section in the normal used state. FIG. 3 is a bottom plan view showing the internal structure of the LED lamp 1 (a diagram showing the LED lamp 1 in the attitude shown in FIG. 1 as viewed from above).

The LED lamp 1 can be mounted on a fluorescent lamp lighting fixture, to be employed as the substitution of a straight fluorescent lamp. In a case of attaching the LED lamp 1 to a lighting fixture mounted on a ceiling, for example, it follows that a portion upwardly shown in FIG. 1 is directed downward. The LED lamp 1 includes an LED source portion 2, a support member 3, a case 4, a pair of caps 5, and a pair of bases 6. The case 4 holds a motion sensor module 11, an illuminance sensor module 12, and a temperature sensor module 13. FIGS. 2 and 3 omit illustration of the illuminance sensor module 12 and the temperature sensor module 13.

The LED source portion 2 includes a substrate 7 and a plurality of LED modules 8. The substrate 7 is a wiring board having an elongating rectangular shape, prepared by forming a wiring pattern on a substrate made of resin such as glass epoxy resin, for example. The plurality of LED modules 8 are aligned on the surface of the substrate 7 along the longitudinal direction thereof. The plurality of LED modules 8 may alternatively be arrayed on the substrate 7 in a plurality of lines, as a matter of course. Thus, the LED source portion 2 has a planar light-emitting area 9 (see FIG. 3) elongating in the longitudinal direction of the substrate 7. The light-emitting area 9 has a center 9a on a longitudinal central position of the substrate 7. The LED source portion 2 radiates light toward an illuminational region centering on an illumination axis 35 extending from the center 9a of the light-emitting area 9 in the normal direction of the substrate 7.

The support member 3 is made of a highly heat-conductive material (a material having higher heat conductivity than the substrate 7) such as aluminum, for example, and in the form of a slender hollow block extending along the longitudinal direction of the substrate 7. More specifically, a section of the support member 3 orthogonal to the longitudinal direction has a hollow semicircular shape, and the support member 3 has a cylindrical surface 3a conforming to the inner peripheral surface of the case 4 and a planar surface 3b opposed to the substrate 7. The substrate 7 is mounted on the planar surface 3b. The planar surface 3b is formed to be wider than the breadth (the length in the short-side direction) of the substrate 7 and larger than the length (in the longitudinal direction) of the substrate 7. The support member 3 also functions as a heat transfer member (or a heat radiation member) transferring heat generated by the LED source portion 2 to the case 4 and the caps 5, in addition to the function of supporting the substrate 7. A hollow space of the support member 3 may be utilized for storing a circuit component for controlling and driving the LED source portion 2.

The case 4 is in the form of a tube (a cylindrical tube, for example) extending in the longitudinal direction of the substrate 7, and diffuses and transmits light emitted by the LED source portion 2. The case 4 may be made of a resin material (an extruded product, for example) such as polycarbonate. The LED source portion 2 and the support member 3 are stored in a space in the case 4. The case 4 is formed to be longer than the substrate 7, and generally equivalent in length to the support member 3.

The pair of caps 5 are coupled to both ends of the support member 3 respectively, to hold the case 4 therebetween. The bases 6 are coupled to outer sides of the caps 5. Each base 6 has a pair of terminals 6a and 6b, and is formed to be mechanically and electrically connectable to a socket of the lighting fixture. Connectors 15 to which the motion human sensor module 11 is detachably mountable are mounted on the pair of caps 5 respectively. In other words, the connectors 15 are mounted on the case 4 through the caps 5. The motion sensor module 11 can be mounted on the case 4 through either connector 15 and either cap 5.

Openings 16 corresponding to the connectors 15 are formed on lower sides (positions opposed to an illuminated region) of both end portions of the case 4. The motion sensor module 11 is coupled to either connector 15 through the corresponding opening 16, to be electrically connected to the connector 15. In practical usage of the LED lamp 1, either one of the pair of connectors 15 is employed for connecting the motion sensor module 11. In other words, the motion sensor module 11 is connected to either one of the connectors 15. A connector cap 17 conforming to the opening 16 and couplable to the connector 15 may be mounted on the unused connector 15.

Figure 4:
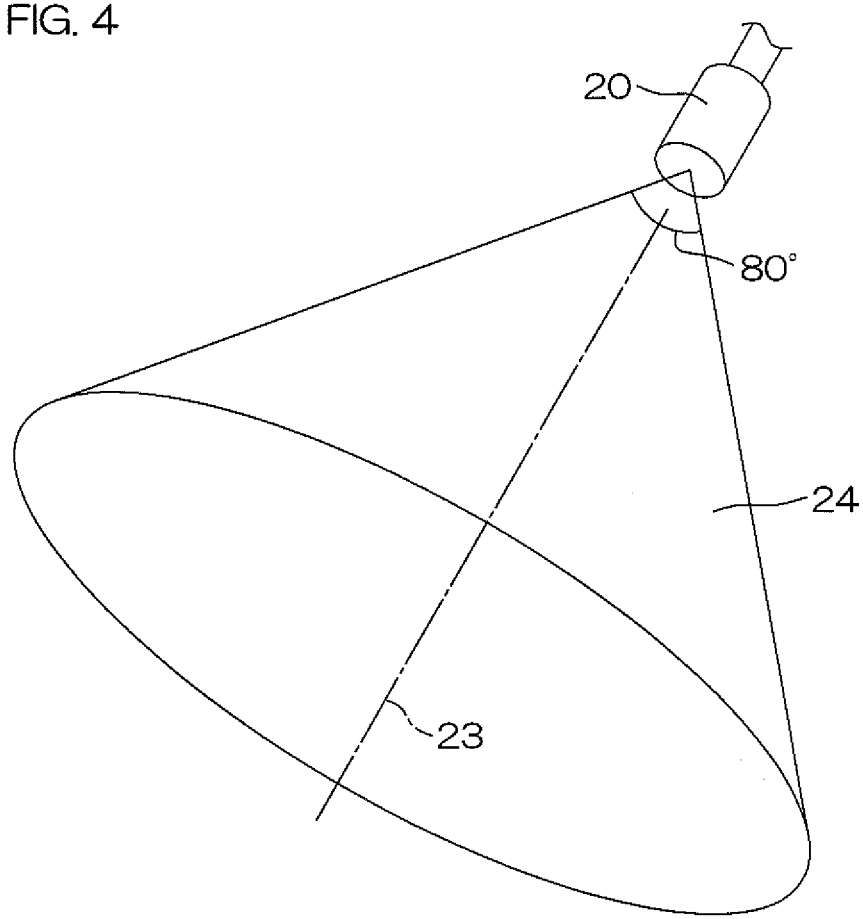
FIG. 4 illustratively shows a sensitivity region of a motion sensor module.

The motion sensor module 11 has a sensor body 20 formed by a pyroelectric infrared sensor, for example, a module case 21 holding the sensor body 20, and terminal pins 22 drawn out of the module case 21. The module case 21 has an outer shape conforming to each opening 16 of the case 4, and the terminal pins 22 are arranged to conform to the positions of connecting terminals of each connector 15. The sensor body 20 has a conical sensitivity region 24 centering on a sensitivity axis 23, as illustratively shown in FIG. 4. The sensitivity region 24 forms an isosceles triangle in a cutting plane including the sensitivity axis 23, and the apical angle of the isosceles triangle is about 80°. The motion sensor module 11 functions as a motion sensor detecting human entrance/exit into/from the sensitivity region 24.

The illuminance sensor module 12 and the temperature sensor module 13 are mounted on a first end portion of the case 4, for example. The sensor modules 12 and 13 may also be rendered detachably mountable on either end portion of the case 4, similarly to the motion sensor module 11. The illuminance sensor module 12 detects ambient illuminance of the LED lamp 1. The temperature sensor module 13 is a noncontact temperature sensor including a thermopile, for example, and detecting the body temperature of a human being positioned in the vicinity of the LED lamp 1. In other words, the temperature sensor module 13 can sense a human being standing still in the vicinity of the LED lamp 1, while the motion sensor module 11 detects human entrance/exit into/from the sensitivity region 24.

Figure 5:
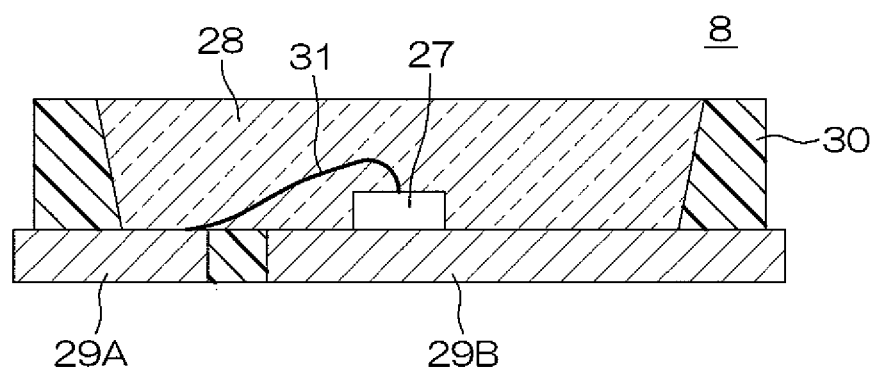
FIG. 5 is a sectional view showing a structural example of an LED module.

FIG. 5 is a sectional view showing a structural example of the LED module 8. The LED module 8 includes an LED chip 27, sealing rein 28, leads 29A and 29B, and a reflector 30. The LED module 8 is about 4.0 mm in width, about 2.0 mm in length and about 0.6 mm in thickness, for example, and formed to be small-sized and thin.

The leads 29A and 29B are platelike members made of a Cu—Ni alloy, for example, and employed as mounting terminals for surface-mounting the LED module 8. The reflector 30 is made of white resin, for example.

The LED chip 27 serves as the light source for the LED module 8, and emits visible light, for example. The LED chip 27 is loaded on the lead 29B through silver paste, for example, to be electrically connected thereto. Further, the LED chip 27 is electrically connected to the lead 29A through a wire 31. When current is supplied to the LED chip 27 through the leads 29A and 29B, the LED chip 27 emits light.

The sealing resin 28 for protecting the LED chip 27 is made of epoxy resin having translucency with respect to the light emitted by the LED chip 27, for example. A fluorescent material (a wavelength conversion material) excited by the light (blue light, for example) emitted by the LED chip 27 to emit light (yellow light, for example) of a different wavelength may be mixed into the sealing resin 28, for example. When the blue light from the LED chip 27 and the yellow light from the fluorescent material contained in the sealing resin 22 are mixed with each other, for example, the LED module 8 can emit white light.

Figures 6A, 6B:
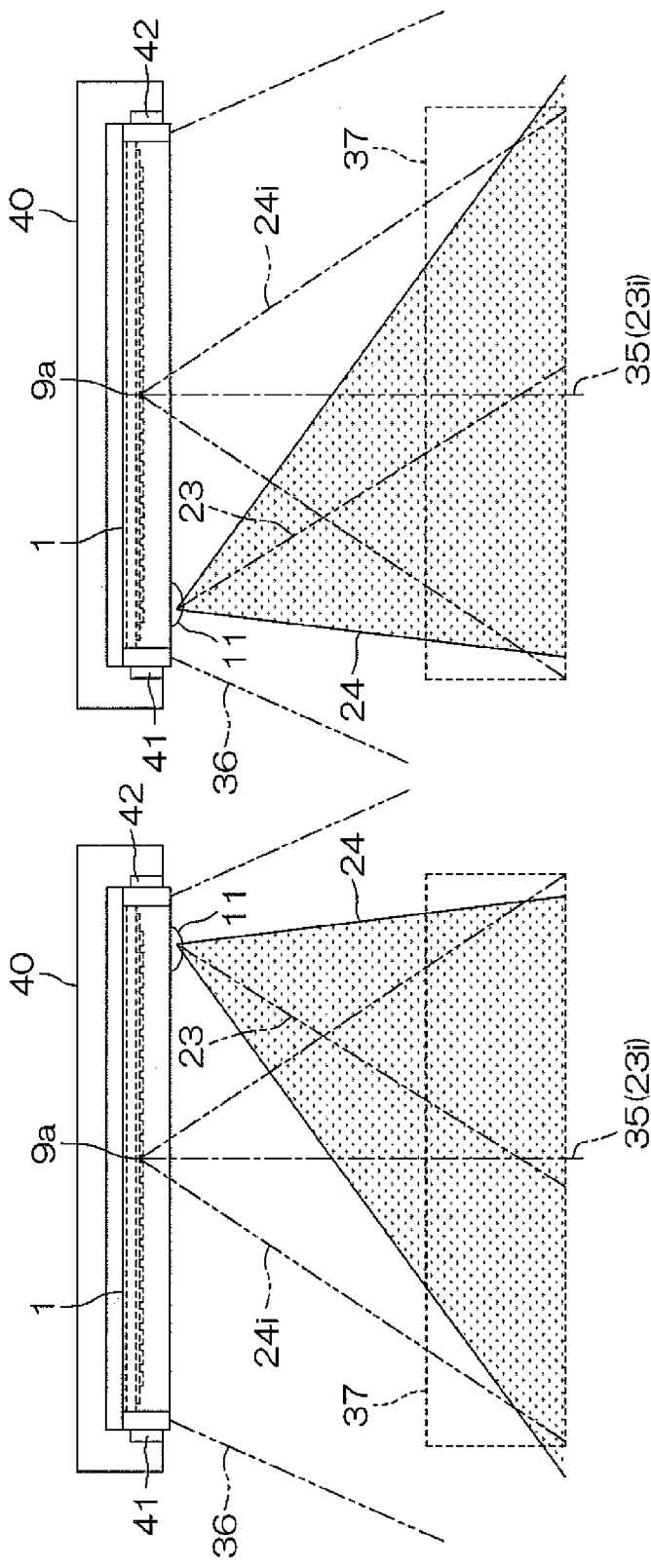
FIGS. 6A and 6B are illustrative front elevational views for illustrating a sensing area of the motion sensor module, showing a state where the LED lamp is mounted on a lighting fixture.

FIGS. 6A and 6B are illustrative front elevational views for illustrating a sensing area of the motion sensor module 11, showing a state where the LED lamp 1 is mounted on a lighting fixture 40. The lighting fixture 40 has a pair of sockets 41 and 42 holding the pair of bases 6 of the LED lamp 1 respectively. The socket 41 has functions of mechanically holding the corresponding base 6 and supplying power to the LED lamp 1 from the terminals 6a and 6b. The other socket 42 has no power supply function for the LED lamp 1, but dedicatedly has a function of mechanically holding the corresponding base 6. Only one of the pair of bases 6 of the LED lamp 1 is formed to receive external power and supply the same to an internal electrical circuit thereof, while the other base 6 is provided for mechanically mounting the LED lamp 1 on the lighting fixture 40 and has no function of supplying power to an internal electrical circuit thereof. When mounted on the lighting fixture 40 so that the base 6 having the power supply function is connected to one of the sockets 41 of the lighting fixture 40, therefore, the LED lamp 1 enters the state shown in either FIG. 6A or FIG. 6B. In other words, the arrangement of the motion sensor module 11 is reversed in relation to the longitudinal direction of the LED lamp 1 (identical to the longitudinal direction of the substrate 7), depending on the mounting direction of the lighting fixture 40. The problem of such reversed arrangement can be solved by remounting the motion sensor module 11 from one of the connectors 15 to the other connector 15, as a matter of course.

The LED source portion 2 of the LED lamp 1 has an illuminational region 36 spreading around the illumination axis 35 passing through the center 9a of the light-emitting area 9. The illumination axis 35 extends along the normal direction of the substrate 7, and is orthogonal to the longitudinal direction of the case 4 (identical to the longitudinal direction of the substrate 7). The illuminational region 36 spreads as separating from the LED lamp 1, and an illuminated region 37 is set in a prescribed distance range (about 0.5 m to 3 m, for example) separating from the LED lamp 1 along the illumination axis 35. According to the first embodiment, the motion sensor module 11 is so mounted on the case 4 that the sensitivity axis 23 thereof is unparallel to the illumination axis 35. More specifically, the sensitivity axis 23 is inclined in a direction approaching the illumination axis 35 from a longitudinal end portion of the case 4. The sensitivity axis 23 and the illumination axis 35 intersect with each other in the illuminated region 37. Each of FIGS. 6A and 6B shows a virtual sensitivity region 24i in a case of arranging the motion sensor module 11 at the center 9a of the light-emitting area 9 so that the illumination axis 35 and the sensitivity axis 23 conform to each other in two-dot chain lines. A sensitivity axis 23i (generally conforming to the illumination axis 35) of the virtual sensitivity region 24i and the sensitivity axis 23 of the actual sensitivity region 24 intersect with each other in the illuminated region 37. In other words, the centers of the actual sensitivity region 24 and the virtual sensitivity region 24i conform to each other on a position (a position in the illuminated region 37) separating from the LED source portion 2 by a prescribed distance.

If the motion sensor module 11 is arranged at the center 9a of the light-emitting area 9, the LED lamp 1 has a dark portion at the longitudinal center in a lighting-up state, leading to an unspectacular appearance and bad influence on light distribution. According to the first embodiment, therefore, the motion sensor module 11 is arranged on a longitudinal end portion of the LED lamp 1, thereby improving the appearance and the light distribution in the lighting-up state. If the sensitivity axis 23 is parallelized to the illumination axis 35, on the other hand, the illuminated region 37 deviates from the sensitivity region 24 of the motion sensor module 11, and sensing timing is dispersed depending on from which direction a human being enters a peripheral region of the illuminated region 37. According to the first embodiment, therefore, the motion sensor module 11 is mounted on the case 4 while inclining the sensitivity axis 23 so that the illumination axis 35 and the sensitivity axis 23 intersect with each other in the illuminated region 37. Thus, the motion sensor module 11 can excellently detect human entrance into the peripheral region of the illuminated region 37 while suppressing dispersion in timing.

FIG. 7 is a block diagram for illustrating the electrical structure of the LED lamp 1. The LED lamp 1 has a microcomputer 50 as a controller and an LED driver 51 controlled by the microcomputer 50. An AC-DC converter 52 converts AC power (100 V, for example) from the terminals 6a and 6b of the power-supplying base 6 to DC power (5V, for example) and supplies the same to the microcomputer 50 etc. The microcomputer 50, the motion sensor module 11, the illuminance sensor module 12 and the temperature sensor module 13 operate by receiving the power. Output signals of the sensor modules 11, 12 and 13 are input in the microcomputer 50. On the other hand, the AC power from the terminals 6a and 6b of the base 6 is supplied to the LED driver 51 through a relay 53.

The LED driver 51 supplies the power to the LED source portion 2, and drives the LED module 8 (more specifically, the LED chip 27) provided on the LED source portion 2. More specifically, the LED driver 51 has an AC-DC converter 55 and a driving circuit 56. The AC-DC converter 55 converts the AC power (100 V, for example) supplied from the terminals 6a and 6b of the base 6 to DC power (27 V, for example). The driving circuit 56 includes a switching element on-off controlling the supply of the DC power generated by the AC-DC converter 55 to the LED source portion 2. The LED driver 51 has a PWM (pulse width modulation) input terminal 54 accepting input of a PWM control signal. The PWM input terminal 54 receives the PWM control signal from the microcomputer 50. The driver circuit 56 is formed to turn on/off the LED source portion 2 in response to the PWM control signal input in the PWM input terminal 54. Therefore, it follows that the LED source portion 2 is driven with power responsive to the duty ratio of the PWM control signal.

A relay driver 58 on-off drives the relay 53. The relay driver 58 receives an on-off control signal from the microcomputer 50. The relay driver 58 on-off controls the relay 53 in response to the on-off control signal. Thus, the LED source portion 2 can be turned on/off.

FIG. 8 is a flow chart showing examples of control contents of processing repeated by the microcomputer 50 every prescribed control cycle. When a power switch 43 (see FIG. 7) of the lighting fixture 40 is turned on and power is supplied (at a step S1), the microcomputer 50 initializes the motion sensor module 11, the illuminance sensor module 12 and the temperature sensor module 13 (at a step S2). When power is not yet supplied, the relay 53 is kept in an OFF-state. Immediately after the power supply, the microcomputer 50 keeps the relay 53 in the OFF-state and puts the LED source portion 2 on standby in a lighting-out state (at a step S3). In this state, the microcomputer 50 incorporates the output signal of the illuminance sensor module 12 (at a step S4). The LED source portion 2 is in the lighting-out state, and hence the output signal of the illuminance sensor module 12 expresses illuminance Ai of ambient light. The microcomputer 50 compares the ambient light illuminance Ai detected by the illuminance sensor module 12 with a prescribed standby running threshold SBth (at a step S5). When the ambient light illuminance Ai is in excess of the standby running threshold SBth (NO at the step S5), the microcomputer 50 continuously keeps the relay 53 in the OFF-state and puts the LED source portion 2 on standby in the lighting-out state (at the step S3).

When the ambient light illuminance Ai falls below the standby running threshold SBth (YES at the step S5), i.e. when the ambience gets sufficiently dark, the microcomputer 50 turns on the relay 53 and starts controlling the LED lamp 1 in a standby running mode (at a step S6). The standby running mode denotes a running mode of driving the LED source portion 2 with power (about 10% to 30%, for example) of less than 100% assuming that power of 100% is supplied to the LED source portion 2 in a total lighting-up state, and can be rephrased as a night-lamp mode. More specifically, the microcomputer 50 supplies a PWM control signal having a duty ratio (10% to 30%, for example) of less than 100% to the LED driver 51.

Further, the microcomputer 50 determines the presence or absence of a human motion in the sensitivity region 24 (see FIG. 6A or 6B) on the basis of the output signal received from the motion sensor module 11 (at a step S7). When no human motion is detected (NO at the step S7), the microcomputer 50 continues the standby running mode (at the step S6). If a human motion is detected (YES at the step S7), on the other hand, the microcomputer 50 totally turns on the LED source portion 2 (at a step S8). More specifically, the microcomputer 50 supplies a PWM control signal (a continuous running signal) having a duty ratio of 100% to the LED driver 51.

Then, the microcomputer 50 incorporates the output signal of the temperature sensor module 13 (at a step S9), and detects the temperature of an object present in a temperature sensing region of the temperature sensor module 13. In general, the temperature sensing region is narrower than the sensitivity region 24 of the motion sensor module 11. On the basis of the output signal of the temperature sensor module 13, the microcomputer 50 determines whether or not a stationary human being is present in the vicinity of the LED lamp 1 (at a step S10). The stationary human being denotes a human being not in a motion sensable by the motion sensor module 11, and he/she may not necessarily be completely stationary. When the temperature sensor module 13 has sensed an object at a temperature of not less than a prescribed level (35° C., for example), the microcomputer 50 determines that a stationary human being is present in the vicinity of the LED lamp 1. When the motion sensor module 11 senses a stationary human being (YES at the step S10), the microcomputer 50 keeps the LED source portion 2 in the total lighting-up state (at the step S8).

When the motion sensor module 11 senses no stationary human being (NO at the step S10), on the other hand, the microcomputer 50 resets an internal timer, and makes the timer start counting (at a step S11). The microcomputer 50 further refers to the output signal of the motion sensor module 11, and returns to the step S8 when the motion sensor module 11 has sensed a human motion (YES at a step S12), to keep the LED source portion 2 in the total lighting-up state. When the motion sensor module 11 has sensed no human motion (NO at the step S12), on the other hand, the microcomputer 50 keeps the timer in the counting state (at a step S13). The count of the timer shows the elapsed time from the starting of the timer (sensing no stationary human body). The microcomputer 50 determines whether or not the elapsed time has reached a prescribed standby threshold (30 seconds, for example) (at a step S14). When the elapsed time does not reach the standby threshold (NO at the step S14), the microcomputer 50 repeats the processing from the step S12. When the elapsed time reaches the standby threshold (YES at the step S14), on the other hand, the microcomputer 50 returns to the step S3, and turns off the relay and the LED source portion 2. Alternatively, the microcomputer 50 may return to the step S6 to bring the LED source portion 2 into a standby running state.

FIG. 9 is a flow chart for illustrating a control operation of the microcomputer 50 in the standby running mode (at the step S6 in FIG. 8). The microcomputer 50 incorporates the output signal of the illuminance sensor module 12 (at a step S21).

In the standby running mode, the illuminance sensor module 12 detects not only the ambient light but also light emitted by the LED source portion 2 turned on in the standby running state. In other words, the ambient light illuminance Ai and spontaneous light illuminance Si contributed by the light emitted from the LED source portion 2 are superposed in the output signal of the illuminance sensor module 12. Therefore, the microcomputer 50 obtains the spontaneous light illuminance Si on the basis of the driven state of the LED source portion 2 (a spontaneous light illuminance operation means at a step S22). More specifically, the microcomputer 50 obtains the spontaneous light illuminance Si on the basis of the duty ratio of the PWM control signal supplied to the LED driver 51.

Then, the microcomputer 50 determines whether or not the ambient light illuminance Ai obtained by subtracting the spontaneous light illuminance Si from the output signal of the illuminance sensor module 12 is less than or equal to the standby running threshold SBth (at a step S23). The microcomputer 50 may make the determination by determining whether or not illuminance Di (=Si+Ai) detected by the illuminance sensor module 12 is less than or equal to a value (Si+SBth) obtained by adding the spontaneous light illuminance Si to the standby running threshold SBth, i.e., whether or not Di≤Si+SBth. The microcomputer 50 may obtain the ambient light illuminance Ai (=Di−Si) by subtracting the spontaneous light illuminance Si from the illuminance Di detected by the illuminance sensor module 12 to determine whether or not the ambient light illuminance Ai is less than or equal to the standby running threshold SBth, i.e., whether or not Di−Si≤SBth, as a matter of course.

When the ambient light illuminance Ai is less than or equal to the standby running threshold value SBth (YES at the step S23), the microcomputer 50 sets a duty ratio responsive to the ambient light illuminance Ai (=Di−Si) (at a step S24), and supplies a PWM control signal having the duty ratio to the LED driver 51 (at a step S25). Thus, it follows that the microcomputer 50 drives the LED source portion 2 with power responsive to the duty ratio, i.e., power responsive to the ambient brightness. Thereafter the microcomputer 50 returns to the step S21.

When the ambient light illuminance Ai is in excess of the standby running threshold value SBth (NO at the step S23), on the other hand, the microcomputer 50 terminates the standby running mode, and brings the LED source portion 2 into a suspend standby state (at the step S3 in FIG. 8). In other words, the microcomputer 50 turns off the relay 53 and the LED source portion 2.

In the processing at the steps S23 to S25 and S3, the microcomputer 50 functions as an on-off control means. In the processing at the steps S24 and S25, the microcomputer 50 functions as the illuminance-adaptive driving means. In other words, the microcomputer 50 is programmed to drive the LED source portion 2 in response to the ambient light illuminance.

According to the first embodiment, as hereinabove described, the LED lamp 1 includes the illuminance sensor module 12. Also when the lighting fixture 40 includes no illuminance sensor, therefore, the driven state of the LED source portion 2 can be varied with the ambient illuminance. The illumination axis 35 and the sensitivity axis 23 of the motion sensor module 11 are unparallel to each other, and the motion sensor module 11 is arranged on the longitudinal end portion of the case 4 to improve the appearance of the LED lamp 1 in the lighting-up state while the sensitivity axis 23 is so set that the motion sensor module 11 can excellently sense a human being entering the periphery of the illuminated region 37. Thus, an LED lamp compatibly attaining an excellent appearance in a lighting-up state and an excellent human sensing function can be provided.

According to the first embodiment, further, the motion sensor module 11 can be attached to/detached from the corresponding connector 15 provided on the LED lamp 1, whereby a human sensing function can be arbitrarily added to the LED lamp 1. In other words, the LED lamp 1 designed to be applicable to a specification with no human sensing function and that with a human sensing function in common can be provided. In addition, the motion sensor module 11 having a proper structure can be selected and used in response to the type or the arrangement of the lighting fixture 40. Further, the connectors 15 are provided on both longitudinal end portions of the case 4 respectively, whereby the motion sensor module 11 can be arranged on either end portion of the case 4. Therefore, the arrangement of the motion sensor module 11 can be arbitrarily selected in response to individual circumstances such as the arrangement of the lighting fixture 40.

On the other hand, the LED lamp 1 stores the illuminance sensor module 12, which may detect not only the ambient light illuminance Ai but also the spontaneous light illuminance Si when the LED source portion 2 is in the lighting-up state. According to the first embodiment, therefore, the microcomputer 50 properly processes the output signal of the illuminance sensor module 12 by eliminating influence by the spontaneous light illuminance Si, to control the LED source portion 2 in response to the ambient light illuminance Ai. Thus, the LED lamp 1 having the LED source portion 2 properly controllable in response to the ambient brightness can be provided. Further, the influence by the spontaneous light illuminance Si can be so eliminated that the illuminance sensor module 12 can be freely arranged to some extent, whereby the LED lamp 1 is easy to design.

According to the first embodiment, the microcomputer 50 calculates the spontaneous light illuminance Si on the basis of the driven state of the LED source portion 2 (more specifically, the duty ratio of the PWM control signal). Thus, the microcomputer 50 can correctly estimate the ratio of the contribution of the spontaneous light illuminance Si to the illuminance Di detected by the illuminance sensor module 12. Consequently, the microcomputer 50 can properly evaluate the ambient light illuminance Ai, thereby more properly driving the LED source portion 2 in response to the ambient brightness. Particularly according to the first embodiment, the microcomputer 50 sets the duty ratio responsive to the ambient light illuminance Ai in the standby running mode, whereby the same can reduce the driving power for the LED source portion 2 by reducing the duty ratio as the ambient light illuminance Ai is increased. Thus, the microcomputer 50 can bring the LED source portion 2 into a proper light-emitting state responsive to the ambient brightness, and can also contribute to energy saving.

According to the first embodiment, the LED lamp 1 includes the motion sensor module 11, whereby the microcomputer 50 can drive the LED source portion 2 in response to the presence or absence of a human entrance into the sensitivity region 24 thereof. More specifically, the driving power for the LED source portion 2 is increased to increase the quantity of the light emitted by the LED source portion 2 when the motion sensor module 11 detects a human motion. Thus, the LED source portion 2 emits a necessary quantity of light only when required, whereby an energy saving property can be improved. Further, the LED lamp 1 stores the motion sensor module 11, whereby an illuminator having a human sensing function can be provided also when the lighting fixture 40 includes no motion sensor.

According to the first embodiment, the LED lamp 1 includes the temperature sensor module 13 detecting the temperature of an object present in the temperature sensing region in the vicinity thereof in a noncontact manner, and can sense a stationary human body unsensable by the motion sensor module 11 with the temperature sensor module 13. Further, the microcomputer 50 controls the LED source portion 2 in response to the output signal received from the temperature sensor module 13, whereby the LED source portion 2 is neither turned off nor shifted to the standby running state when a stationary human being is present in the temperature sensing region. In addition, the LED lamp 1 stores the temperature sensor module 13, whereby an illuminator having a stationary human body sensing function can be provided also when the lighting fixture 40 includes no temperature sensor.

Figure 10:
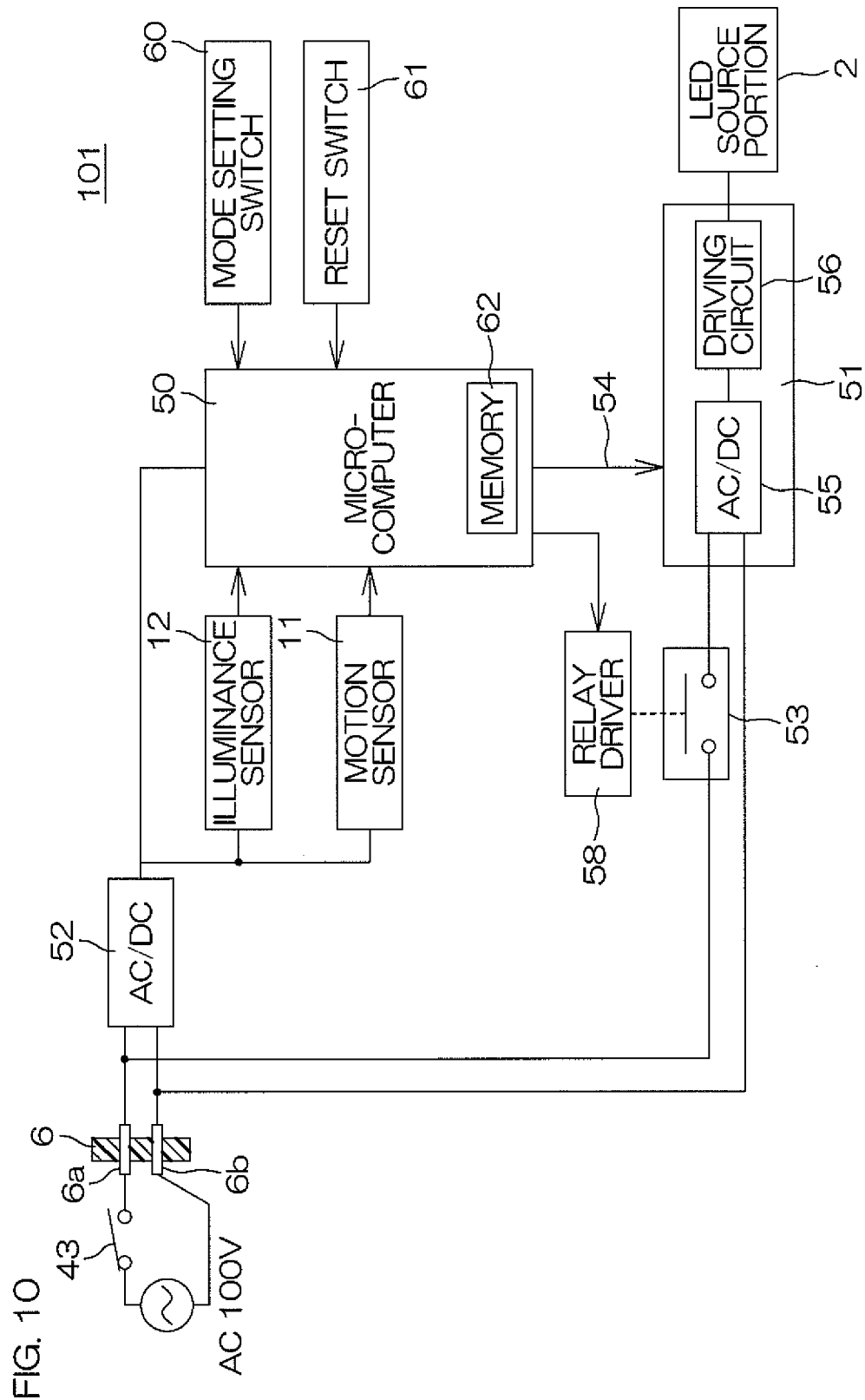
FIG. 10 is a block diagram for illustrating the electrical structure of an LED lamp according to a second embodiment of the first structural example of the present invention.

FIG. 10 is a block diagram for illustrating the electrical structure of an LED lamp 101 according to a second embodiment of the first structural example of the present invention. The LED lamp 101 according to the second embodiment is generally similar in structure to the aforementioned LED lamp 1 according to the first embodiment, and hence the second embodiment is described also with reference to FIGS. 1 to 6B as necessary. Referring to FIG. 10, portions corresponding to those shown in FIG. 8 are denoted by the same reference signs.

The LED lamp 101 according to the second embodiment includes a mode setting switch 60, a reset switch 61, and a memory 62. The LED lamp 101 according to the second embodiment includes no temperature sensor module 13.

The mode setting switch 60 and the reset switch 61 may be arranged in a case 4 or either cap 5 of the LED lamp 101. FIG. 1 shows the mode setting switch 60 and the reset switch 61 arranged in the case 4 with two-dot chain lines.

The mode setting switch 60 is operated by an operator in order to set an operation mode of the LED lamp 101 either to a normal mode or a night-lamp mode. In the normal mode, an LED source portion 2 enters a total lighting-up state when a motion sensor module 11 senses a human being, and enters a lighting-out state when the motion sensor module 11 senses no human being for not less than a constant time. In the night-lamp mode, the LED source portion 2 enters the total lighting-up state when the motion sensor module 11 senses a human being, and enters a standby running state when the motion sensor module 11 senses no human being for not less than the constant time. According to the second embodiment, the LED source portion 2 is driven with constant power (a predetermined constant duty ratio of less than 100%, e.g. about 30%) regardless of ambient light illuminance in the standby running state. According to the second embodiment, further, the LED source portion 2 enters a lighting-out state when the ambient light illuminance exceeds a prescribed standby running threshold in the night-lamp mode.

The memory 62 is a storage means for storing spontaneous light illuminance in the standby running state. The memory 62 is preferably constituted of a rewritable nonvolatile memory capable of holding a storage value also when supplied with no power.

The reset switch 61 is operated by the operator for updating the storage value of the memory 62.

Figure 11A:
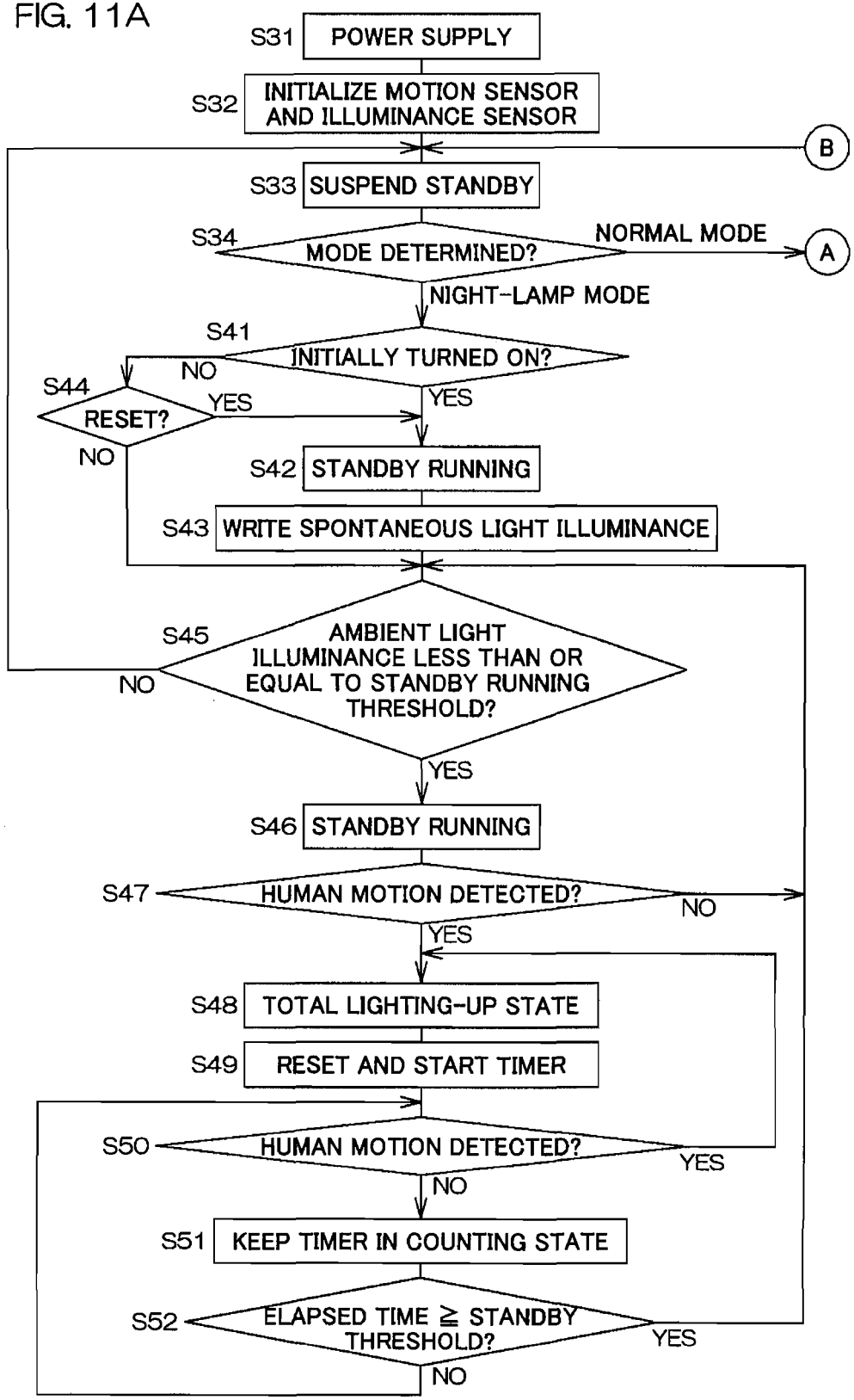
FIG. 11 is a flow chart for illustrating an example of a control operation of processing repeated by a microcomputer every prescribed control cycle.

FIG. 11 is a flow chart for illustrating an example of a control operation of processing repeated by a microcomputer 50 every prescribed control cycle. When a power switch 43 (see FIG. 10) of a lighting fixture 40 is turned on and power is supplied (at a step S31), the microcomputer 50 initializes the motion sensor module 11 and an illuminance sensor module 12 (at a step S32). When power is not yet supplied, a relay 53 is kept in an OFF-state. Immediately after the power supply, the microcomputer 50 keeps the relay 53 in the OFF-state and puts the LED source portion 2 on standby in a lighting-out state (at a step S33). In this state, the microcomputer 50 determines the operation mode set with the mode setting switch 60 (at a step S34).

When the normal mode is set, the microcomputer 50 determines the presence or absence of a human motion in a sensitivity region 24 (see FIG. 6A or 6B) on the basis of an output signal received from the motion sensor module 11 (at a step S35). When no human motion is detected (NO at the step S35), the microcomputer 50 returns to the step S33, and keeps the LED source portion 2 in the lighting-out state. When a human motion is detected (YES at the step S35), on the other hand, the microcomputer 50 totally turns on the LED source portion 2 (at a step S36). More specifically, the microcomputer 50 brings the relay 53 into an ON-state, and supplies a PWM control signal (a continuous running signal) having a duty ratio of 100% to an LED driver 51.

Further, the microcomputer 50 resets an internal timer, and makes the timer start counting (at a step S37). Then, the microcomputer 50 refers to the output signal of the motion sensor module 11, and returns to the step S36 and keeps the LED source portion 2 in the total lighting-up state when the motion sensor module 11 has sensed a human motion (YES at the step S38). When the motion sensor module 11 has sensed no human motion (NO at the step S38), on the other hand, the microcomputer 50 keeps the timer in the counting state (at a step S39). The count of the timer shows the elapsed time from the starting of the timer (sensing no human motion). The microcomputer 50 determines whether or not the elapsed time has reached a prescribed standby threshold (30 seconds, for example) (at a step S40). When the elapsed time does not reach the standby threshold (NO at the step S40), the microcomputer 50 repeats the processing from the step S38. When the elapsed time reaches the standby threshold (YES at the step S40), on the other hand, the microcomputer 50 returns to the step S33, and turns off the relay 53 and the LED source portion 2.

When determining that the operation mode is the night-lamp mode (at the step S34), the microcomputer 50 determines whether or not the LED source portion 2 is initially turned on in the night-lamp mode, i.e., whether or not the LED source portion 2 is turned on in the night-lamp mode for the first time (at a step S41). When determining that the LED source portion 2 is initially turned on in the night-lamp mode (YES at the step S41), the microcomputer 50 turns on the relay 53, and brings the LED source portion 2 into a standby running state (at a step S42). In other words, the microcomputer 50 sets a predetermined standby running duty ratio (about 30%, for example), and supplies a PWM control signal having the duty ratio to the LED driver 51. Thus, the LED source portion 2 enters the standby running state. In this state, the microcomputer 50 incorporates the output signal of the illuminance sensor module 12, and writes the same in the memory 62 as spontaneous light illuminance Si (a writing means at a step S43). The output signal of the illuminance sensor module 12 corresponds to the spontaneous light illuminance Si when ambient light illuminance Ai is zero. Therefore, an instruction indicating that the LED source portion 2 must be initially turned on in the night-lamp mode in an environment with no external light is described in an instruction manual or the like of the LED lamp 101. The operator can write spontaneous light illuminance Si not influenced by external light in the memory 62 by initially turning on the LED source portion 2 in the night-lamp mode according to the instruction.

The determination as to whether or not the LED source portion 2 is initially turned on in the night-lamp mode (at the step S41) can be rephrased as a determination as to whether or not the spontaneous light illuminance Si has already been written in the memory 62.

When determining that the LED source portion 2 is not initially turned on in the night-lamp mode (NO at the step S41), the microcomputer 50 determines whether or not the LED source portion 2 is turned on after the reset switch 61 is operated (at a step S44). When the LED source portion 2 is turned on after the reset switch 61 is operated, the microcomputer 50 performs the processing from the step S42, and writes the spontaneous light illuminance Si in the memory 62 (at the step S43). In other words, the microcomputer 50 updates the storage value in the memory 62. When incapable of initially turning on the LED source portion 2 in the night-lamp mode in an environment with no external light, the operator can correct the spontaneous light illuminance Si by turning on the LED source portion 2 in the night-lamp mode after he/she has operated the reset switch 61. This may also be described in the instruction manual of the LED lamp 101.

Thus, the microcomputer 50 is inhibited from writing the spontaneous light illuminance Si in the memory 62 after setting the night-lamp mode and supplying power when the spontaneous light illuminance Si has already been written in the memory 62, and allowed to write the spontaneous light illuminance Si in the memory 62 when the spontaneous light illuminance Si is not yet written in the memory 62. When the spontaneous light illuminance Si has already been written in the memory 62 and hence the microcomputer 50 is inhibited from writing the spontaneous light illuminance Si in the memory 62, on the other hand, the operator can cancel the inhibition by operating the reset switch 62. In other words, the reset switch 62 serves as an inhibition canceling operation means. When the operator operates the reset switch 62, the microcomputer 50 is allowed to write the spontaneous light illuminance Si in the memory 62 once.

After writing the spontaneous light illuminance Si in the memory 62 (at the step S43) or the operator has not operated the reset switch 61 in a lighting-up state after a second night-lamp mode (NO at the step S44), the microcomputer 50 incorporates the output signal of the illuminance sensor module 12. In the standby running state, the illuminance sensor module 12 detects not only the ambient light, but also light emitted by the LED source portion 2 turned on in the standby running state. In other words, the ambient light illuminance Ai and spontaneous light illuminance Si contributed by the light emitted from the LED source portion 2 are superposed in the output signal of the illuminance sensor module 12. Therefore, the microcomputer 50 determines whether or not the ambient light illuminance Ai obtained by subtracting the spontaneous light illuminance Si (stored in the memory 62) from the output signal of the illuminance sensor module 12 is less than or equal to a standby running threshold SBth (a comparison means at a step S45). The microcomputer 50 may make the determination by determining whether or not illuminance Di (=Si+Ai) detected by the illuminance sensor module 12 is less than or equal to a value (Si+SBth) obtained by adding the spontaneous light illuminance Si (stored in the memory 62) to the standby running threshold SBth, i.e., whether or not Di≤Si+SBth. The microcomputer 50 may obtain the ambient light illuminance Ai (=Di−Si) by subtracting the spontaneous light illuminance Si (stored in the memory 62) from the illuminance Di detected by the illuminance sensor module 12 to determine whether or not the ambient light illuminance Ai is less than or equal to the standby running threshold SBth, i.e., whether or not Di−Si≤SBth, as a matter of course.

When the ambient light illuminance Ai is less than or equal to the standby running threshold SBth (YES at the step S45), the microcomputer 50 sets a prescribed standby running duty ratio (about 30%, for example), and supplies a PWM control signal having the duty ratio to the LED driver 51 (at a step S46). Thus, it follows that the microcomputer 50 drives the LED source portion 2 with power responsive to the duty ratio, and brings the LED source portion 2 into a standby running state.

When the ambient light illuminance Ai is in excess of the standby running threshold SBth (NO at the step S45), on the other hand, the microcomputer 50 brings the LED source portion 2 into a suspend standby state (at the step S33). In other words, the microcomputer 50 turns off the relay 53 and the LED source portion 2.

When the LED source portion 2 is in a lighting-out state, the illuminance sensor module 12 detects only the ambient light illuminance Ai (i.e., Di=Ai). In other words, the spontaneous light illuminance Si is zero. While the determination at the step S45 (the determination with the spontaneous light illuminance Si (>0) stored in the memory 62) may be applied as such also at this time, the microcomputer 50 may regard the spontaneous light illuminance Si as zero without employing the spontaneous light illuminance Si stored in the memory 62, to compare the detected illuminance Di and the standby running threshold SBth with each other as such.

When the LED source portion 2 enters the standby running state (at the step S46), the microcomputer 50 determines the presence or absence of a human motion in the sensitivity region 24 (see FIG. 6A or 6B) on the basis of the output signal received from the motion sensor module 11 (at a step S47). When the motion sensor module 11 detects no human motion (NO at the step S47), the microcomputer 50 repeats the processing from the step S45. When the motion sensor module 11 detects a human motion (YES at the step S47), on the other hand, the microcomputer 50 totally turns on the LED source portion 2 (at a step S48). More specifically, the microcomputer 50 supplies a PWM control signal (a continuous running signal) having a duty ratio of 100% to the LED driver 51.

Then, the microcomputer 50 resets an internal timer, and makes the timer start counting (at a step S49). The microcomputer 50 further refers to the output signal of the motion sensor module 11, and returns to the step S48 when the motion sensor module 11 has sensed a human motion (YES at a step S50), to keep the LED source portion 2 in the total lighting-up state. When the motion sensor module 11 senses no human motion (NO at the step S50), on the other hand, the microcomputer 50 keeps the timer in the counting state (at a step S51). The count of the timer shows the elapsed time from the starting of the timer (sensing no human motion). The microcomputer 50 determines whether or not the elapsed time has reached a prescribed standby threshold (30 seconds, for example) (at a step S52). When the elapsed time has not yet reached the standby threshold (NO at the step S52), the microcomputer 50 repeats the processing from the step S50. When the elapsed time reaches the standby threshold (YES at the step S52), the microcomputer 50 returns to the step S45 to determine the ambient light illuminance Ai, and brings the LED source portion 2 into a standby running state when the ambient light illuminance Ai is less than or equal to the standby running threshold SBth (at the step S46).

At the steps S46 and S33, the microcomputer 50 functions as an on-off control means. In other words, the microcomputer 50 is programmed to on-off control the LED source portion 2 in response to the results of sensing of the motion sensor module 11 and the illuminance sensor module 12.

The mode setting switch 60 is a running instruction means instructing running in the night-lamp mode or the normal mode. When power is supplied in a state where the night-lamp mode is set with the mode setting switch 60, the microcomputer 50 writes the output signal of the illuminance sensor module 12 in the memory 62 as the spontaneous light illuminance Si, and hence the mode setting switch 60 functions as a writing instruction means for writing the spontaneous light illuminance Si.

According to the second embodiment, as hereinabove described, the microcomputer 50 can easily write the spontaneous light illuminance Si in the memory 62 by initially turning on the LED source portion 2 in the night-lamp mode in an environment with no external light. The microcomputer 50 can properly evaluate the ambient light illuminance Ai based on the output signal (the detected illuminance Di) of the illuminance sensor module 12 by employing the spontaneous light illuminance Si written in the memory 62. Further, the microcomputer 50 can also rewrite the value stored in the memory 62 by turning on the LED lamp 1 in the night-lamp mode after the operator operates the reset switch 61. Also when initially turning on the LED source portion 2 in the night-lamp mode in an environment with external light, therefore, the microcomputer 50 can write correct spontaneous light illuminance Si in the memory 62 by a subsequent operation.

Figure 12:
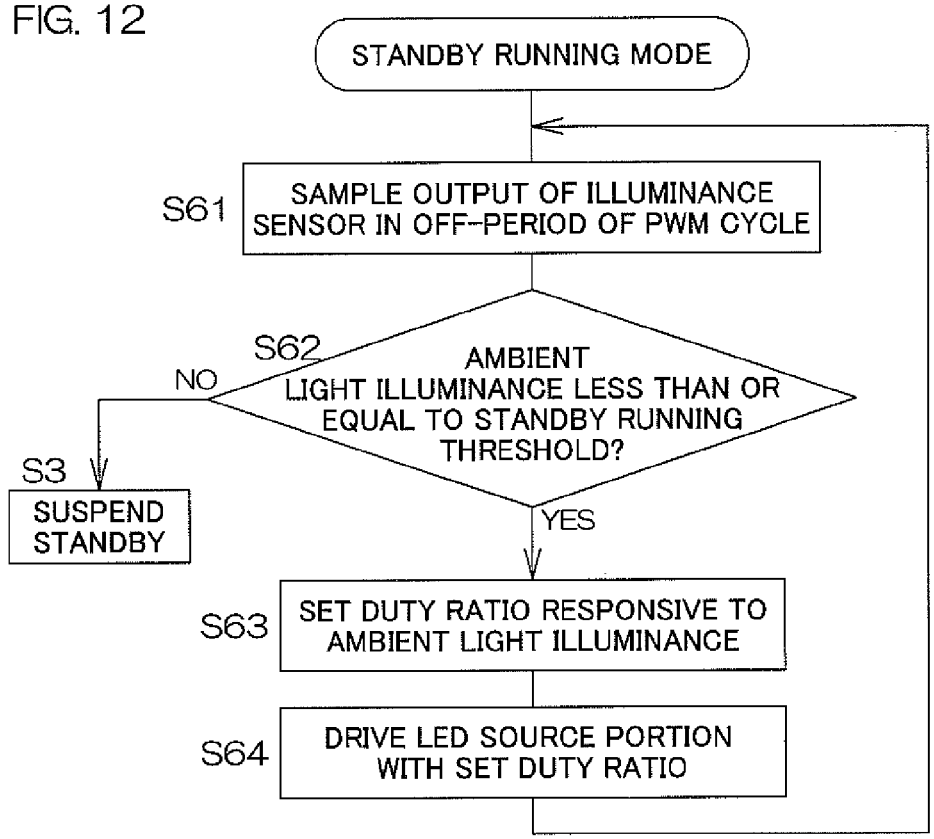
FIG. 12 is a flow chart for illustrating a third embodiment of the first structural example of the present invention, showing an operation in a standby running mode applicable in place of the standby running mode shown in FIG. 9.

FIG. 12 is a flow chart for illustrating a third embodiment of the first structural example of the present invention, showing an operation in a standby running mode applicable in place of the aforementioned standby running mode shown in FIG. 9. In the following description of the third embodiment, FIGS. 1 to 8 are also referred to.

In the standby running mode (at the step S6 in FIG. 8), a microcomputer 50 samples an output signal of an illuminance sensor module 12 (at a step S61). In the standby running mode, the illuminance sensor module 12 detects not only ambient light, but also light emitted by an LED source portion 2 turned on in a standby running state. In the standby running state, however, the LED source portion 2 is turned on in an ON-period of a PWM cycle, and turned of in an OFF-period. Therefore, the microcomputer 50 samples the output signal of the illuminance sensor module 12 in the OFF-period of the PWM cycle (a sampling means at the step S61). The microcomputer 50 can employ the sampled output signal of the illuminance sensor module 12 as ambient light illuminance Ai.

Then, the microcomputer 50 determines whether or not the ambient light illuminance Ai (the value sampled at the step S61) is less than or equal to a standby running threshold SBth (at a step S62). When the ambient light illuminance Ai is less than or equal to the standby running threshold SBth (YES at the step S62), the microcomputer 50 sets a duty ratio responsive to the ambient light illuminance Ai (a duty ratio setting means at a step S63), and supplies a PWM control signal having the duty ratio to an LED driver 51 (a PWM control means at a step S64). Thus, it follows that the microcomputer 50 drives the LED source portion 2 with power responsive to the duty ratio, i.e., power responsive to ambient brightness.

When the ambient light illuminance Ai is in excess of the standby running threshold SBth, on the other hand, the microcomputer 50 terminates the standby running mode, and brings the LED source portion 2 into a suspend standby state (at the step S3 in FIG. 8). In other words, the microcomputer 50 turns off a relay 53 and the LED source portion 2.

The microcomputer 50 may not necessarily variably set the duty ratio of the PWM control signal in response to the ambient light illuminance Ai, but may fix the duty ratio in the standby running state to a constant value (about 30%, for example). In this case, the processing at the step S63 may be omitted, and the microcomputer 50 may generate a PWM control signal of the constant duty ratio at the step S64.

Figure 13:
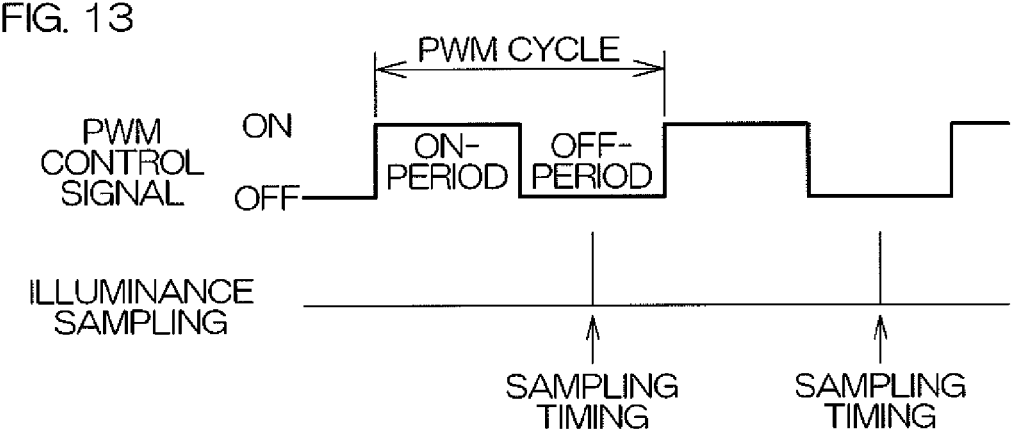
FIG. 13 is an illustrative timing chart for illustrating timing for sampling an output signal of an illuminance sensor module in the standby running mode.

FIG. 13 is an illustrative timing chart for illustrating timing for sampling the output signal of the illuminance sensor module 12 in the standby running mode. The microcomputer 50 generates a PWM control signal having a constant PWM frequency. When the PWM frequency is 1 kHz, for example, a PWM cycle is 1 millisecond. The microcomputer 50 sets the duty ratio to less than 100% in the standby running state, and hence the PWM cycle includes an ON-period and an OFF-period. The LED driver 51 energizes the LED source portion 2 in the ON-period, and cuts off power supply to the LED source portion 2 in the OFF-period. The microcomputer 50 samples the output signal of the illuminance sensor module 12 at timing in the OFF-period (preferably around the center of the period) of the PWM cycle. The time required for the sampling is on the order of microseconds, and hence the microcomputer 50 can complete the sampling in the OFF-period of the PWM cycle. When the PWM frequency is set to not less than 200 Hz, the LED source portion 2 appears to human eyes to continuously emit light. Therefore, the microcomputer 50 can detect the ambient light illuminance Ai by eliminating influence by spontaneous light illuminance Si while keeping the standby running mode in an apparent continuous lighting-up state.

Thus, according to the third embodiment, the microcomputer 50 samples the output signal of the illuminance sensor module 12 in the OFF-period of the PWM cycle, whereby the same can detect correct ambient light illuminance Ai by eliminating influence by the spontaneous light illuminance Si. Further, the microcomputer 50 can properly control the LED source portion 2 in response to the ambient brightness by employing the correct ambient light illuminance Ai.

Figure 14:
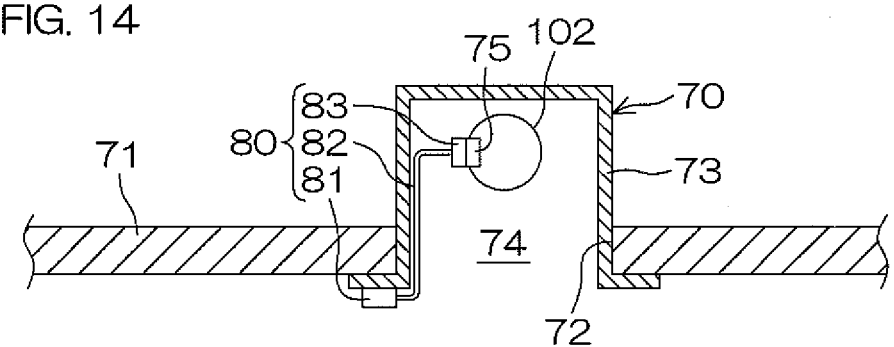
FIG. 14 is a sectional view for illustrating the structure of an LED lamp according to a fourth embodiment of the first structural example of the present invention.

FIG. 14 is a sectional view for illustrating the structure of an LED lamp 102 according to a fourth embodiment of the first structural example of the present invention. The LED lamp 102 has a structure similar to that a straight fluorescent lamp similar to the aforementioned LED lamps 1 and 101, and is mounted on a recessed lighting fixture 70, for example. The lighting fixture 70 has a fixture body 73 fitted into an opening 72 formed in a ceiling 71, for example. The fixture body 73 partitions a space 74 opened toward a lower portion of the ceiling 71. The LED lamp 102 is held in the space 74. The inner surface of the fixture body 73 functions as a reflecting surface reflecting light received from the LED lamp 102 downward.

The LED lamp 102 is provided on a side portion of a case thereof with a connector 75 electrically connected to a motion sensor module 80. The motion sensor module 80 includes a sensor body 81, a lead wire 82 extending from the sensor body 81, and a plug 83 fixed to an end portion of the lead wire 82. The plug 83 is formed to be couplable to the connector 75, and electrically connects the lead wire 82 to the connector 75.

According to this structure, the sensor body 81 can be arranged on a position separating from the case of the LED lamp 102 outside the space 74 partitioned by the fixture body 73 as shown in FIG. 14, for example. If the LED lamp 1 shown in FIG. 1 etc. is applied to the recessed lighting fixture 70 as such, the sensitivity region 24 of the motion sensor module 11 may interfere with the fixture body 73, to narrow a general sensitivity region. When the motion sensor module 80 shown in FIG. 14 is employed and the sensor body 81 is arranged downward beyond the LED lamp 102, the whole of a sensitivity region of the sensor body 81 can be employed. A proper sensitivity region can be set by rendering a sensitivity axis of the sensor body 81 unparallel to an illumination axis of the LED lamp 102. The direction of the sensitivity axis may be so set that a sensitivity region conforming to a region illuminated by the LED lamp 102 is obtained, for example.

The sensor body 81, arranged outside the fixture body 73 in FIG. 14, may alternatively be arranged in the fixture body 73 (in the space 74: on an inner wall surface of the fixture body 73, for example). The connector 75 may not necessarily be arranged on the side portion of the LED lamp 102, but may be arranged on a lower or upper portion. If the connector 75 is arranged on the lower portion, however, the portion of the connector 75 may be darkened to deteriorate the appearance of the LED lamp 102, when the LED lamp 102 is turned on. If the connector 75 is arranged on the upper portion, it may be difficult to connect the plug 83 in the state where the LED lamp 102 is mounted on the lighting fixture 70.

Figure 15:
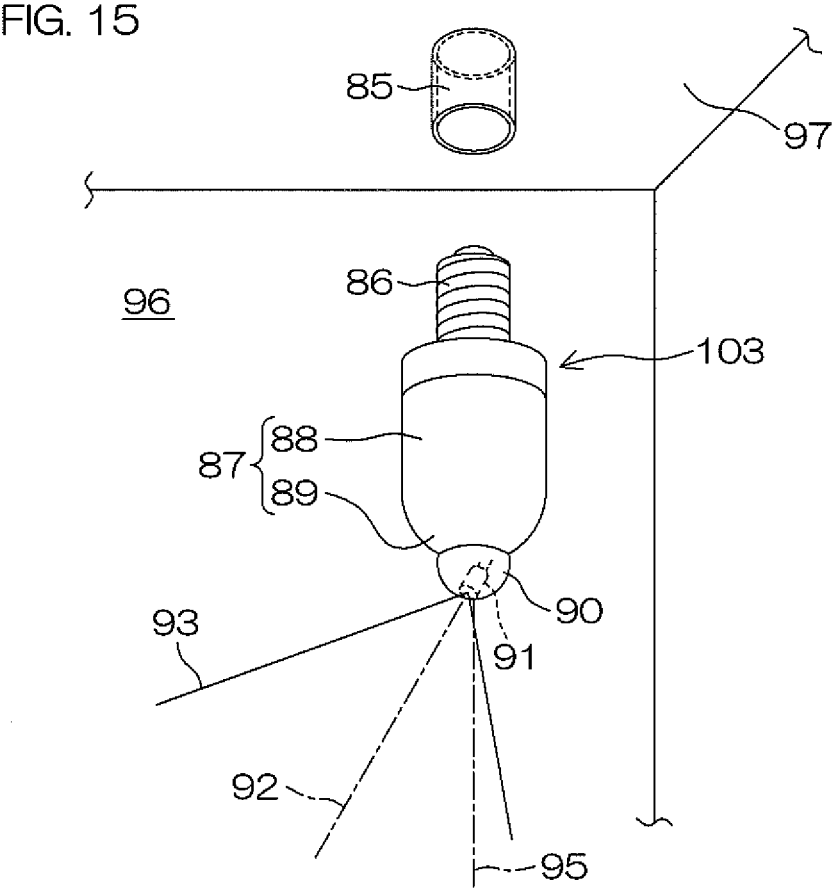
FIG. 15 is a perspective view showing an LED lamp according to a fifth embodiment of the first structural example of the present invention.

FIG. 15 is a perspective view showing an LED lamp 103 according to a fifth embodiment of the first structural example of the present invention. The LED lamp 103 is in the form of a bulb having a base 86 couplable to a bulb socket 85 and a case 87. The case 87 integrally includes a cylindrical portion 88 and a dome portion 89 formed on a side opposite to the base 86, and has a rotation-symmetrical shape. A semispherically projecting protrusion 90 is formed around the center of the dome portion 89, to store a motion sensor 91.

A sensitivity axis 92 of the motion sensor 91 is inclined with respect to an illumination axis 95 which is a center axis of the LED lamp 103. The motion sensor 91 has a conical sensitivity region 93 centering on the sensitivity axis 92.

The LED lamp 103 is mounted on the bulb socket 85 arranged on a corner of a ceiling 97 of a room 96, for example. In this case, the illumination axis 95 is along the vertical direction, while the sensitivity axis 92 is inclined with respect to the vertical direction, and directed toward the center of the room 96, for example. Thus, the sensitivity region 93 spreads toward the center of the room 96, whereby the motion sensor 91 can easily sense a human being entering the room 96.

A connector capable of detachably mounting a motion sensor module may be provided in the case 87 after the structure shown in FIG. 1 etc., so that the motion sensor module storing the motion sensor 91 can be arbitrarily connected to the connector.

Figure 16:
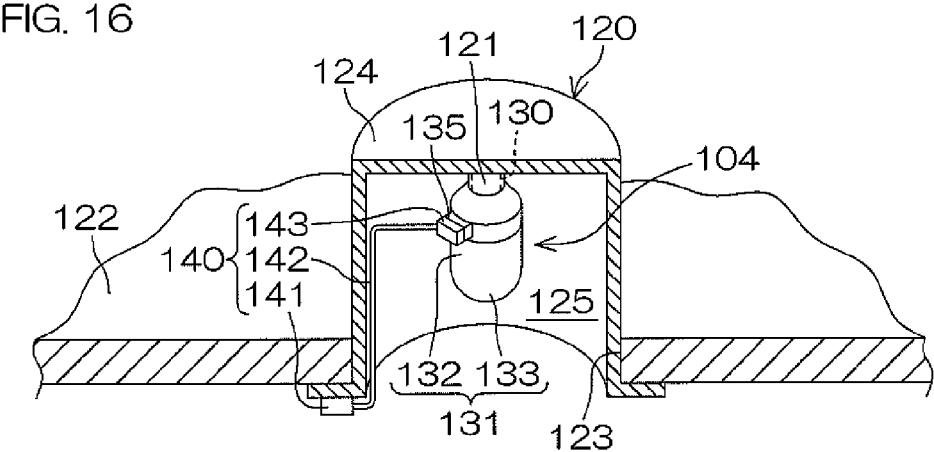
FIG. 16 is a perspective view showing an LED lamp according to a sixth embodiment of the first structural example of the present invention.

FIG. 16 is a perspective view showing an LED lamp 104 according to a sixth embodiment of the first structural example of the present invention. The LED lamp 104 is in the form of a bulb mounted on a bulb socket 121 provided on a recessed lighting fixture 120. The lighting fixture 120 has a fixture body 124 fitted into an opening 123 formed in a ceiling 122, for example. The fixture body 124 is in the form of a cylinder having a flange on a lower portion, for example, and partitions a space 125 opened toward a lower portion of the ceiling 122. The LED lamp 104 is held in the space 125. The inner surface of the fixture body 124 functions as a reflecting surface reflecting light received from the LED lamp 104 downward.

The LED lamp 104 has a base 130 couplable to the bulb socket 121 and a case 131. The case 131 integrally includes a cylindrical portion 132 and a dome portion 133 formed on a side opposite to the base 130, and has a rotation-symmetrical shape. A connector 135 electrically connected to a motion sensor module 140 is provided on a side portion of the case 131 (an upper end portion of a side surface of the case 131 in the example shown in FIG. 16). The motion sensor module 140 includes a sensor body 141, a lead wire 142 extending from the sensor body 141, and a plug 143 fixed to an end portion of the lead wire 142. The plug 143 is formed to be couplable to the connector 135, and electrically connects the lead wire 142 to the connector 135.

According to this structure, the sensor body 141 can be arranged on a position separating from the LED lamp 140, e.g. outside the space 125 partitioned by the fixing body 124, as shown in FIG. 16. If an LED lamp of a mode such as that shown in FIG. 15 is applied to the recessed lighting fixture 120 as such, a sensitivity region of a motion sensor may interfere with the fixture body 124, to narrow a general sensitivity region. When the motion sensor module 140 shown in FIG. 16 is employed and the sensor body 141 is arranged downward beyond the LED lamp 104, therefore, the whole of a sensitivity region of the sensor body 141 can be employed. A proper sensitivity region can be set by rendering a sensitivity axis of the sensor body 141 unparallel to an illumination axis of the LED lamp 104. The direction of the sensitivity axis may be so set that a sensitivity region conforming to a region illuminated by the LED lamp 104 is obtained, for example.

The sensor body 141, arranged outside the fixture body 124 in FIG. 16, may alternatively be arranged in the fixture body 124 (in the space 125: on the inner wall surface of the fixture body 124, for example). The connector 135 may not necessarily be arranged on the side portion of the LED lamp 104, but may be arranged on a lower portion or upper surface. If the connector 135 is arranged on the lower portion, however, the portion of the connector 135 may be darkened to deteriorate the appearance of the LED lamp 104, when the LED lamp 104 is turned on. If the connector 135 is arranged on the upper surface, it may be difficult to connect the plug 143 in the state where the LED lamp 104 is mounted on the lighting fixture 120.

Figure 17:
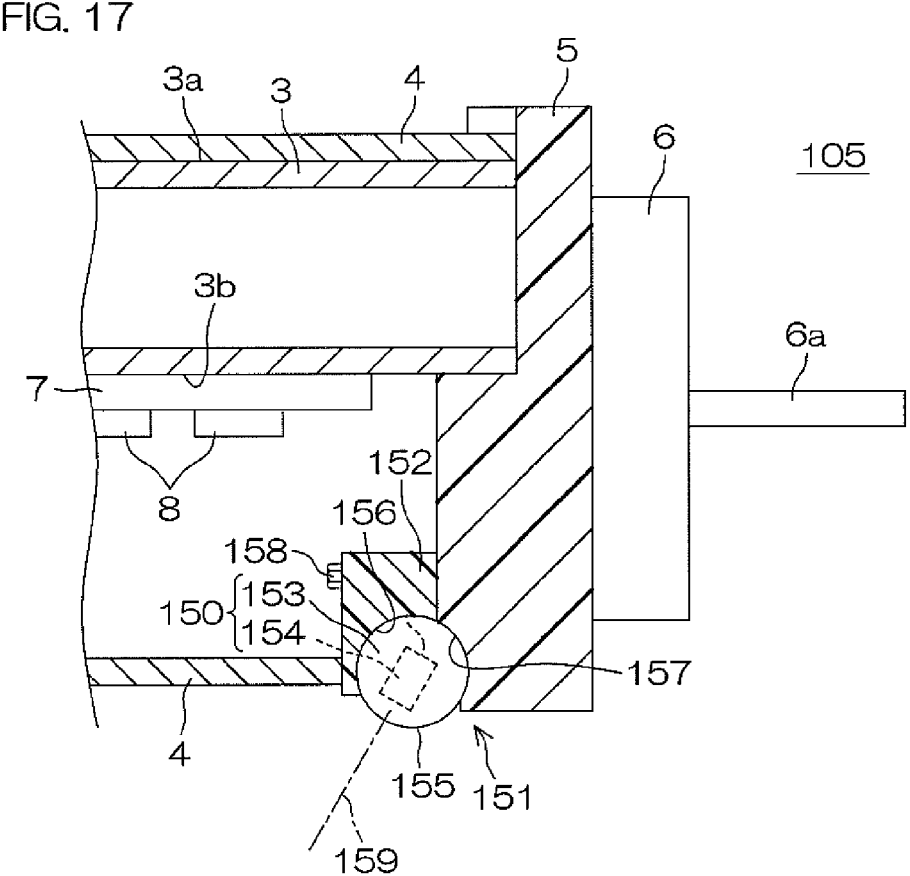
FIG. 17 is a sectional view partially showing the structure of an LED lamp according to a seventh embodiment of the first structural example of the present invention.

FIG. 17 is a sectional view partially showing the structure of an LED lamp 105 according to a seventh embodiment of the first structural example of the present invention. Referring to FIG. 17, portions corresponding to those shown in FIG. 2 are denoted by the same reference signs. The LED lamp 105 includes a sensor mounting structure 151 mounting a motion sensor module 150 on a case 4 so that the attitude thereof is changeable. The sensor mounting structure 151 includes a cap 5, a module holding member 152 coupled to the cap 5, and a module case 153 of the motion sensor module 150. The motion sensor module 150 includes the module case 153 and a sensor body 154 stored in the module case 153. The module case 153 is spherically formed, and has a spherical outer surface 155.

The module holding member 152 is fixed to the cap 5 from the side of the inner surface with a fixing means such as a bolt 158. The cap 5 and the module holding member 152 have partial spherical surfaces 156 and 157 respectively. The partial spherical surfaces 156 and 157 are equal in curvature to the outer surface 155 of the module case 153. When the module holding member 152 is coupled to the cap 5, the partial spherical surfaces 156 and 157 are continuous with each other, to form a partial spherical surface slightly larger than a semi spherical surface. The module case 153 is held in a space partitioned by the partial spherical surface. Therefore, the module case 153 can change the attitude thereof in the state held by the cap 5 and the module holding member 152. Following the attitude change, the direction of a sensitivity axis 159 of the sensor body 154, and it follows that a sensitivity region changes in response thereto. Therefore, the user of the LED lamp 105 can direct the sensitivity axis 159 toward a proper direction in response to the mounting position or conditions of use of the LED lamp 105. In other words, the user can direct the sensitivity axis 159 of the motion sensor module 150 not only toward the longitudinal direction of the case 4 but also toward an arbitrary direction including that orthogonal to the longitudinal direction.

Figure 18:
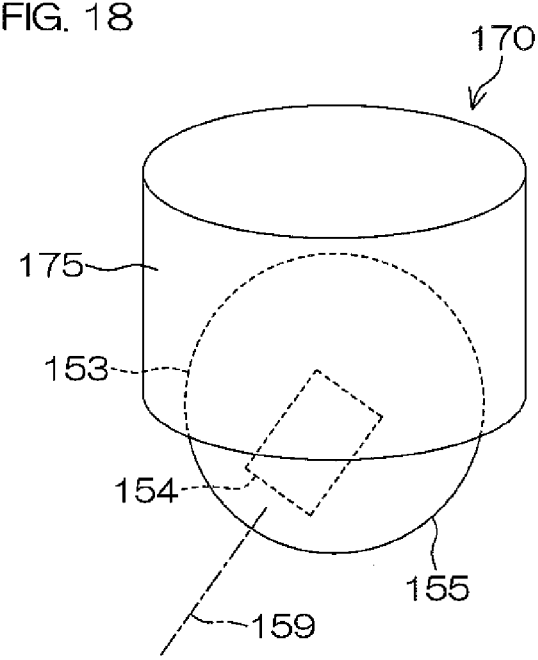
FIG. 18 is a perspective view showing another structural example of the motion sensor module.
Figure 19:
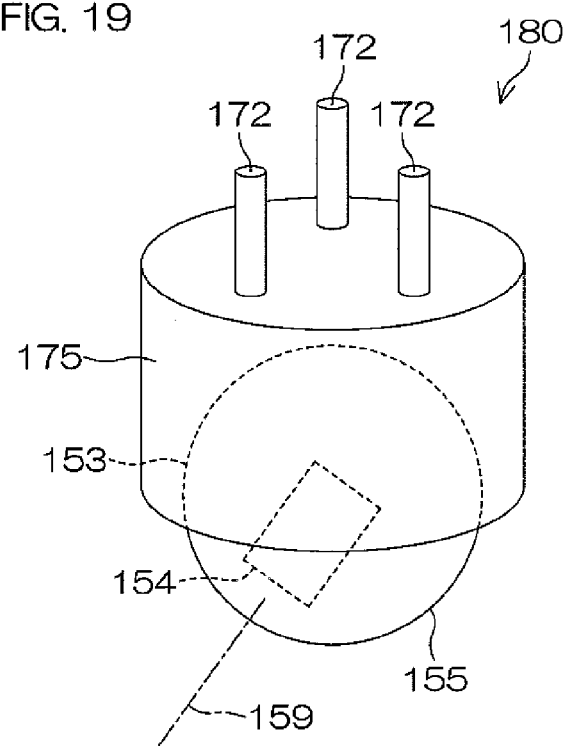
FIG. 19 is a perspective view showing still another structural example of the motion sensor module.

As shown in FIG. 18, a motion sensor module 170 may be formed to include a holding case 175 rotatably holding a spherical module case 153, to be mounted on the case 4 or the cap 5. As shown in FIG. 19, further, a motion sensor module 180 may be formed by embedding terminal pins 172 electrically connected with a sensor body 154 in a holding case 175. The motion sensor module 180 can be employed in place of the motion sensor module 11 shown in FIG. 1 etc. Thus, the user can more freely set the direction of the sensitivity axis of the motion sensor in the LED lamp 1 shown in FIG. 1 etc.

Figure 20:
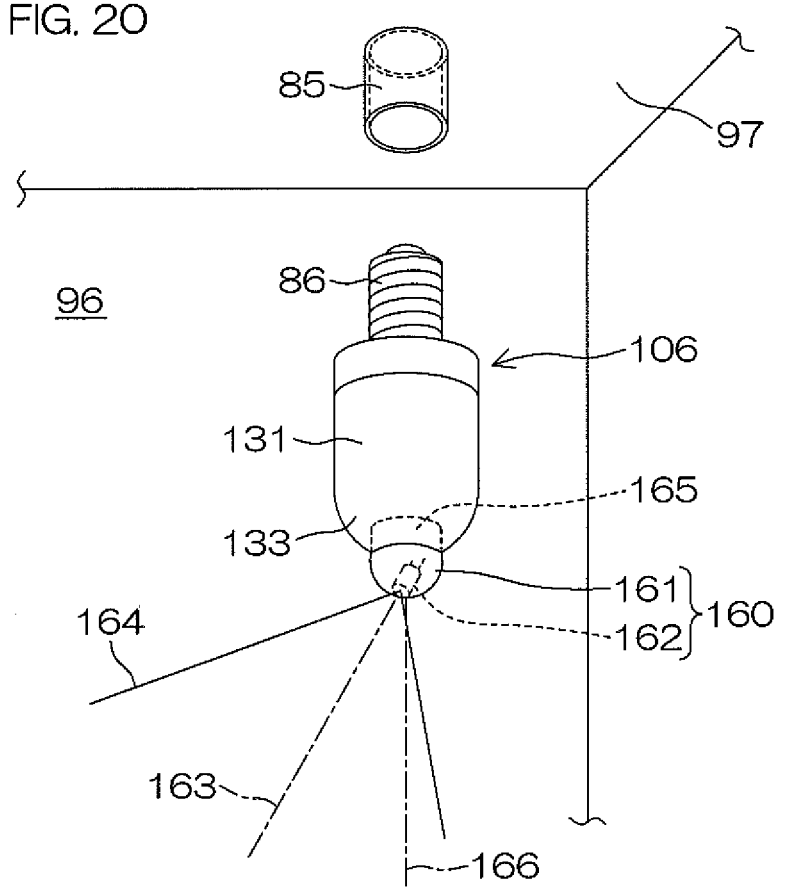
FIG. 20 is a perspective view for illustrating the structure of an LED lamp according to an eighth embodiment of the first structural example of the present invention.

FIG. 20 is a perspective view for illustrating the structure of an LED lamp 106 according to an eighth embodiment of the first structural example of the present invention. Referring to FIG. 20, portions corresponding to those shown in FIG. 15 are denoted by the same reference signs.

The LED lamp 106 has a sensor mounting structure 165 rotatably mounting a motion sensor module 160 on a top portion of a dome portion 133 of a case 131. The motion sensor module 160 has a module case 161, and a sensor body 162 stored in the module case 161. In a state where the motion sensor module 160 is mounted on the case 131 through the sensor mounting structure 165, a sensitivity axis 163 of the sensor body 162 is inclined with respect to an illumination axis 166 of the LED lamp 106. In other words, the sensor body 162 is so fixed to the module case 161 that the sensitivity axis 163 is along such a direction. The sensor mounting structure 165 mounts the motion sensor module 160 on the case 131 in a state rotatable on the illumination axis 166. Thus, the user of the LED lamp 106 can set a proper sensitivity region 164 by directing the sensitivity axis 163 toward a proper direction in response to the mounting position or conditions of use of the LED lamp 106.

Similarly to the seventh embodiment shown in FIG. 17, the module case 161 may be spherically formed, and the sensor mounting structure 165 may mount the module case 161 on the case 131 to be rotatable in an arbitrary direction. Thus, the sensitivity axis 163 of the motion sensor module 160 can be directed toward an arbitrary direction. Further, the aforementioned motion sensor module 170 shown in FIG. 18 may be mounted on the case 131. In addition, a connector capable of detachably mounting a motion sensor module may be provided in the case 131, so that the aforementioned motion sensor module 180 shown in FIG. 19 is arbitrary connected to the connector.

Figure 21:
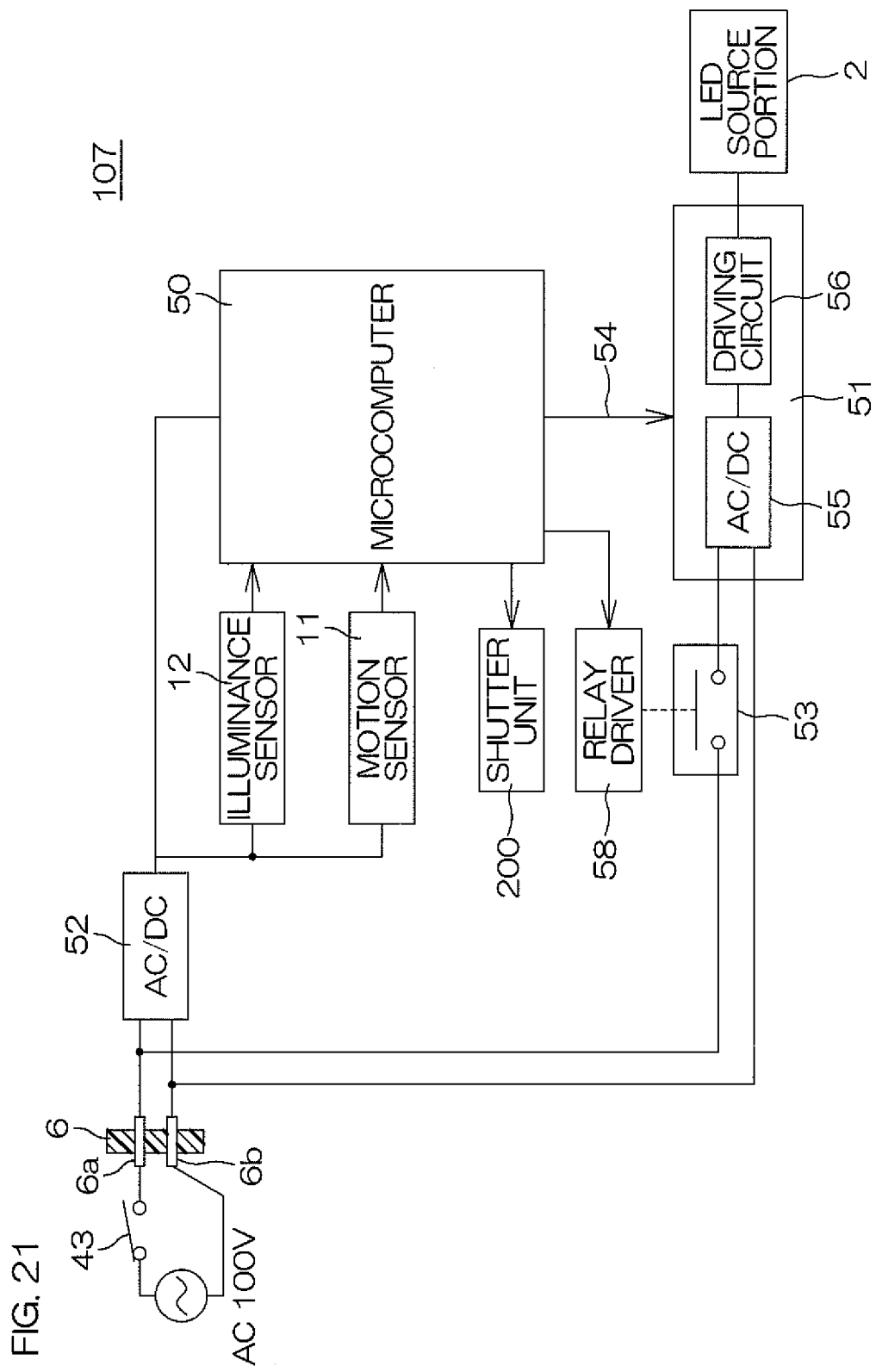
FIG. 21 is a block diagram for illustrating the electrical structure of an LED lamp according to a ninth embodiment of the first structural example of the present invention.

FIG. 21 is a block diagram for illustrating the electrical structure of an LED lamp 107 according to a ninth embodiment of the first structural example of the present invention. Referring to FIG. 21, portions corresponding to those shown in FIG. 7 are denoted by the same reference signs. In the following description of the ninth embodiment, FIGS. 1 to 6 and 9 are also referred to as necessary, and the ninth embodiment is described mainly with reference to points different from those of the first embodiment.

The LED lamp 107 includes a shutter unit 200 opening/closing an infrared incidence path to a motion sensor module 11. A microcomputer 50 is programmed to determine the presence or absence of a stationary human being in the vicinity of the LED lamp 107 on the basis of an output signal received from the motion sensor module 11 when opening/closing (e.g. periodically shutting) the infrared incidence path to the motion sensor module 11 by driving the shutter unit 200. According to the ninth embodiment, the LED lamp 107 is provided with no temperature sensor module 13 (see FIG. 7 etc.).

Figure 22:
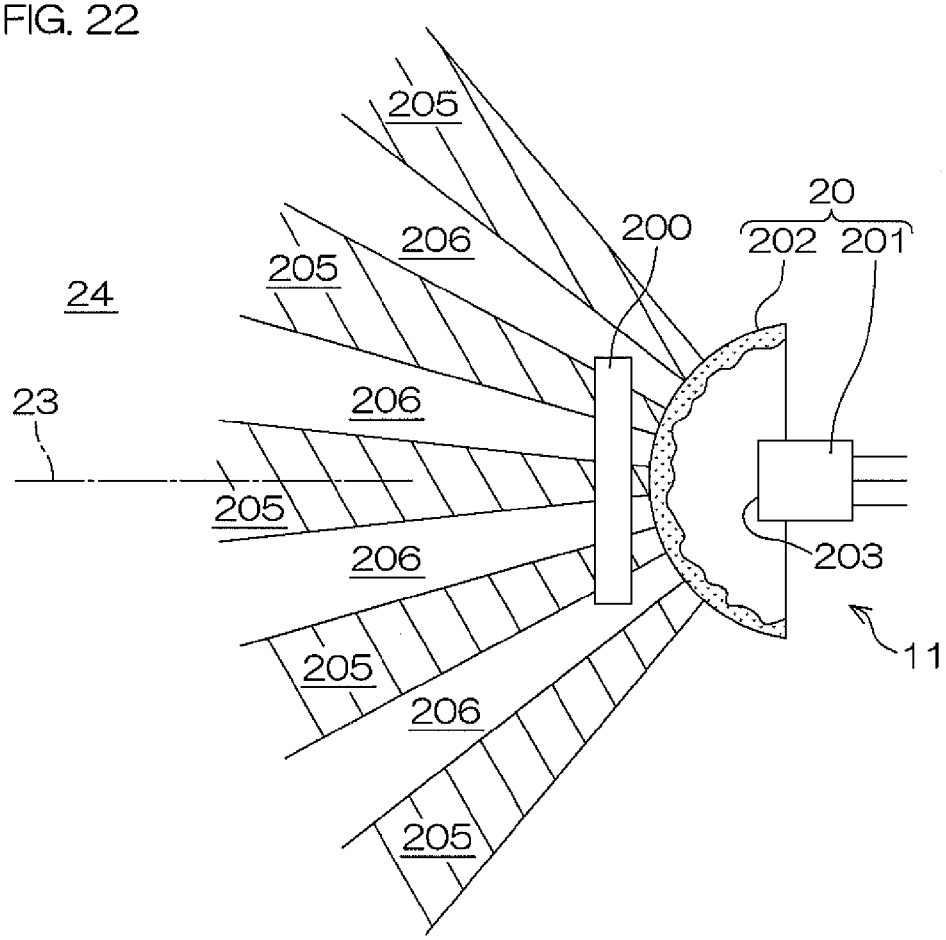
FIG. 22 is a diagram for illustrating the positional relation between a pyroelectric infrared sensor provided on the motion sensor module and a shutter unit.

FIG. 22 is a diagram for illustrating the positional relation between the motion sensor module 11 and the shutter unit 200. A sensor body 20 of the motion sensor module 11 includes a pyroelectric infrared sensor 201 and a Fresnel lens 202. The pyroelectric infrared sensor 201 has a photoreceiving surface 203 directed toward a sensitivity axis 23. The Fresnel lens 202 is in the form of a dome (a semisphere) covering the photoreceiving surface 203. The Fresnel lens 202 irregularizes a detection field of the pyroelectric infrared sensor 201. In other words, the pyroelectric infrared sensor 201 is capable of sensing only infrared rays radiated from a radiator (a human body) positioned in any sensable region 205 shown with slant lines due to a condensing action of the Fresnel lens 202, and regions other than the sensable regions 205 are unsensable regions 206 where the pyroelectric infrared sensor 201 is incapable of sensing radiation of infrared rays. When an infrared radiator such as a human body moves across any sensable region 205 and an unsensable region 206 adjacent thereto, the temperature of the photoreceiving surface 203 changes. Therefore, the pyroelectric infrared sensor 201 generates electromotive force resulting from a pyroelectric effect, and outputs a signal responsive therefore. When a human being moves in a sensitivity region 24 centering on the sensitivity axis 23, therefore, an output signal of the motion sensor module 11 changes. Thus, the pyroelectric infrared sensor 201 can sense a human entrance into the sensitivity region 24 and a human movement in the sensitivity region 24.

When a human being stands still in the sensitivity region 24, the state of infrared incidence upon the photoreceiving surface 203 of the pyroelectric infrared sensor 201 remains unchanged so that the temperature of the photoreceiving surface 203 also remains unchanged, and hence the pyroelectric infrared sensor 201 generates no electromotive force resulting from a pyroelectric effect.

According to the ninth embodiment, therefore, the shutter unit 200 is arranged in a region ahead of (immediately ahead of the Fresnel lens 202 in the ninth embodiment) the photoreceiving surface 203 centering on the sensitivity axis 23. More specifically, the shutter unit 200 is arranged in the infrared incidence path between the photoreceiving surface 203 and an illuminated region 37. The shutter unit 200 may be formed by a liquid crystal shutter unit. In this case, infrared rays from a radiator present in the sensitivity region 24 enter the photoreceiving surface 203 of the pyroelectric infrared sensor 201 when the liquid crystal shutter unit is brought into a translucent state (a state transmitting the infrared rays). When the liquid crystal shutter unit is brought into a shielding state (a state blocking the infrared rays), on the other hand, no infrared rays enter the photoreceiving surface 203 of the pyroelectric infrared sensor 201. Alternatively, the shutter unit 200 may be formed by a unit mechanically shutting the infrared incidence path. A structure rotating a shutter plate with an electric motor can be employed as a mechanical shutter unit. Translucent portions (portions transmitting infrared rays) and shielding portions (portions blocking infrared rays) are alternately formed on the shutter plate in relation to a rotational direction, for example. The electric motor rotates the shutter plate on an axis of rotation set parallelly to the sensitivity axis 23 on a position deviating therefrom. Therefore, the translucent portions and the shielding portions are alternately positioned in front of the photoreceiving surface 203 of the pyroelectric infrared sensor 201, due to the rotation of the shutter plate. Therefore, a state where the infrared rays from the radiator present in the sensitivity region 24 enter the photoreceiving surface 203 and a state where the infrared rays do not enter the photoreceiving surface 203 can be switched by controlling the rotational position of the shutter plate. In the following description, a state of the shutter unit 200 transmitting the infrared rays from the radiator present in the sensitivity region 24 through the photoreceiving surface 203 is referred to as an "open state" or the like, and a state of the shutter unit 200 shutting the incidence path of the infrared rays to the photoreceiving surface 203 is referred to as a "closed state" or the like.

Figure 23:
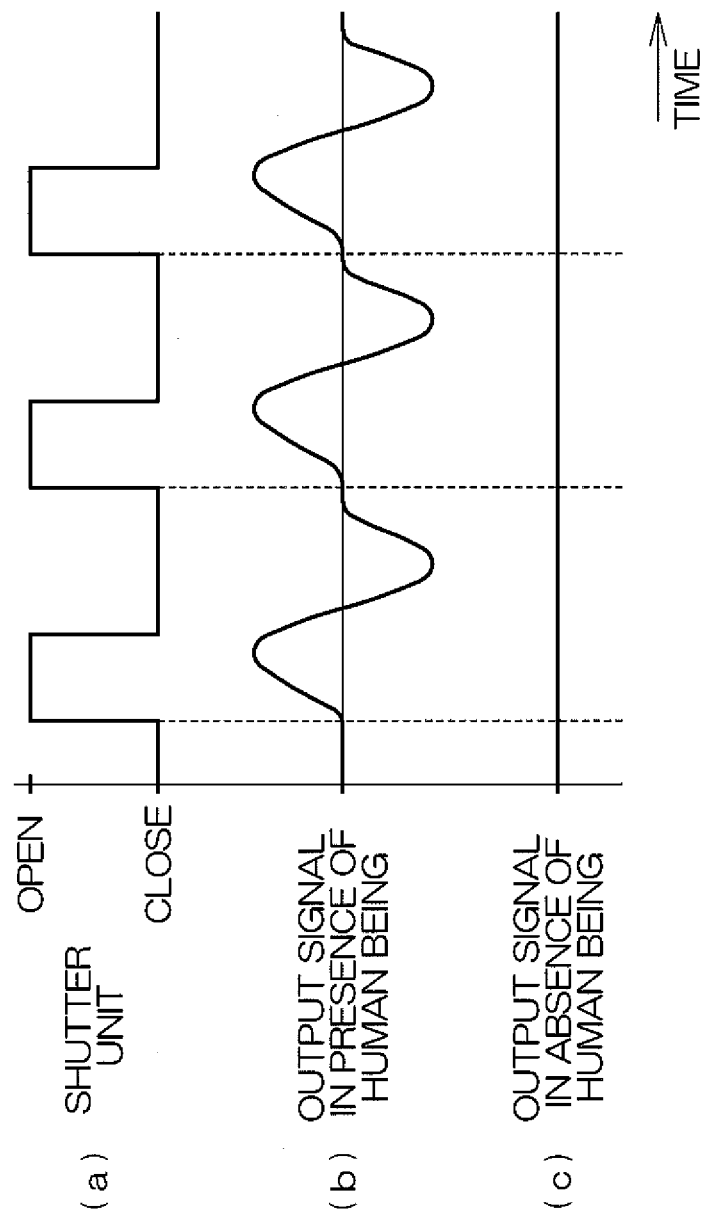
FIG. 23 is a diagram for illustrating a principle of sensing a stationary human body with the pyroelectric infrared sensor and the shutter unit.

FIG. 23 is a diagram for illustrating a principle of sensing a stationary human body with the pyroelectric infrared sensor 201 and the shutter unit 200. As shown at (a) in FIG. 23, the microcomputer 50 opens/closes the shutter unit 200, and periodically shuts the infrared incidence path to the photoreceiving surface 203 of the pyroelectric infrared sensor 201, for example. The cycle of the opening/closing may be about several milliseconds. If the shutter unit 200 is switched from the closed state to the open state when a human being as the radiator is present in the sensitivity region 24, the temperature of the photoreceiving surface 203 of the pyroelectric infrared sensor 201 so changes that the pyroelectric infrared sensor 201 generates electromotive force resulting from a pyroelectric effect. Also when the shutter unit 200 is switched from the open state to the closed state, the temperature of the photoreceiving surface 203 of the pyroelectric infrared sensor 201 so changes that the pyroelectric infrared sensor 201 generates electromotive force resulting from a pyroelectric effect. Therefore, the pyroelectric infrared sensor 201 outputs an AC signal, as shown at (b) in FIG. 23. When no human being as the radiator is present in the sensitivity region 24, on the other hand, the state of infrared incidence upon the photoreceiving surface 203 of the pyroelectric infrared sensor 201 remains unchanged even if the microcomputer 50 opens/closes the shutter unit 200. Therefore, the output signal of the pyroelectric infrared sensor 201 remains generally unchanged, as shown at (c) in FIG. 23. Thus, the microcomputer 50 can sense the presence or absence of a stationary human being with the pyroelectric infrared sensor 201 (the motion sensor module 11), by opening/closing the shutter unit 200.

Figure 24:
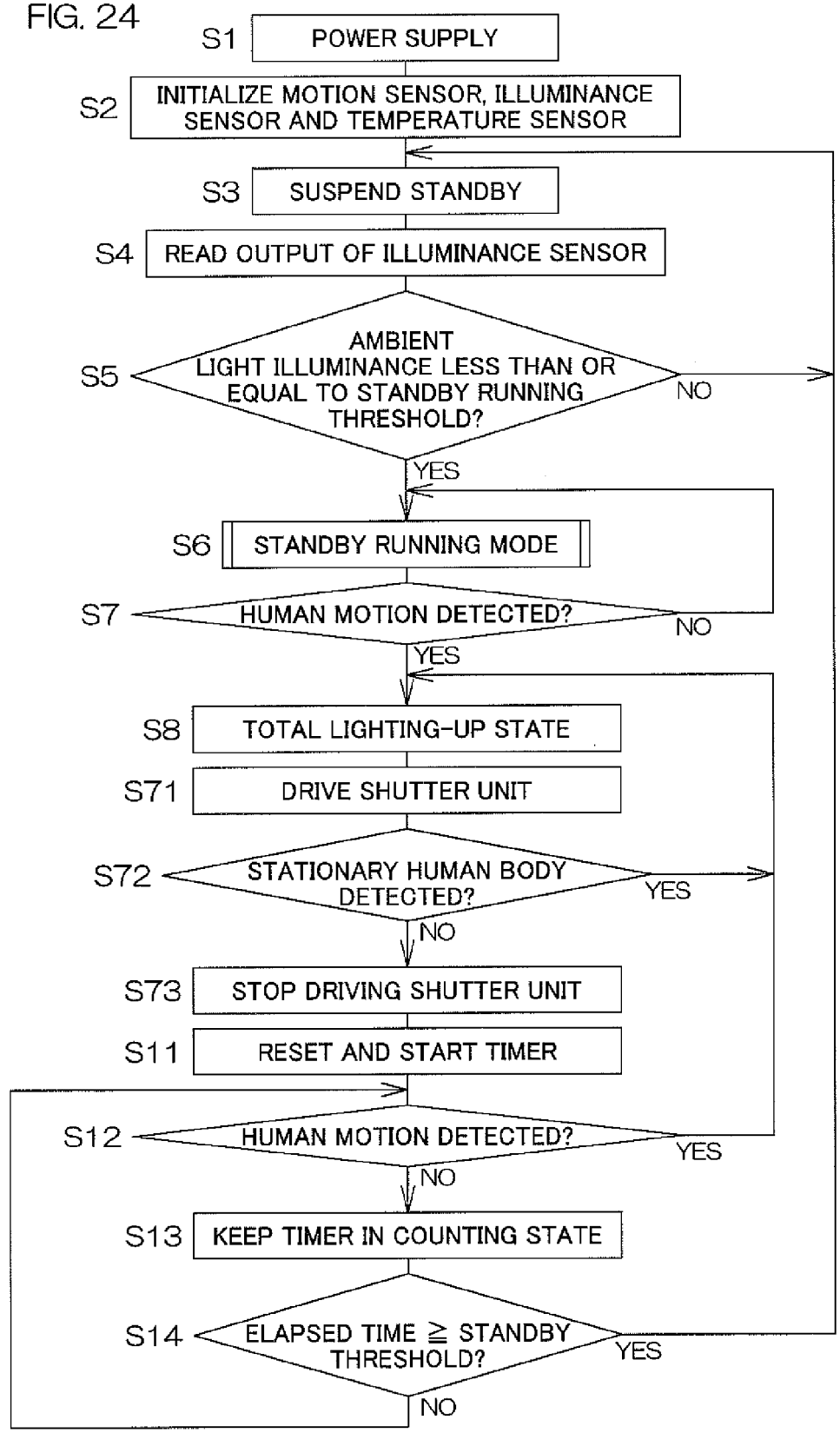
FIG. 24 is a flow chart showing examples of control contents of processing repeated by the microcomputer every prescribed control cycle.

FIG. 24 is a flow chart showing examples of control contents of processing repeated by the microcomputer 50 every prescribed control cycle. Referring to FIG. 24, steps similar to those shown in FIG. 8 are denoted by the same reference signs.

According to the ninth embodiment, the microcomputer 50 starts opening/closing the shutter unit 200 (at a step S71) when the motion sensor module 11 detects a human motion in the sensitivity region 24 (YES at a step S7) and the microcomputer 50 totally turns on an LED source portion 2 (at a step S8). In the period precedent thereto, the microcomputer 50 controls the shutter unit 200 to the opened state.

In the state opening/closing the shutter unit 200 (at the step S71), the microcomputer 50 monitors the output signal of the motion sensor module 11 (the pyroelectric infrared sensor 201), and determines whether or not a stationary human being is present in the vicinity of the LED lamp 107 (at a step S72) by the output signal. When detecting an AC waveform shown at (b) in FIG. 23, the microcomputer 50 determines that a human being is present in the vicinity of the LED lamp 107. When the output signal of the motion sensor module 11 exhibits no significant change as shown at (c) in FIG. 23, on the other hand, the microcomputer 50 determines that no human being is present in the vicinity of the LED lamp 107.

When the motion sensor module 11 senses a stationary human being (YES at the step S72), the microcomputer 50 keeps the LED source portion 2 in a total lighting-up state (at a step S8), and continuously drives the shutter unit 200 (at the step S71). When the motion sensor module 11 senses no stationary human being (NO at the step S72), on the other hand, the microcomputer 50 stops opening/closing the shutter unit 200 and controls the same to the open state (at a step S73). Further, the microcomputer 50 resets an internal timer, and makes the timer start counting (at a step S11). A subsequent control operation is similar to that in the aforementioned first embodiment.

According to the ninth embodiment, as hereinabove described, the LED lamp 107 can sense the presence or absence of a stationary human being without the temperature sensor module 13 provided in the first embodiment. Thus, the LED lamp 107 allowing proper control of a lighting-up state by sensing not only a human motion but also the presence or absence of a stationary human being can be provided in a simpler structure at a lower cost. A temperature sensor such as a thermopile is high-priced, and hence the cost for the LED lamp 107 including no high-priced temperature sensor can be remarkably saved.

Figure 25:
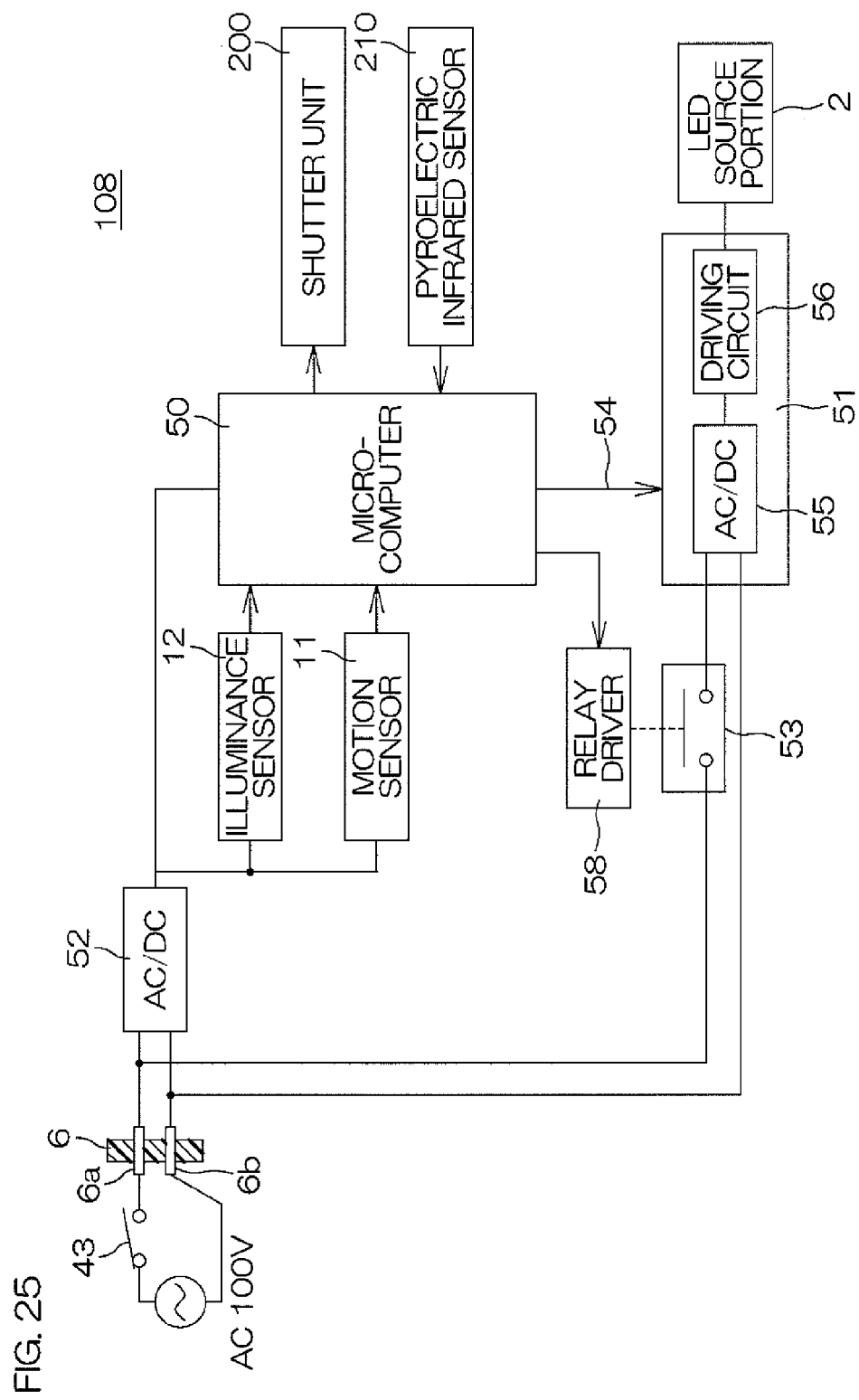
FIG. 25 is a block diagram for illustrating the electrical structure of an LED lamp according to a tenth embodiment of the first structural example of the present invention.

FIG. 25 is a block diagram for illustrating the electrical structure of an LED lamp 108 according to a tenth embodiment of the present invention. Referring to FIG. 25, portions corresponding to those shown in FIG. 21 are denoted by the same reference signs. The tenth embodiment is now described mainly with reference to points different from those of the ninth embodiment.

According to the tenth embodiment, the LED lamp 108 is provided with a pyroelectric infrared sensor 210 separately from a motion sensor module 11. A shutter unit 200 is arranged to open/close an infrared incidence path to a photoreceiving surface of the pyroelectric infrared sensor 210. The pyroelectric infrared sensor 210 may be formed to have a sensitivity region similar to a sensitivity region 24 of the motion sensor 11, or may be formed to have a narrower sensitivity region around the center of the sensitivity region 24, for example. Further, the pyroelectric infrared sensor 210 may not have a Fresnel lens between the photoreceiving surface and the sensitivity region thereof. The shutter unit 200 is arranged on the infrared incidence path between the photoreceiving surface and the sensitivity region of the pyroelectric infrared sensor 210. More specifically, the shutter unit 200 may be arranged immediately ahead of the photoreceiving surface of the pyroelectric infrared sensor 210.

A microcomputer 50 detects a human entrance into the sensitivity region 24 and a human motion in the sensitivity region 24 on the basis of an output signal received from the motion sensor module 11. Further, the microcomputer 50 opens/closes (e.g. periodically shuts) the infrared incidence path to the photoreceiving surface of the pyroelectric infrared sensor 210 by driving the shutter unit 200, and determines whether or not a stationary human being is present in the vicinity of the LED lamp 108 on the basis of an output signal currently received from the pyroelectric infrared sensor 210. The details of the determination are similar to those of the determination described in relation to the ninth embodiment with reference to FIGS. 23 and 24. In processing similar to that in the flow chart shown in FIG. 24, the microcomputer 50 makes a determination at a step similar to the step S72 on the basis of the output signal received from the pyroelectric infrared sensor 210, as a matter of course. According to the tenth embodiment, the microcomputer 50 may regularly open/close the shutter unit 200, or may open/close the shutter unit 200 only when the motion sensor module 11 senses a human entrance into the sensitivity region 24 or a human motion in the sensitivity region 24 (at a step similar to the step S71).

Thus, while the LED lamp 108 is provided with the pyroelectric infrared sensor 210 separately from the motion sensor module 11 according to the tenth embodiment, the pyroelectric infrared sensor 210 is at a remarkably lower cost as compared with a temperature sensor such as a thermopile, and hence the cost for the LED lamp 108 can be more reduced as compared with the case of the first embodiment. Further, the sensitivity region of the pyroelectric infrared sensor 210 can be set independently of the sensitivity region 24 of the motion sensor module 11, whereby the microcomputer 50 can more properly sense the presence of a stationary human being.

While the embodiments of the first structural example of the present invention have been described, the present invention may be embodied in other ways. For example, while the motion sensor module is detachable in the structure shown in FIG. 1 etc., the motion sensor may alternatively be fixedly mounted on the LED lamp. While the motion sensor module is arrangeable on either end portion of the straight LED lamp in the structure shown in FIG. 1 etc., a connector for the motion sensor module may be provided only on one of the end portions. Further, while the sensitivity axis of the motion sensor module is directed toward the center of the illuminated region of the LED lamp in the structure shown in FIG. 1 etc., the sensitivity axis may alternatively be parallelized to the illumination axis of the LED lamp.

While the LED lamp includes the motion sensor, the illuminance sensor and the temperature sensor in each of the aforementioned first and third embodiments, the temperature sensor as well as the structure and the processing related thereto may be omitted, or the motion sensor as well as the structure and the processing related thereto may be omitted. This also applies to the second embodiment, and the motion sensor as well as the structure and the processing related thereto may be omitted, or the temperature sensor and the structure related thereto may be added after the first embodiment.

While the microcomputer totally turns on the LED source portion when the motion sensor senses a human motion in each of the aforementioned embodiments, the microcomputer may turn on the LED source portion with driving power of less than 100% (however, higher than the driving power in the standby running state), and may turn on the LED source portion in response to the ambient illuminance, for example.

While the shutter unit 200 is arranged in front of the Fresnel lens 202 (on the side opposite to the photoreceiving surface 203 of the pyroelectric infrared sensor 201) in FIG. 22, the shutter unit 200 may alternatively be arranged between the Fresnel lens 202 and the photoreceiving surface 203.

The structures shown in the aforementioned ninth and tenth embodiments are also applicable to the second to eighth embodiments.

[2] Second Structural Example

Figure 26:
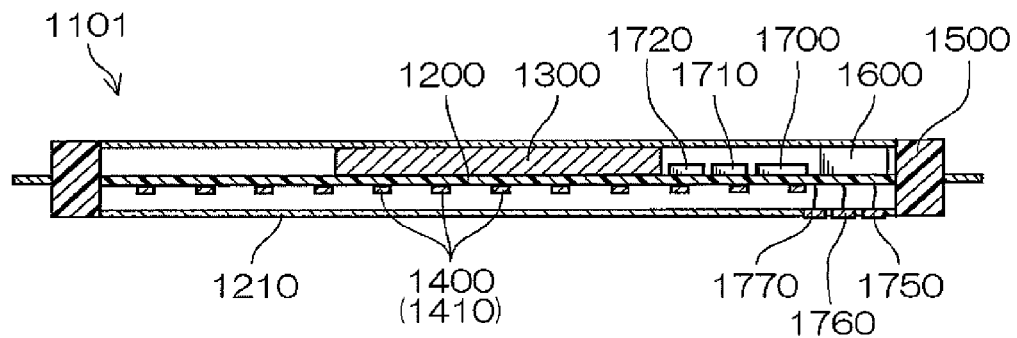
FIG. 26 is a sectional view showing an example of an LED lamp according to a second structural example of the present invention.
Figure 28:
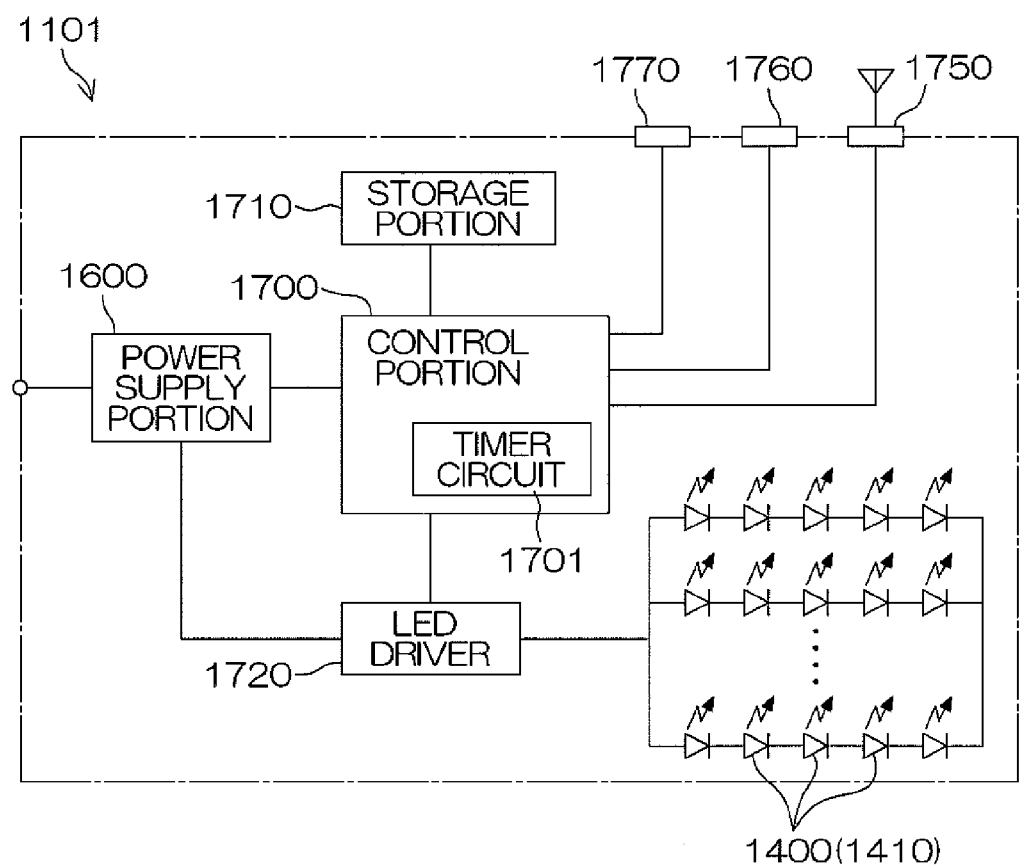
FIG. 28 is a system block diagram of the LED lamp shown in FIG. 26.

FIGS. 26 and 28 show an example of an LED lamp according to an embodiment of a second structural example of the present invention. An LED lamp 1101 according to the embodiment includes a substrate 1200, a cover 1210, a radiation member 1300, a plurality of LED modules 1400, a connector 1500, a power supply portion 1600, a control portion 1700, a storage portion 1710, an LED driver 1720, a radio wave sensing portion 1750, a motion sensor 1760, and an illuminance sensor 1770. The LED lamp 1101 has a shape similar to that of the so-called straight fluorescent lamp, and is attachable to a lighting fixture mounted with a straight fluorescent lamp. The LED lamp 1101 may be rendered attachable to a dedicated lighting fixture, in addition to the structure attached to the lighting fixture for a general straight fluorescent lamp.

The substrate 1200 is an insulating substrate made of glass epoxy resin or ceramic, for example, and has an elongating rectangular shape. The radiation member 1300, mounted on the back surface of the substrate 1200, is made of aluminum, for example. The cover 1210 is made of semitransparent milky resin, and in the form of a cylinder storing the substrate 1200. The connector 1500 is a site employed for mounting the LED lamp 1101 on a lighting fixture 1110 described later, and includes a plurality of bar terminals made of a metal, for example.

The plurality of LED modules 1400 are arrayed on the surface of the substrate 1200 along the longitudinal direction thereof. According to the embodiment, groups of some LED modules 1400 connected in series with one another are connected in parallel with one another, as shown in FIG. 28.

Figure 27:
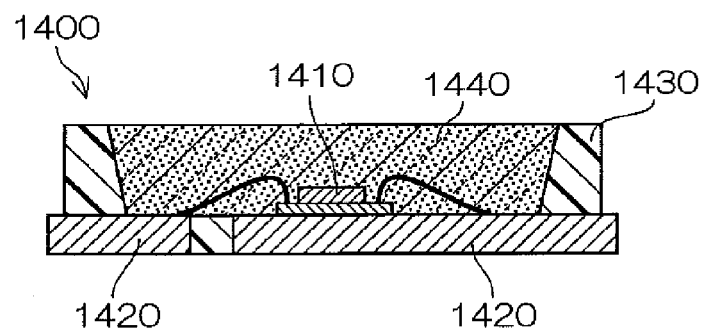
FIG. 27 is a sectional view showing an LED module employed for the LED lamp shown in FIG. 26.

FIG. 27 is a sectional view of each LED module 1400. As shown in FIG. 27, the LED module 1400 includes an LED chip 1410, a pair of leads 1420, sealing resin 1440 and a reflector 1430. The pair of leads 1420 are made of a Cu alloy, for example, and the LED chip 1410 is loaded on one of the leads 1420. The LED chip 1410 serves as the light source for the LED module 1400, and is enabled to emit blue light, for example. The sealing resin 1440 is provided for protecting the LED chip 1410. The sealing resin 1440 is made of translucent resin containing a fluorescent material excited by light received from the LED chip 1410 thereby emitting yellow light. Thus, the LED module 1400 can irradiate white light. The aforementioned fluorescent material may be prepared by mixing materials emitting red light and green light with each other, in place of the material emitting yellow light. The reflector 1430 is made of white resin, for example, and employed for upwardly reflecting light laterally emitted from the LED chip 1410.

The control portion 1700 is provided with a CPU, an EPROM, a RAM and an input/output interface, for example, and employed for controlling the entire LED lamp 1101. The control portion 1700 stores a program for implementing light-emission control of the LED lamp 1101 described later. According to this embodiment, the control portion 1700 has a timer circuit 1701. The timer circuit 1701 is a circuit counting time for controlling the running time of the plurality of LED modules 1400 (LED chips 1410). The LED driver 1720 is a driver IC driving/controlling light-emitting states of the plurality of LED chips 1410 by PWM control, for example, on the basis of an instruction received from the control portion 1700.

The motion sensor 1760 is provided with a thermopile or the like generating electromotive force by receiving infrared rays radiated from a human body, for example. The motion sensor 1760 outputs a sensing signal to the control portion 1700. The motion sensor 1760 of such a structure is capable of sensing a human entrance into a sensing range thereof due to the generation of electromotive force in principle, while the same is incapable of sensing continuous presence of a human being in the sensing range.

The illuminance sensor 1770 is a sensor measuring the illuminance of the environment where the LED lamp 1101 is set, and stores a photodiode, for example. The illuminance sensor 1770 outputs a sensing signal responsive to the illuminance to the control portion 1700. The storage portion 1710, formed by a RAM, for example, stores the illuminance based on the sensing signal received from the illuminance sensor 1770.

The radio wave sensing portion 1750 receives a radio wave from a portable telephone, thereby outputting a sensing signal responsive to the strength of the radio wave to the control portion 1700. The radio wave sensing portion 1750 is provided with an antenna for receiving the radio wave, a conversion portion converting the radio wave to a signal, and an amplifier portion amplifying the converted signal, for example.

Operations of the LED lamp 1101 are now described with reference to FIGS. 29 to 36.

Figure 31:
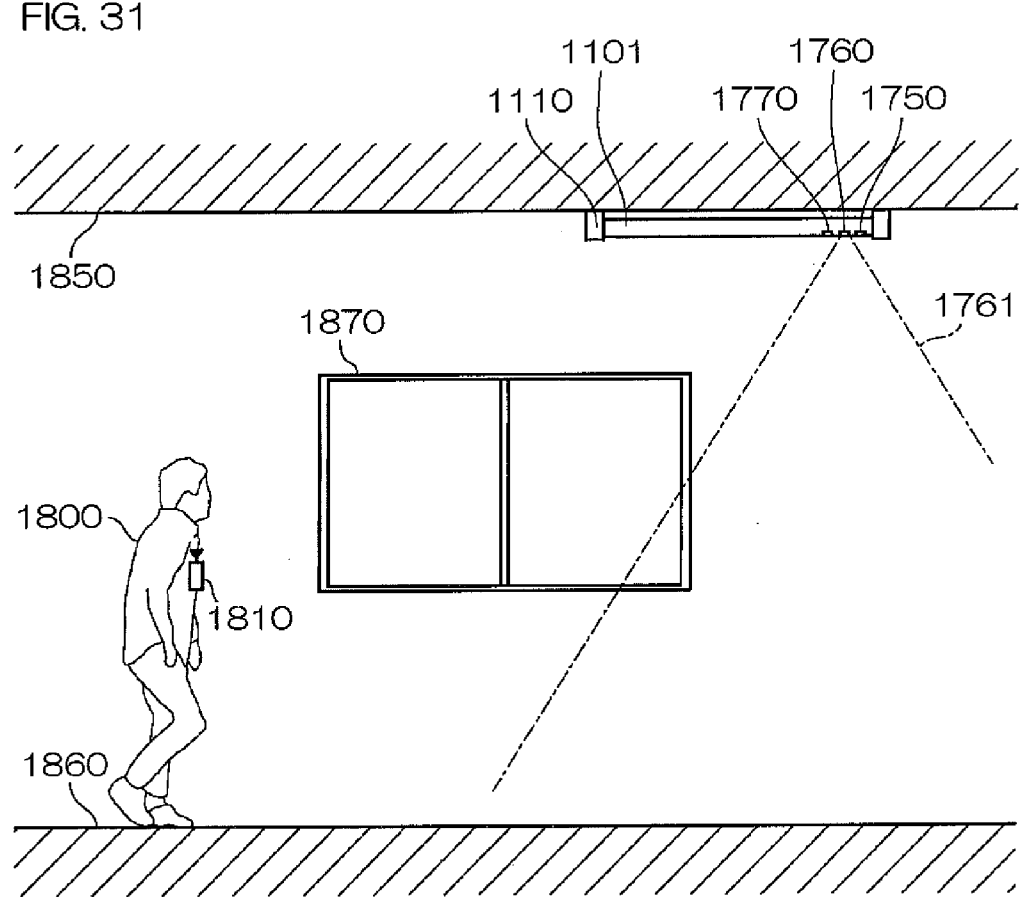
FIG. 31 is a schematic side elevational view showing a used state of the LED lamp shown in FIG. 26.

As shown in FIG. 31, the LED lamp 1101 is used in a state mounted on the lighting fixture 1110 set on a ceiling 1850, for example. A user 1800 walking on a floor 1860 comes and goes around a portion immediately under the lighting fixture 1110. When the user 1800 enters a sensing range 1761, the motion sensor 1760 outputs a sensing signal.

Figure 29:
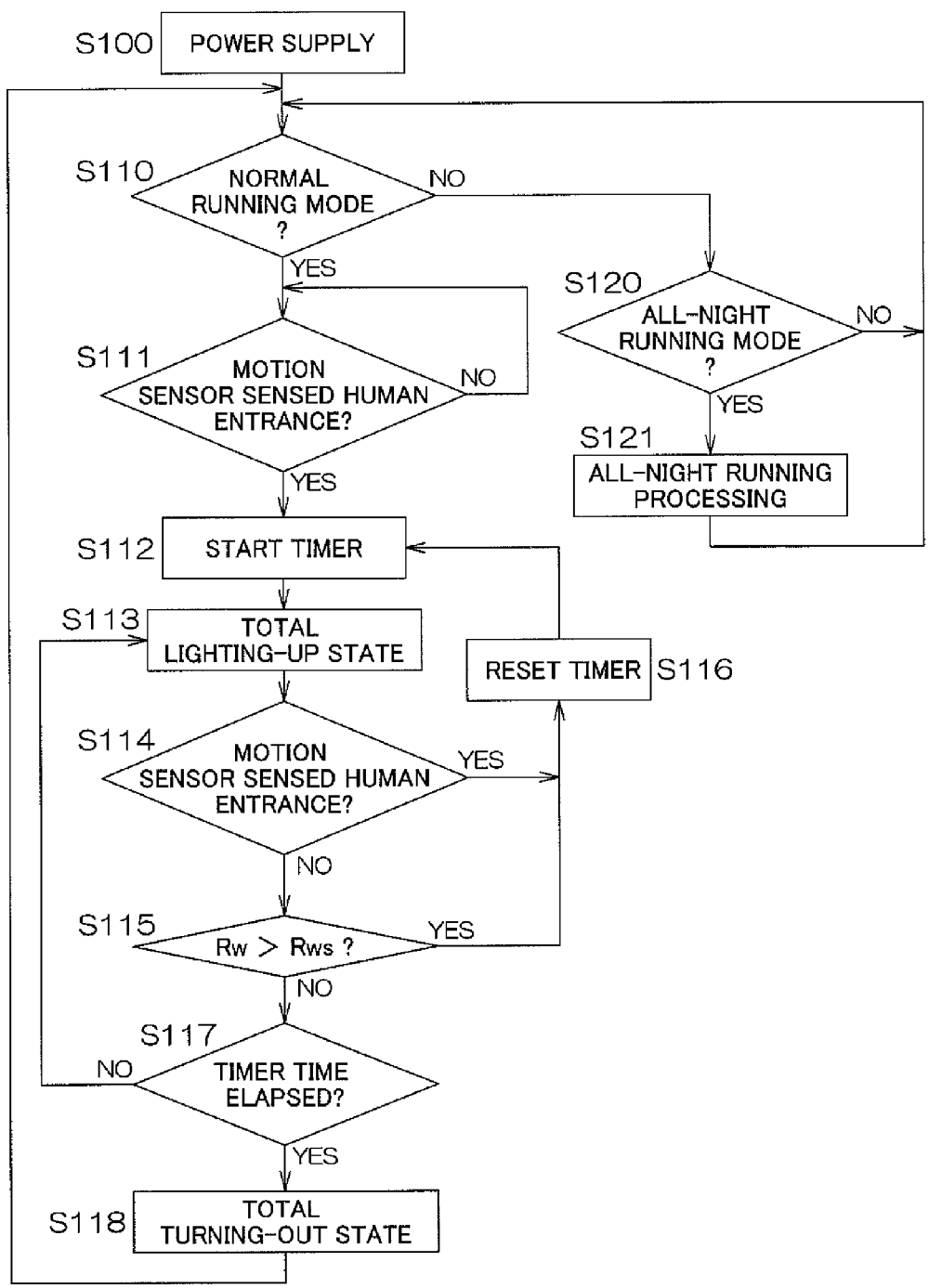
FIG. 29 is a flow chart showing lighting-up control in a normal running mode of the LED lamp shown in FIG. 26.

Power is supplied through an operating portion (not shown) of the lighting fixture 1110, as shown in FIG. 29 (at a step S100). The operating portion may be set on a wall surface or the like, for example, or may be a remote control switch. Then, the control portion 1700 determines whether or not the LED lamp 1101 is in a normal running mode (at a step S110). The normal running mode may be selected through the aforementioned operating portion of the lighting fixture 1110 or by an instruction transmitted to the LED lamp 1101 from the remote control switch. The control portion 1700 performs processing subsequent to a step S111 when the normal running mode is selected, or performs processing subsequent to a step S120 when the normal running mode is not selected.

<Normal Running Mode>

Figure 32:
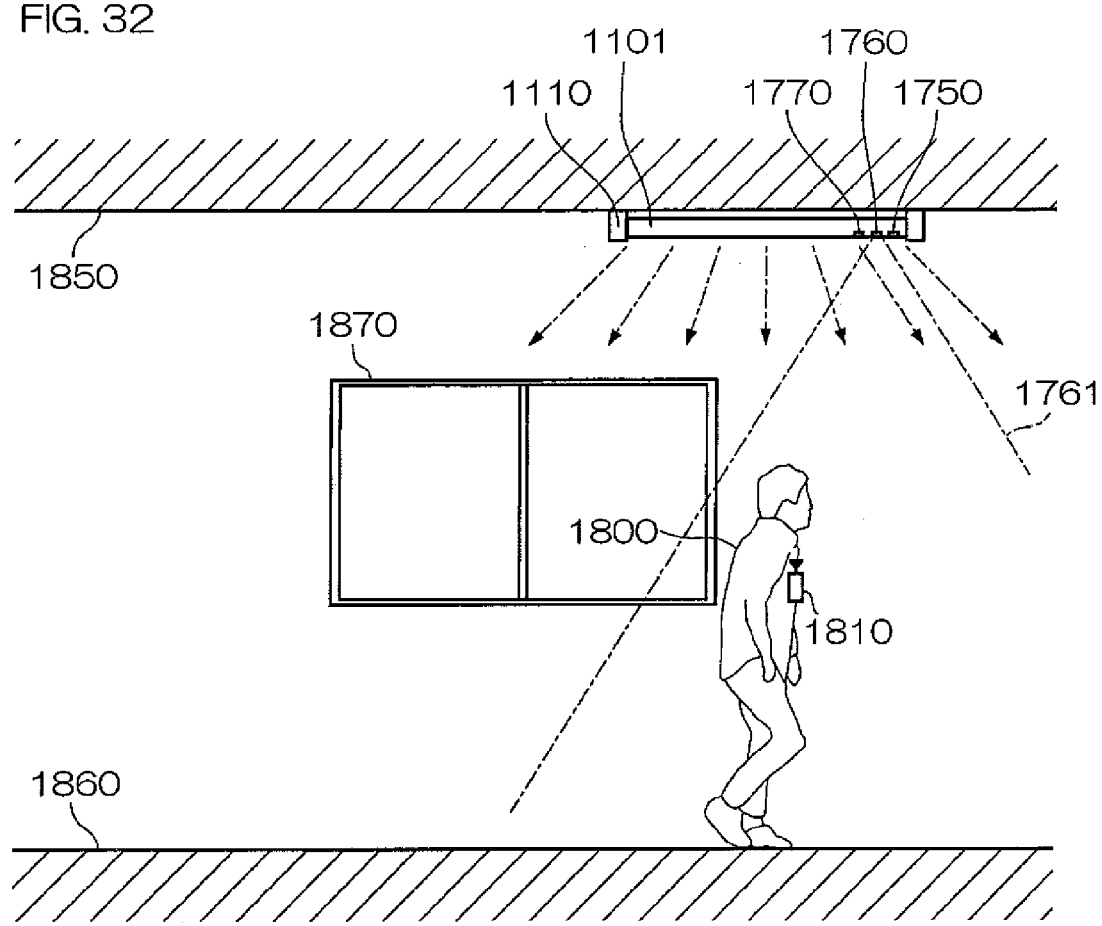
FIG. 32 is a schematic side elevational view showing a lighting-up state of the LED lamp shown in FIG. 26.

When the normal running mode is selected, the control portion 1700 determines whether or not a sensing signal is received from the motion sensor 1760 (at the step S111). When no sensing signal is received from the motion sensor 1760, the control portion 1700 repeats the determination at the step S111. When the user 1800 enters the sensing range 1761 as shown in FIG. 32, on the other hand, the motion sensor 1760 outputs a sensing signal to the control portion 1700. The control portion 1700 receiving the sensing signal determines that the user 1800 has entered the sensing range 1761. Then, the control portion 1700 controls the timer circuit 1701 to start the timer (at a step S112), and totally turns on the plurality of LED modules 1400 (the LED chips 1410) (at a step S113), as shown in FIG. 29.

The timer circuit 1701 keeps the timer in a counting state while the plurality of LED modules 1400 (the LED chips 1410) are in a total lighting-up state. When the user 1800 temporarily leaving the sensing range 1761 reenters the sensing range 1761, however, the motion sensor 1760 outputs another sensing signal to the control portion 1700. When receiving the sensing signal (YES at a step S114), the control portion 1700 controls the timer circuit 1701 to reset the timer (at a step S116).

Figure 33:
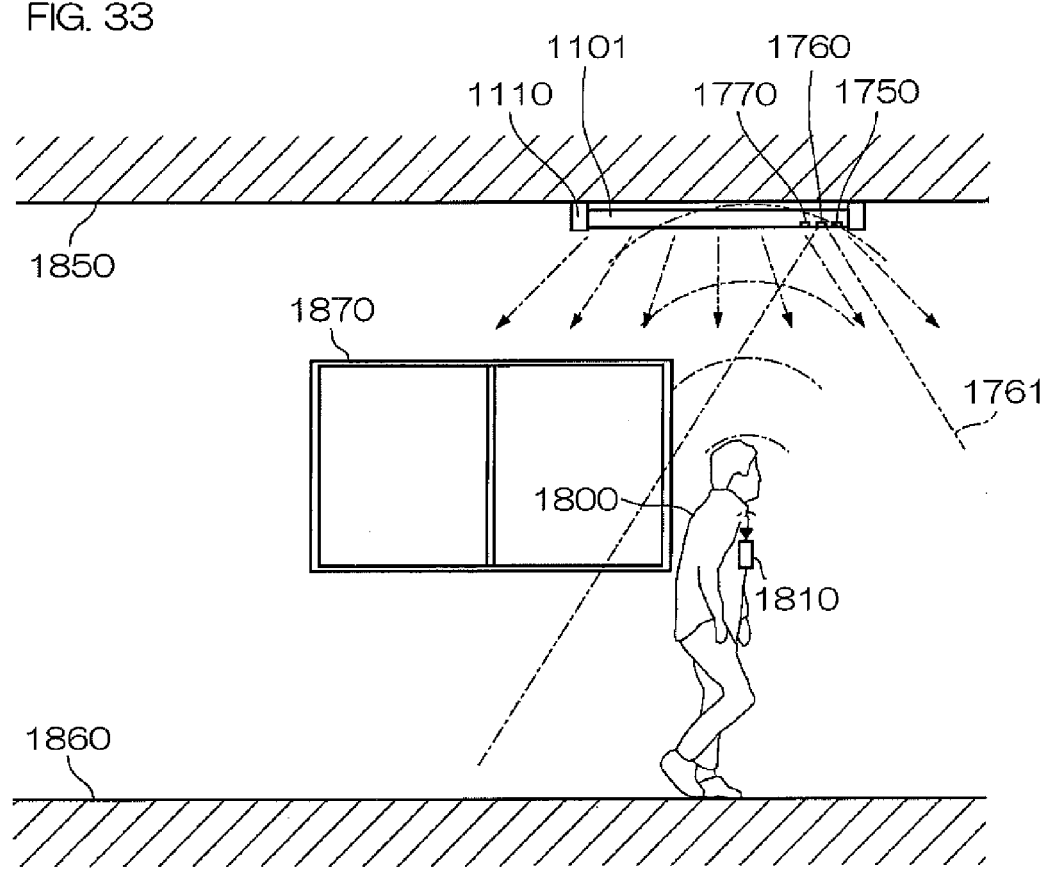
FIGS. 33 and 34 are schematic side elevational views showing states where the lighting-up state of the LED lamp shown in FIG. 26 is continued.
Figure 34:
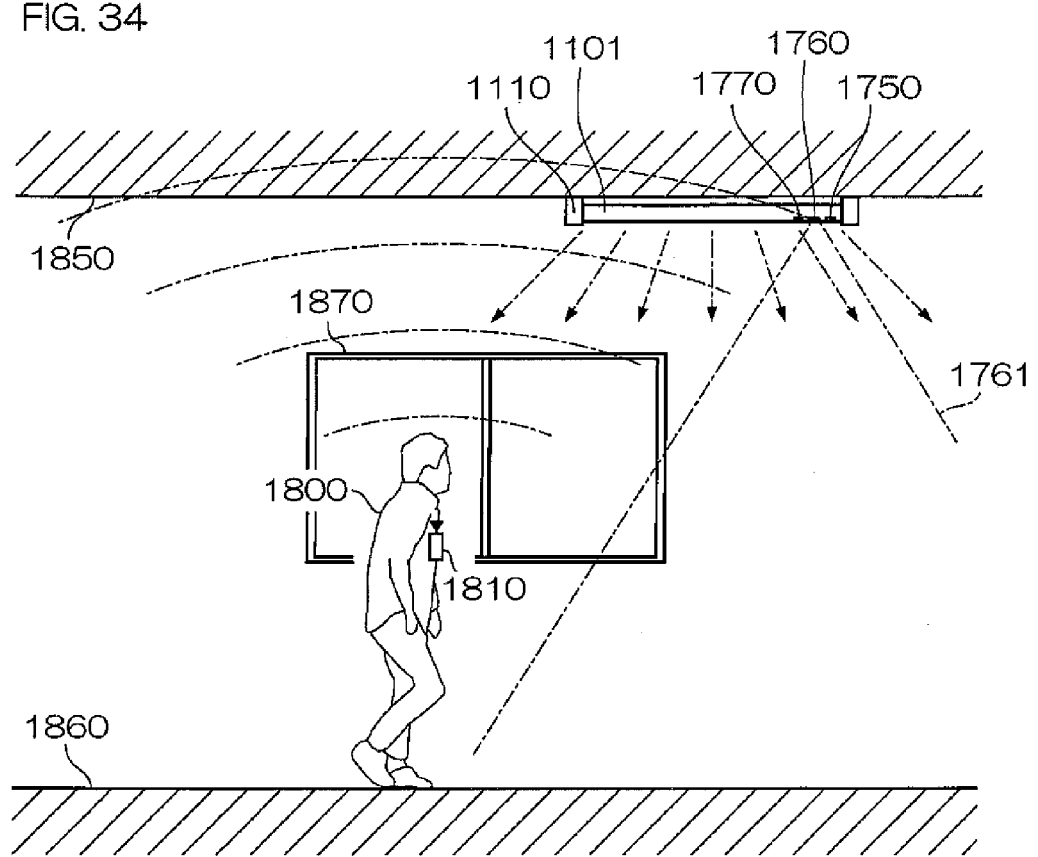

When determining that the motion sensor 1760 has sensed no human entrance at the step S114, on the other hand, the control portion 1700 turns on the plurality of LED modules 1400 (the LED chips 1410) in response to a radio wave sensing state of the radio wave sensing portion 1750. As shown in FIGS. 33 and 34, the user 1800 carries a portable telephone 1810. The portable telephone 1810 corresponds to a radio wave transmission means in the present invention. The portable telephone 1810 intermittently transmits a positional information radio wave, a load completion information radio wave or the like, for example. The radio wave sensing portion 1750 transmits a sensing signal responsive to the strength of the received radio wave to the control portion 1700. The control portion 1700 stores predetermined reference radio wave strength Rws, which is set to a level corresponding to a time when the radio wave sensing portion 1750 receives a radio wave transmitted from the general portable telephone 1810 placed in a prescribed range around the portion immediately under the LED lamp 1101 or the like. The control portion 1700 compares current radio wave strength Rw based on the sensing signal received from the radio wave sensing portion 1750 and the reference radio wave strength Rws with each other (at a step S115). When the radio wave strength Rw is greater than the reference radio wave strength Rws, the control portion 1700 controls the timer circuit 1701 to reset the timer at the step S116.

When determining that the motion sensor 1760 has sensed no human entrance at the step S114 and that the radio wave sensing portion 1750 has sensed no radio wave at the step S115, the control portion 1700 controls the timer circuit 1701 to keep the timer in the counting state. Then, the control portion 1700 repeats the steps S114 and S115 in the state totally turning on the plurality of LED modules 1400 (the LED chips 1410) until the count of the timer reaches a prescribed time (90 sec., for example) (at a step S117). When the count of the timer reaches the prescribed time (YES at the step S117), the control portion 1700 totally turns off the plurality of LED modules 1400 (the LED chips 1410) (at a step S118). The control portion 1700 terminates the normal running mode through the aforementioned processing.

<All-Night Running Mode>

When determining that the normal running mode is not selected at the step S110, the control portion 1700 determines whether or not an all-night running mode is selected at the step S120. The all-night running mode may be selected through the aforementioned operating portion of the lighting fixture 1110 or by an instruction transmitted to the LED lamp 1101 from the remote control switch. When the all-night running mode is not selected, the control portion 1700 returns to the step S110. When the all-night running mode is selected, on the other hand, the control portion 1700 performs all-night running processing at a step S121.

Figure 30:
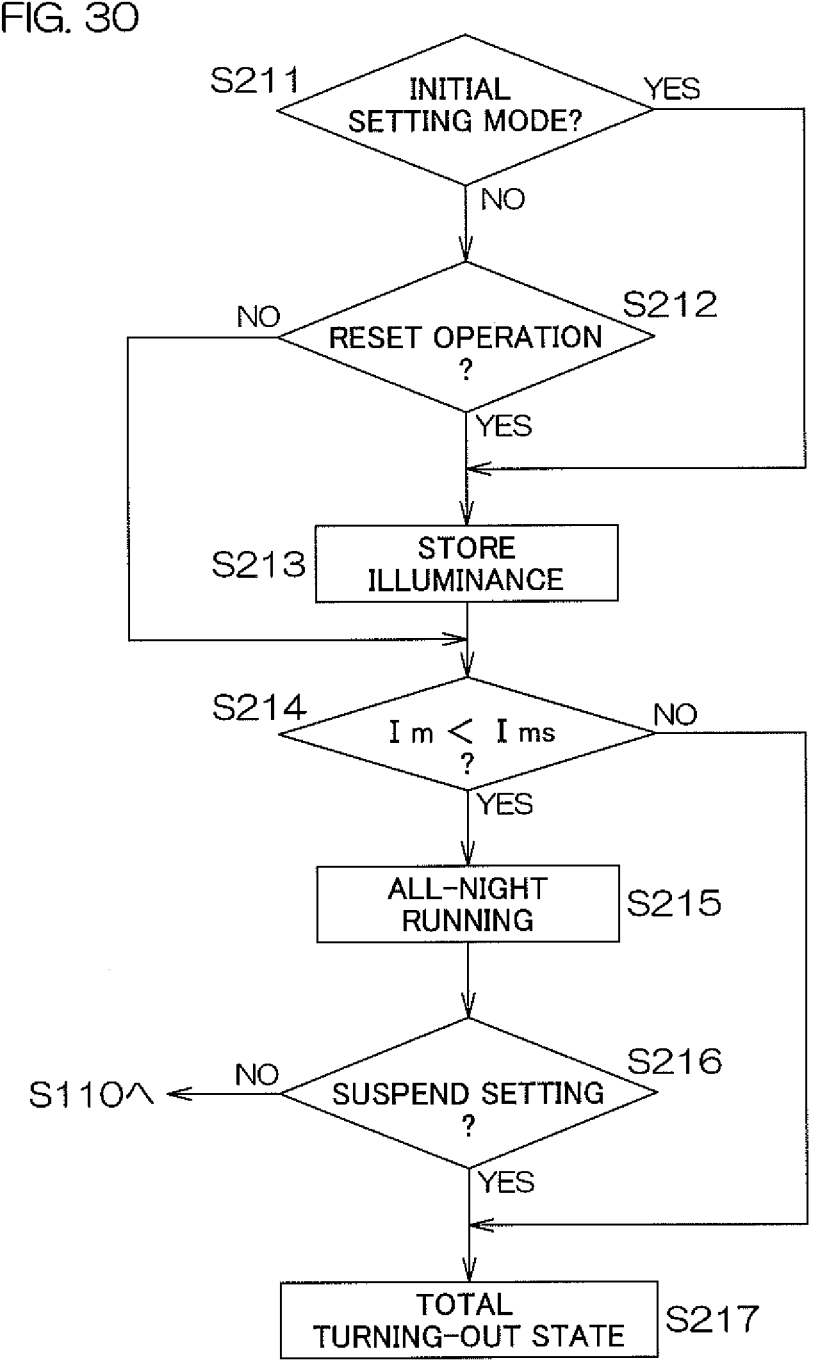
FIG. 30 is a flow chart showing lighting-up control in an all-night running mode of the LED lamp shown in FIG. 26.

FIG. 30 shows the contents of the all-night running processing (at the step S121). When an initial setting mode is selected (YES at a step S211), the control portion 1700 performs illuminance storage processing at a step S213. When a reset operation is selected (YES at a step S212) in a case where the initial setting mode is not selected at the step S211, the control portion 1700 also performs the illuminance storage processing at the step S213.

Figure 35:
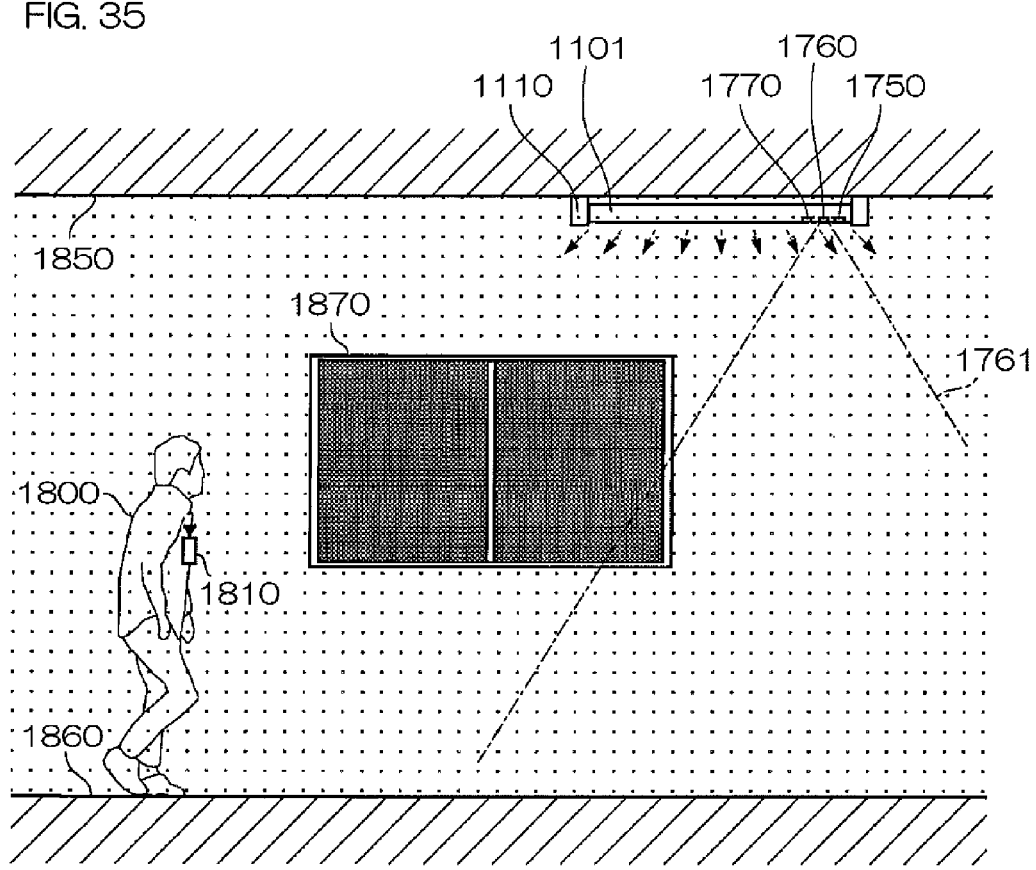
FIG. 35 is a schematic side elevational view showing a lighting-up state of the LED lamp shown in FIG. 26 in the all-night running mode.

In the illuminance storage processing, the control portion 1700 stores illuminance based on the sensing signal received from the illuminance sensor 1770 in the storage portion 1710. At this time, the control portion 1700 keeps the plurality of LED modules 1400 (the LED chips 1410) in an all-night running state in a state where external light hardly enters the room through a window 1870 at night or the like, as shown in FIG. 35. The all-night running state denotes a state where brightness is intentionally reduced below that in the total lighting-up state of the plurality of LED modules 1400 (the LED chips 1410) to ensure illuminance allowing the user 1800 to walk at night without bothering the neighborhood, for example.

Figure 36:
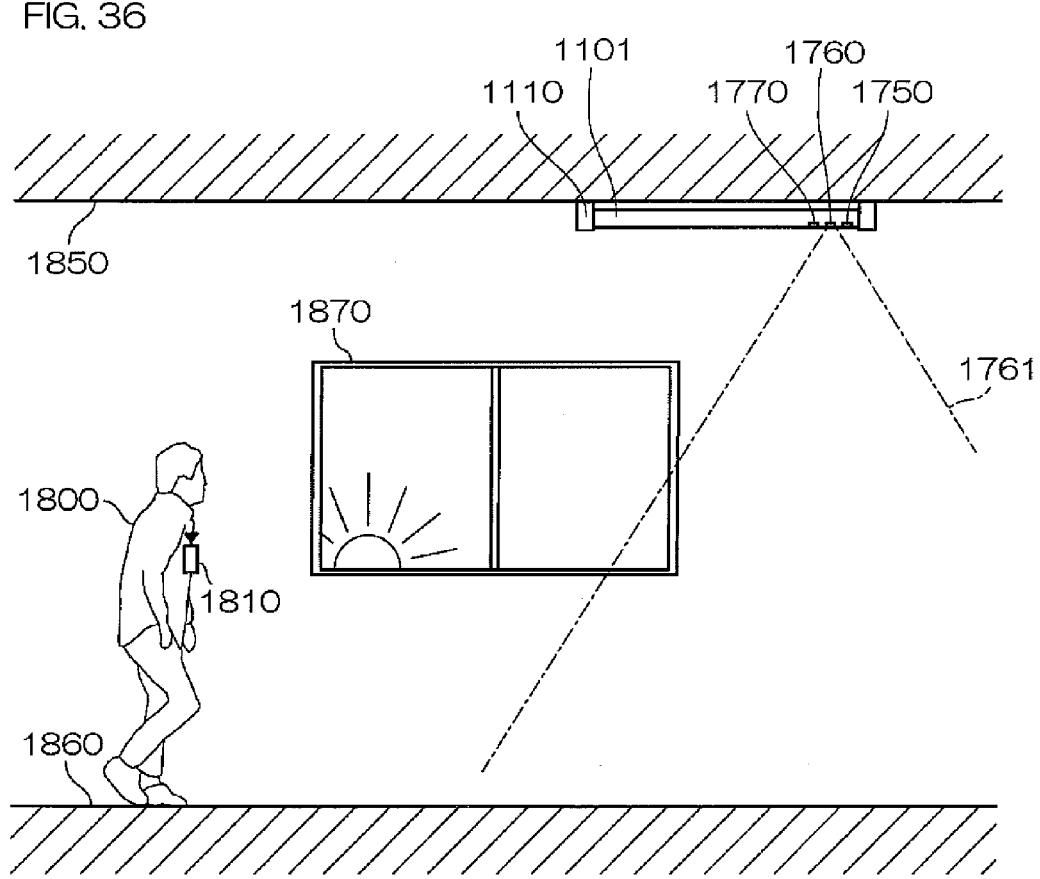
FIG. 36 is a schematic side elevational view showing a lighting-out state of the LED lamp shown in FIG. 26 in the all-night running mode.

After completing the illuminance storage processing at the step S213 or when determining that the reset operation is not selected at the step S212, the control portion 1700 advances to a step S214, as shown in FIG. 30. At the step S214, the control portion 1700 compares reference illuminance Ims and illuminance Im with each other. The reference illuminance Ims is obtained by adding constant illuminance to that stored in the storage portion 1710. The illuminance Im is based on the current sensing signal received from the illuminance sensor 1770. When external light hardly enters the room through the window 1870 at night as shown in FIG. 35, for example, the illuminance Im is less than the reference illuminance Ims. In this case, the control portion 1700 brings the plurality of LED modules 1400 (the LED chips 1410) into the all-night running state (at a step S215). When a large quantity of external light enters the room through the window 1870 at dawn or the like as shown in FIG. 36, on the other hand, the illuminance Im is greater than the reference illuminance Ims. In this case, the control portion 1700 advances to a step S217 without bringing the plurality of LED modules 1400 (the LED chips 1410) into the all-night running state. When determining that suspend setting is performed at a step S216, the control portion 1700 totally turns off the plurality of LED modules 1400 (the LED chips 1410) at the step S217. When determining that no suspend setting is performed at the step S216, on the other hand, the control portion 1700 returns to the step S110. The contents of the all-night running processing at the step S121 are as described above.

Functions of the LED lamp 1101 are now described.

When the user 1800 stays around the LED lamp 1101 as shown in FIG. 33, the radio wave sensing portion 1750 can recognize the presence of the user 1800 by sensing a radio wave from the portable telephone 1810 carried by the user 1800. When the user 1800 stays around the LED lamp 1101, therefore, the control portion 1700 can be prevented from turning off the LED lamp 1101 against the intention of the user 1800.

Also when the user 1800 is out of the sensing range 1761 of the motion sensor 1760 as shown in FIG. 34, the LED lamp 1101 is kept in a lighting-up state if the radio wave strength Rw sensed by the radio wave sensing portion 1750 is greater than the reference radio wave strength Rws. Thus, the LED lamp 1101 can be properly kept in the lighting-up state when the user 1800 out of the sensing range 1761 requires the light of the LED lamp 1101.

The control portion 1700 controls the timer circuit 1710 to reset the timer (at the step S116) in response to the sensing signal received from the motion sensor 1760 (at the step S114), so that the LED lamp 1101 can be properly kept in the lighting-up state when the user 1800 temporarily leaves the sensing range 1761 and thereafter reenters the sensing range 1761 or a user other than the user 1800 enters the sensing range 1761.

The LED lamp 1101 includes the all-night running mode, whereby the same can illuminate the room for enabling the user 1800 to walk or for attaining a crime prevention effect when no such brightness as that in the total lighting-up state is required at night or the like. Further, the control portion 1700 brings the plurality of LED modules 1400 (the LED chips 1410) into the all-night running state by comparing the reference illuminance Ims and the illuminance Im with each other, whereby the same can be prevented from unnecessarily bringing the LED lamp 1101 into the all-night running state when the room is illuminated to some extent by external light.

A sampling period of the illuminance sensor 1770 constituted of a photodiode or the like is generally remarkably shorter than an on/off cycle of the LED chips 1410 turned on/off by PWM control. If timing for measuring the quantity of light with the illuminance sensor 1770 is synchronized with timing when the LED chips 1410 are in the lighting-up state (the total lighting-up state), therefore, the illuminance sensor 1770 can measure the illuminance in the total lighting-up state of the LED chips 1410. The control portion 1700 can monitor change in the quantity of light in the LED chips 1410 by storing the total quantity of light in the LED chips 1410 at the time when the user 1800 starts using the LED lamp 1101 in the storage portion 1710 and comparing initial illuminance with illuminance in use, for example. Thus, when the quantity of light in the LED chips 1410 falls below 30% of the initial level, for example, the control portion 1700 of the LED lamp 1101 can self-determine that the lives of the LED chips 1410 have been ended.

Figure 37:
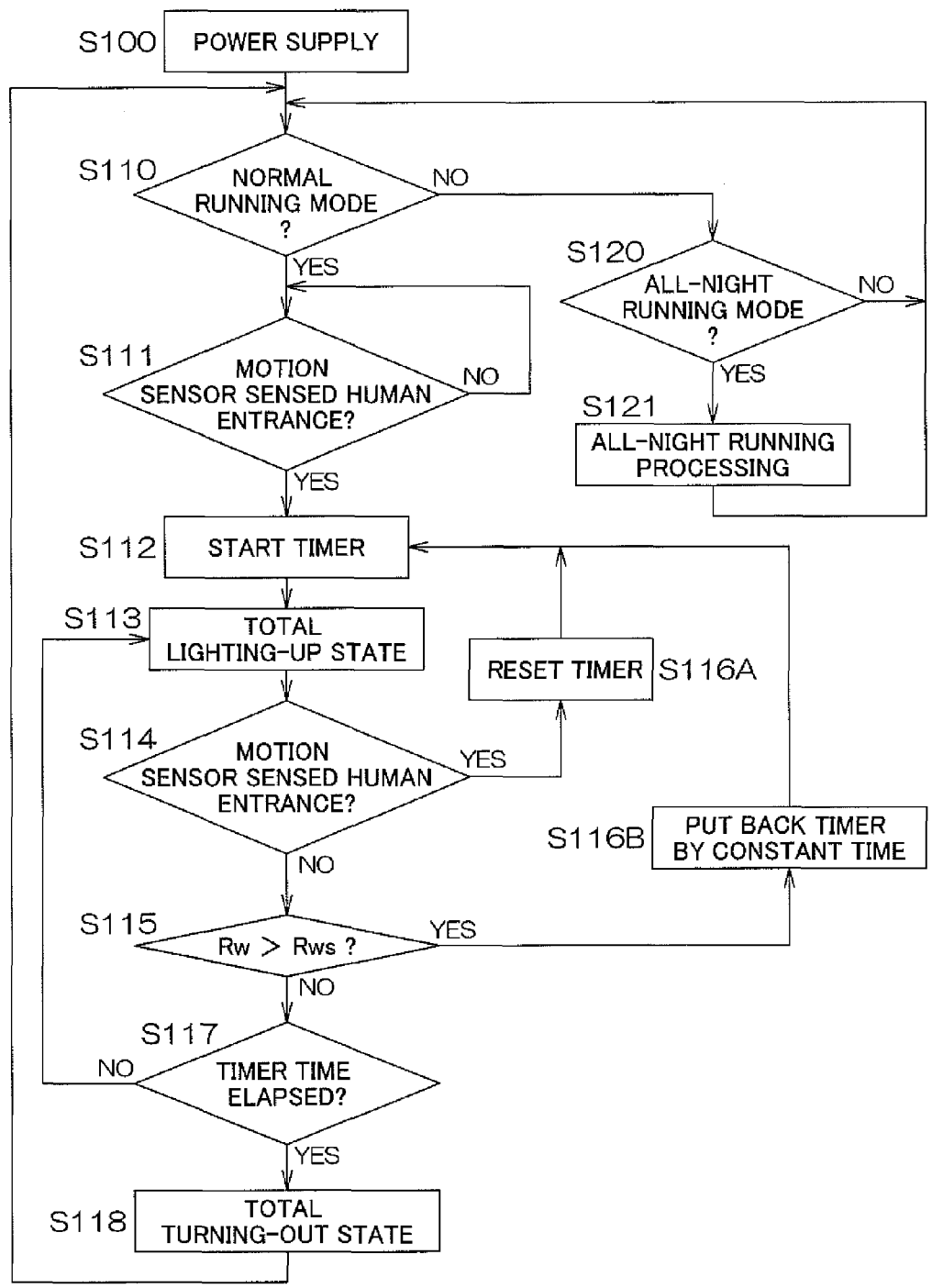
FIG. 37 is a flow chart showing lighting-up control of an LED lamp according to a modification of the present invention in a normal running mode.

FIG. 37 is a flow chart showing lighting-up control in a normal running mode of a modification of the LED lamp 1101. According to this modification, processing of the timer circuit 1701 varies with a case where the motion sensor 1760 senses a human entrance at a step S114 and a case where the radio wave strength Rw is greater than the reference radio wave strength Rws. When the control portion 1700 determines that the motion sensor 1760 senses a human entrance at the step S114, the timer circuit 1701 resets the count of the timer to zero at a step S116A, and restarts the timer at a step S112.

When the control portion 1700 determines that the motion sensor 1760 senses no human entrance at the step S114 but the radio wave strength Rw is greater than the reference radio wave strength Rws at a step 115, on the other hand, the timer circuit 1701 advances to a step S116B. At the step S116B, the timer circuit 1701 puts back the timer by a constant time. The constant time is smaller than a prescribed time (90 sec., for example) employed for determining whether or not a timer time has elapsed at a step S117. For example, the constant time corresponds to one cycle of a radio wave periodically transmitted from the portable telephone 1810 for the purpose of localization or acknowledgement. After putting the timer back by the constant time at the step S116B, the timer circuit 1701 returns to the step S112. At the step S112, the timer circuit 1701 restarts the timer put back by the constant time.

The motion sensor 1760 senses a human entrance when the user 1800 enters the sensing range 1761, and there is a small possibility that the user 1800 immediately leaves the sensing range 1760. Therefore, the timer circuit 1701 preferably resets the timer at the step S116A thereby bringing the LED lamp 1101 into the lighting-up state for a sufficiently long time (90 sec. as the prescribed time, for example). When the motion sensor 1760 senses no human entrance but the radio wave strength Rw is greater than the reference radio wave strength Rws at the step S115, on the other hand, there is a strong possibility that the user 1800 already entering the sensing range 1761 stays in a portion around the LED lamp 1101. In this case, there is a possibility that the user 1800 leaves the portion around the LED lamp 1101 in a relatively short time. Therefore, the timer circuit 1701 puts back the timer by the constant time without resetting the count thereof to zero at the step S116B, so that the LED lamp 1101 can be prevented from being incorrectly kept in the lighting-up state although the user 1800 has thereafter left the portion around the LED lamp 1101.

The LED lamp according to the second structural example of the present invention is not restricted to the aforementioned embodiment. The specific structures of the respective portions of the LED lamp according to the second structural example of the present invention can be freely changed in design.

The LED lamp 1101 is not restricted to that similar in appearance to the so-called straight fluorescent lamp, but may have a bulb-type appearance, for example. The radio wave transmission means in the present invention is represented by the portable telephone but not restricted thereto, and may be a portable Wi-Fi router, for example.

[3] Third Structural Example

Figure 39:
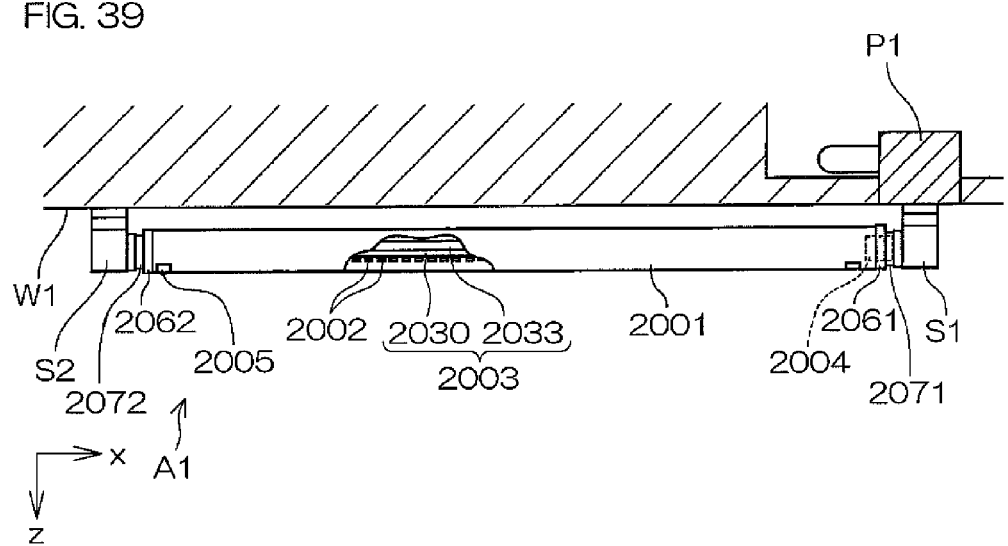
FIG. 39 illustrates a state where an LED lamp with a motion sensor according to a first embodiment of a third structural example of the present invention is set on a ceiling.

FIGS. 39 to 45 show an LED lamp A1 with a motion sensor according to a first embodiment of a third structural example of the present invention. As shown in FIG. 39, the LED lamp A1 with a motion sensor is fixed to a ceiling W1 as the substitution of a straight fluorescent lamp, and used for illuminating the room. In the following description, the longitudinal direction of the LED lamp A1 with a motion sensor is referred to as a direction x, and directions orthogonal to the direction x are referred to as directions y and z. The direction z conforms to a direction directed from the ceiling W1 toward the floor face. Referring to FIG. 39, a power supply device P1 connected to a commercial power source, a socket S1 connected to the power supply device P1, and a socket S2 separating from the socket S1 in the direction x are provided on the ceiling W1. First and second end portions of the LED lamp A1 with a motion sensor in the direction x are fitted into the sockets S1 and S2 respectively, so that the LED lamp A1 with a motion sensor is fixed to the ceiling W1.

Figure 40:
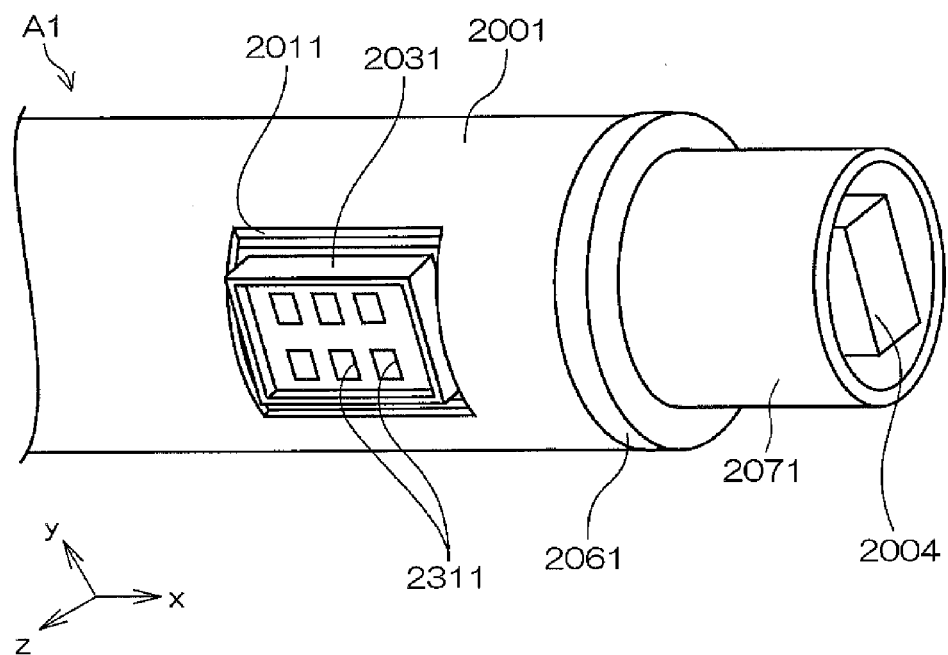
FIG. 40 is a perspective view showing a first end portion of the LED lamp with a motion sensor shown in FIG. 39.
Figure 41:
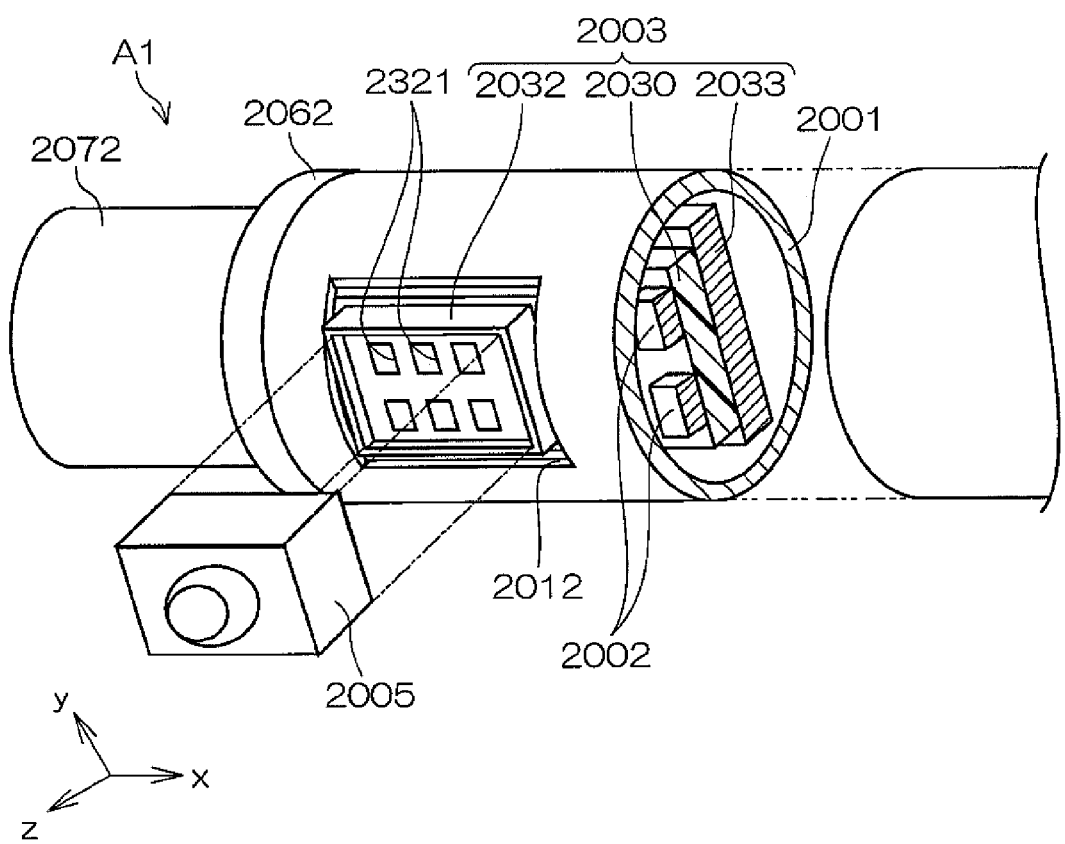
FIG. 41 is a perspective view showing a second end portion of the LED lamp with a motion sensor shown in FIG. 39.

As shown in FIGS. 39 to 41, the LED lamp A1 with a motion sensor includes a diffusing cover 2001 in the form of a cylinder elongating in the direction x and a plurality of LED modules 2002 arrayed along the direction x, to have an appearance similar to that of a straight fluorescent lamp. The diffusing cover 2001 covers the plurality of LED modules 2002, as shown in FIG. 41. The LED lamp A1 with a motion sensor further includes a support member 2003 supporting the plurality of LED modules 2002, an electrical circuit component 2004, a motion sensor 2005, end caps 2061 and 2062, and bases 2071 and 2072, as shown in FIG. 39. The end cap 2061 and the base 2071 are positioned on a first side in the direction x, and the end cap 2062 and the base 2072 are positioned on a second side in the direction x, as shown in FIG. 39.

The diffusion cover 2001 is made of transparent polycarbonate resin to which a diffusing material such as mercury chloride is added, for example. The diffusing cover 2001 diffuses and transmits light received from the LED modules 2002. An opening 2011 rectangular as viewed along the direction z is formed on a first end portion of the diffusing cover 2001 in the direction x, as shown in FIG. 40. Further, an opening 2012 rectangular as viewed along the direction z is formed on a second end portion of the diffusing cover 2001 in the direction x, as shown in FIG. 41.

Each LED module 2002 stores an LED chip, and is formed to emit light mainly toward a first side in the direction z.

Figure 42:
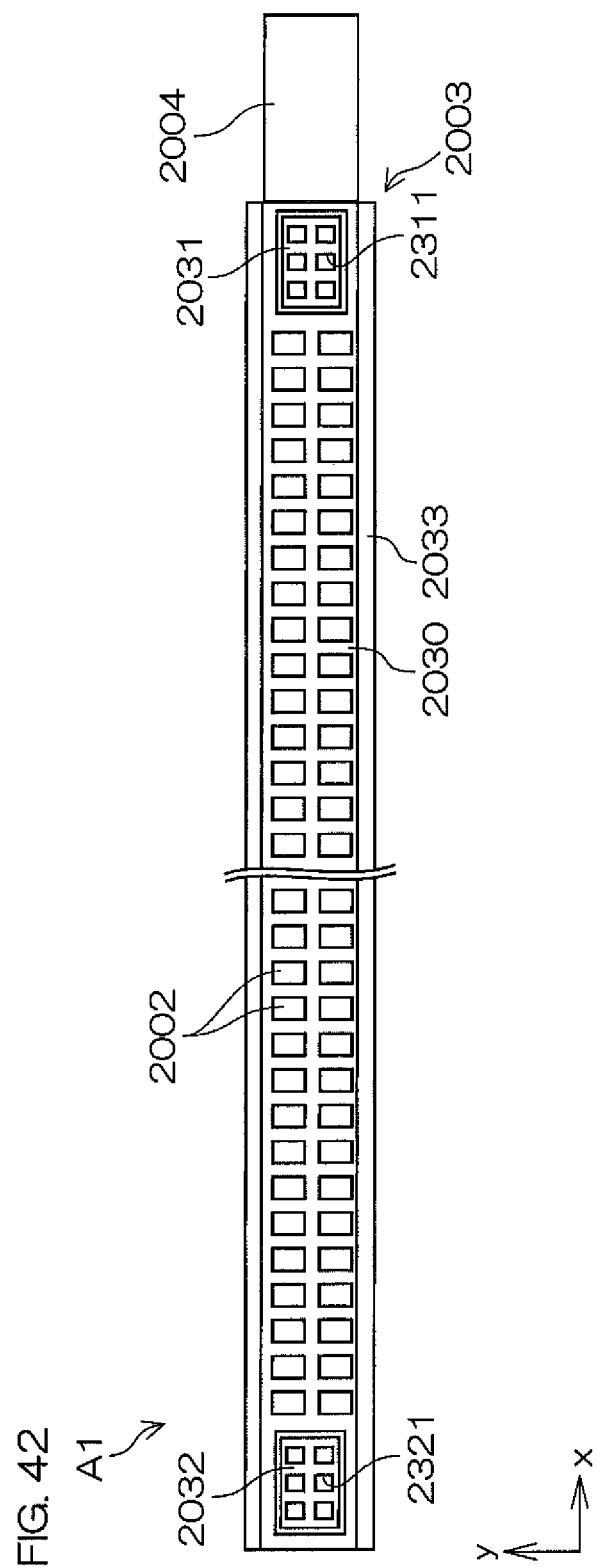
FIG. 42 is a plan view showing the interior of a principal portion of the LED lamp with a motion sensor shown in FIG. 39.

As shown in FIG. 42, the support member 2003 elongates along the direction x, and includes a substrate 2030, a first connector 2031, a second connector 2032, and a radiator plate 2033. The substrate 2030 is rectangular as viewed along the direction z. As shown in FIG. 41, a first surface of the substrate 2030 in the direction z serves as a set surface where the LED modules 2002 are set, and a surface opposite thereto is in contact with the radiator plate 2033. The set surface is perpendicular to the direction z, and includes the direction x. Heat generated by the LED modules 2002 when turned on is quickly transmitted to the radiator plate 2033 through the substrate 2030.

As shown in FIG. 42, the first and second connectors 2031 and 2032 are set on first and second end portions of the substrate 2030 in the direction x respectively. According to this arrangement, the second connector 2032 is separate from the first connector 2031. The first connector 2031 is exposed outward from the opening 2011 of the diffusing cover 2001, as shown in FIG. 40. Referring to FIG. 40, the first connector 2031 is provided with a plurality of terminal engaging portions 2311 rectangular as viewed along the direction z. The second connector 2032 is exposed outward from the opening 2012 of the diffusing cover 2001, as shown in FIG. 41. Referring to FIG. 41, the second connector 2032 is provided with a plurality of terminal engaging portions 2321 rectangular as viewed along the direction z. The terminal engaging portions 2311 and 2321 are identical in number to one another, and also identical in shape as viewed along the direction z to one another.

The electrical circuit component 2004 is se to be adjacent to a first end portion of the support member 2003 in the direction x, as shown in FIG. 42. The electrical circuit component 2004 is stored in the base 2071 as shown in FIG. 40, and connected to the power supply device P1 through the socket S1. The electrical circuit component 2004 stores a transformer circuit rectifying alternating current supplied by the power supply device P1 to direct current, and a control circuit connected to the plurality of LED modules 2002. The control circuit performs control for feeding direct current obtained by a rectifying circuit to the plurality of LED modules 2002 as constant current. The control circuit is connected to the first and second connectors 2031 and 2032.

A wiring pattern (not shown) is provided on the substrate 2030. The wiring pattern (not shown) is electrically connected with the electrical circuit component 2004 by a wire (not shown). The aforementioned control circuit is connected with the plurality of LED modules 2002 through the wire (not shown) and the wiring pattern (not shown). The control circuit is also connected with the first and second connectors 2031 and 2032 through the wire (not shown) and the wiring pattern (not shown).

Figure 43:
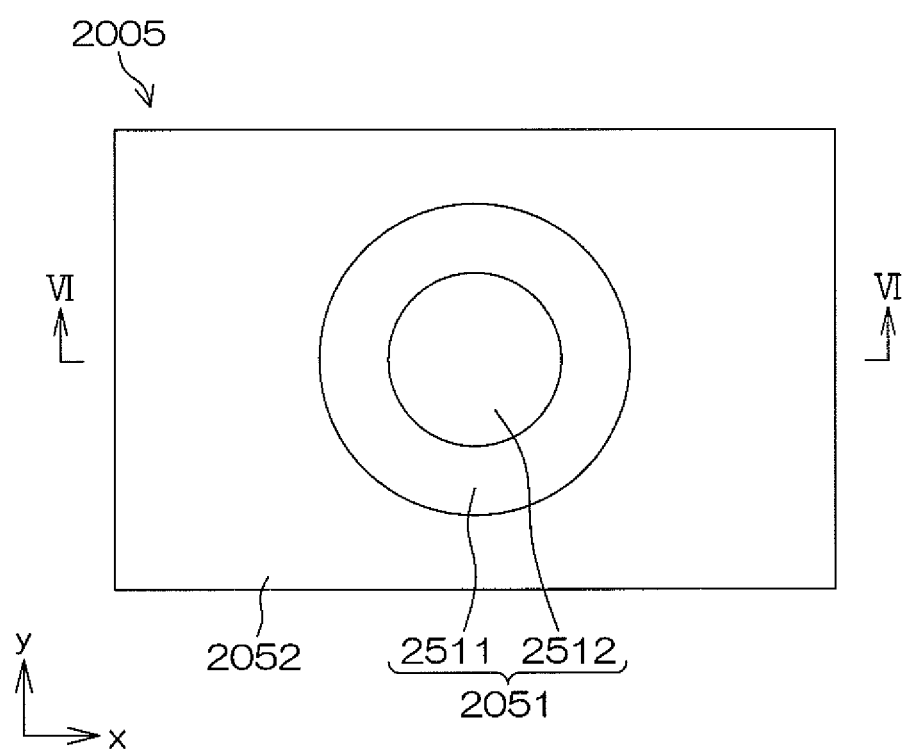
FIG. 43 is a plan view showing the motion sensor of the LED lamp with a motion sensor shown in FIG. 39.
Figure 44:
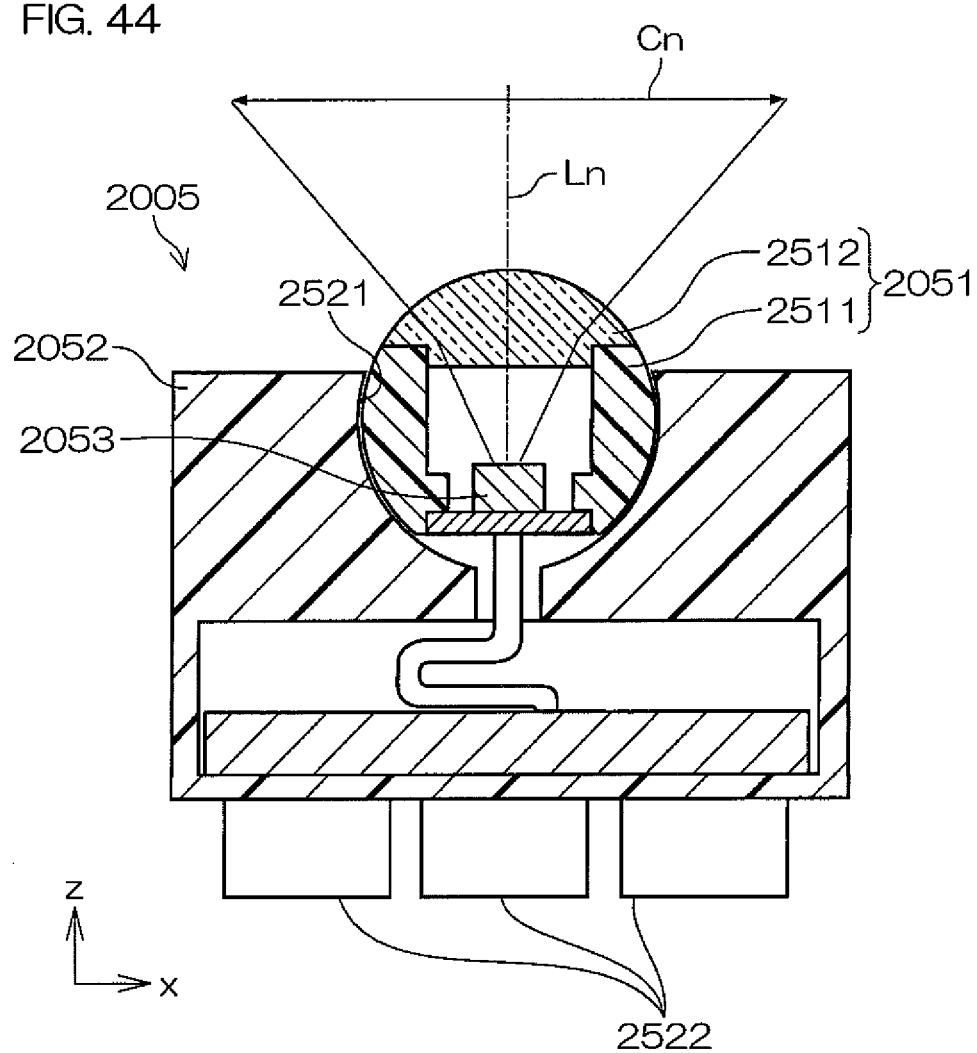
FIG. 44 is a sectional view taken along a line VI-VI in FIG. 43.

The motion sensor 2005 includes a spherical member 2051, a holding portion 2052 pivotably holding the spherical member 2051, and a sensor portion 2053, as shown in FIGS. 43 and 44. The spherical member 2051 includes a body portion 2511 having a hollowed inner portion, and a condensing portion 2512 coupled to an upper end portion of the body portion 2511 in the direction z shown in FIG. 44. The sensor portion 2053 is a thermopile utilizing a thermoelectromotive effect or a pyroelectric member utilizing a pyroelectric effect, for example, and formed to output a signal by receiving infrared rays. The sensor portion 2053 is provided in the body portion 2511, as shown in FIG. 44. The condensing portion 2512 functions as a lens for condensing infrared rays on the sensor portion 2053. The holding portion 2052 is provided with a recess portion 2521 engaging with the spherical member 2051. As shown in FIG. 44, the recess portion 2521 is formed to upwardly open in the direction z. The opening of the recess portion 2521 is provided in the form of a circle having a smaller diameter than the spherical member 2051 as viewed along the direction z, so that the spherical member 2051 does not fall out of the recess portion 2521. The holding portion 2052 includes a plurality of terminal portions 2522 protruding downward in FIG. 44 in the direction z. As shown in FIG. 45, the terminal portions 2522 are rectangular as viewed along the direction z, and couplable to both of the terminal engaging portions 2311 and 2321 of the first and second connectors 2031 and 2032.

The motion sensor 2005 is connected to the control circuit provided in the electrical circuit component 2004 through the first connector 2031 or the second connector 2032. The control circuit receives the signal output from the sensor portion 2053 and controls the current to the plurality of LED modules 2002. More specifically, the sensor portion 2053 outputs a relatively strong electrical signal to the control circuit when receiving infrared rays of prescribed strength. When receiving the relatively strong electrical signal, the control circuit feeds the current to the LED modules 2002. When the strength of the infrared rays received by the sensor portion 2053 is less than a prescribed level, on the other hand, the sensor portion 2053 outputs a relatively weak electrical signal to the control circuit. When receiving the relatively weak electrical signal, the control circuit feeds no current to the LED modules 2002.

It follows that the motion sensor 2005 has a detection range responsive to the condensing function of the condensing portion 2512. When the condensing portion 2512 condenses infrared rays in a range Cn centering on a central axis Ln on the sensor portion 2053 as shown in FIG. 44, for example, the range Cn serves as the detection range of the motion sensor 2005. It is assumed that the direction where the condensing portion 2512 is directed toward the central axis Ln (the direction of the central axis Ln) is the main detecting direction of the motion sensor 2005.

The motion sensor 2005 can change the aforementioned main detecting direction by pivoting the spherical member 2051 in the recess portion 2521. At this time, it follows that the detection range, centering on the main detecting direction, also changes.

The end cap 2061 is mounted on a first end portion of the diffusing cover 2001 in the direction x. The base 2071 is mounted on the end cap 2061 to protrude in the direction x. The base 2071 engaged with the socket S1.

The end cap 2062 is mounted on a second end portion of the diffusing cover 2001 in the direction x. The base 2072 is mounted on the end cap 2062 to protrude in the direction x. The base 2072 is engaged with the socket S2.

Functions of the LED lamp A1 with a motion sensor are further described with reference to FIGS. 46 to 63.

The aforementioned LED lamp A1 with a motion sensor can enter a first used state where the motion sensor 2005 is coupled to the first connector 2031 and a second used state where the motion sensor 2005 is coupled to the second connector 2032. In the first used state, the motion sensor 2005 is connected to the control circuit in the electrical circuit component 2004 through the first connector 2031. In the second used state, the motion sensor 2005 is connected to the control circuit in the electrical circuit component 2004 through the second connector 2032.

FIGS. 46 to 53 show a situation where the LED lamp A1 with a motion sensor is set close to a wall W2. Such a situation takes place when the power supply device P1 for a fluorescent lamp having been set in the vicinity of the wall W2 is to be utilized, as described with reference to the related art.

Figure 46:
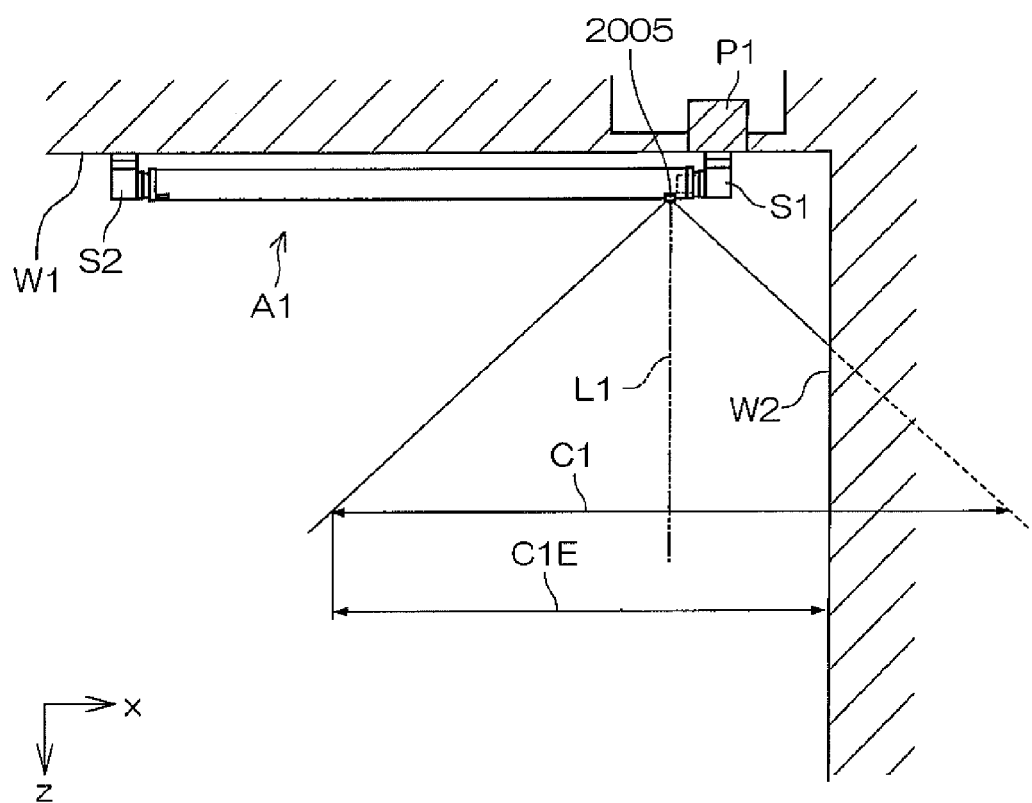
FIG. 46 is a diagram showing a first used state of the LED lamp with a motion sensor shown in FIG. 39.
Figure 47:
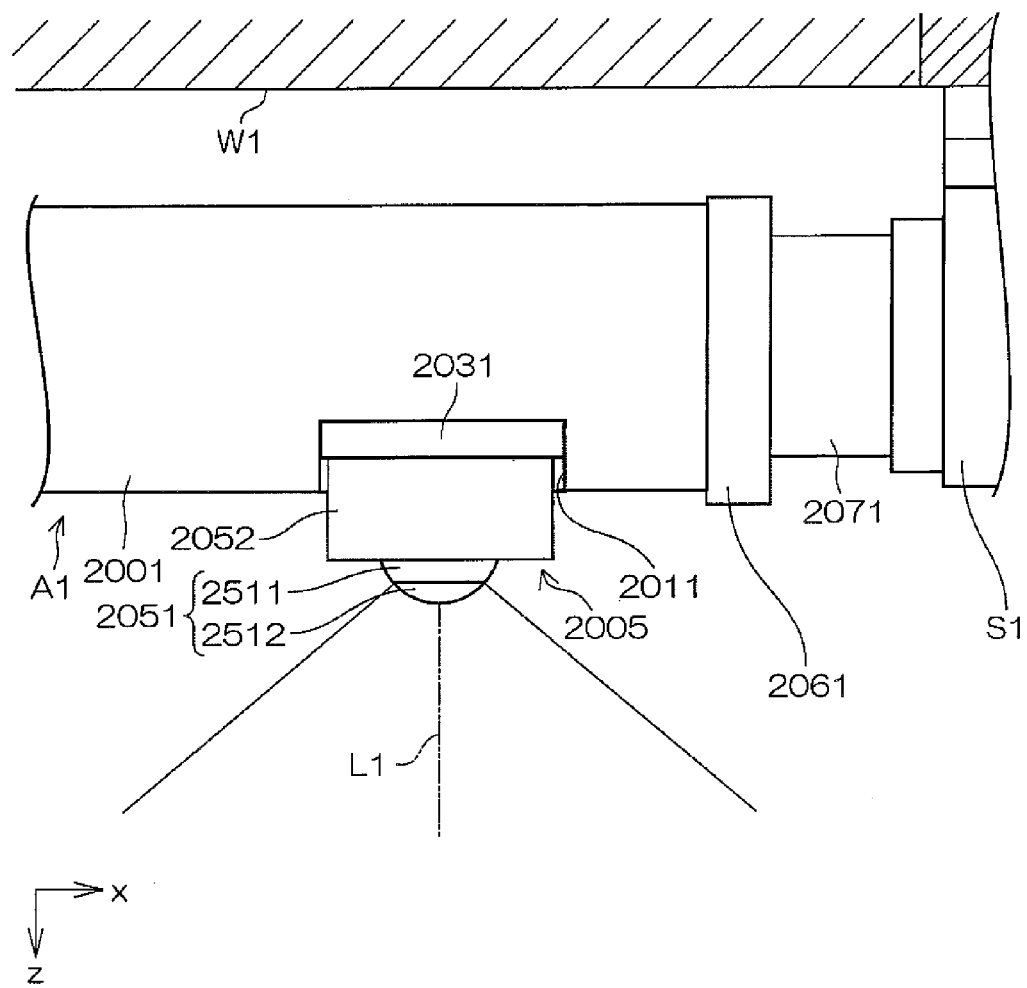
FIG. 47 is an enlarged view of a principal portion of the LED lamp with a motion sensor shown in FIG. 46.

Referring to FIGS. 46 and 47, the LED lamp A1 with a motion sensor is in the first used state, and the main detecting direction of the motion sensor 2005 is directed toward the direction z. As shown in FIG. 47, the holding portion 2052 enters a first holding state holding the spherical member 2051 to direct the condensing portion 2512 downward in FIG. 47. In the first holding state of the holding portion 2052, the motion sensor 2005 has a detection range C1 centering on an axis L1 directed toward the direction z. However, it follows that the detection range C1 partially overlaps with the wall W2 as shown in FIG. 46, and an actually effective detection range C1E is narrower than the detection range C1. When the condensing portion 2512 is so designed that the detection range C1 precisely corresponds to the width of the room, the detection range C1E is narrower than the width of the room. In this case, there is a possibility that the motion sensor 2005 cannot sufficiently detect infrared rays emitted by a human being present in the room on the side opposite to the wall W2 and the LED lamp A1 with a motion sensor is turned off.

Figure 48:
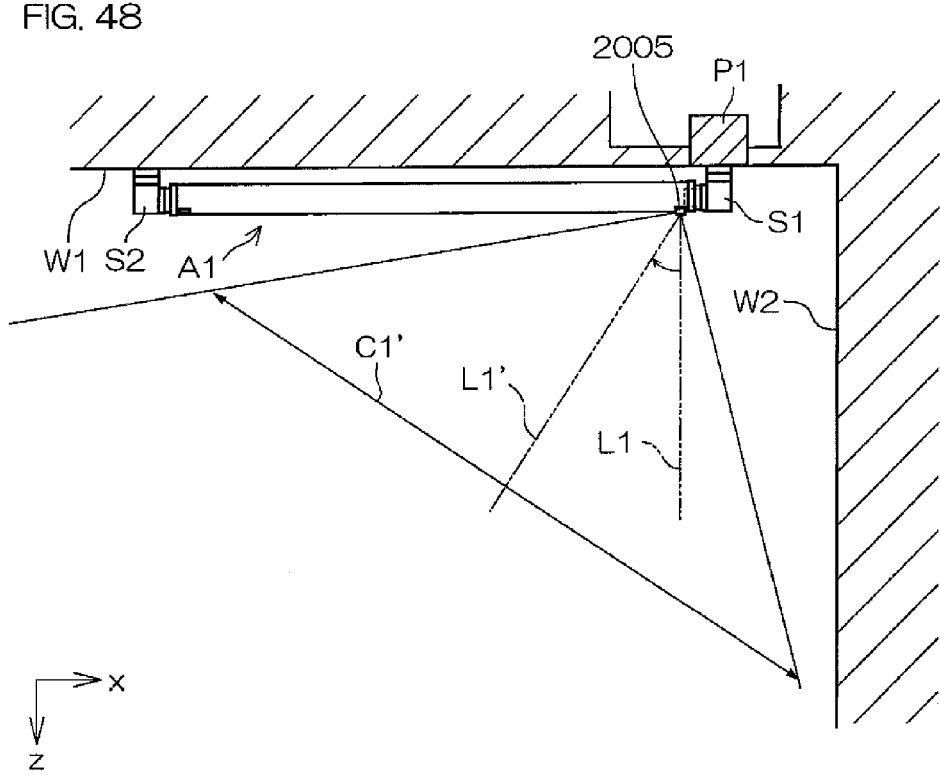
FIG. 48 is a diagram showing a state after changing a detection range from the state shown in FIG. 46.
Figure 49:
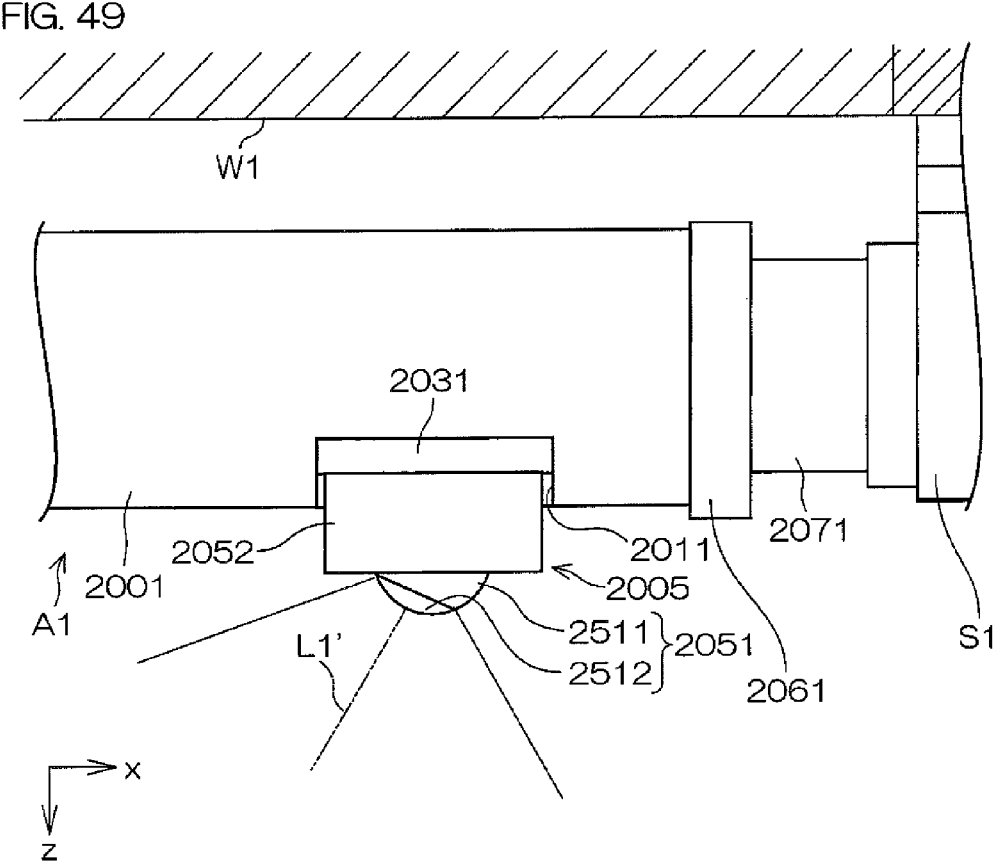
FIG. 49 is an enlarged view of a principal portion of the LED lamp with a motion sensor shown in FIG. 48.

The aforementioned problem arising in the LED lamp A1 with a motion sensor can be solved by changing the direction of the spherical member 2051, as shown in FIGS. 48 and 49.

When the spherical member 2051 is pivoted so that the holding portion 2052 enters a second holding state different from the first holding state as shown in FIG. 49, the direction of the condensing portion 2512 and the sensor portion 2053 stored in the body portion 2511 is changed. The main detecting direction of the motion sensor 2005 in the second holding state of the holding portion 2052 is inclined with respect to the direction z, and an axis L1' directed toward the main detecting direction is inclined with respect to the axis L1. At this time, the motion sensor 2005 has a detection range C1' centering on the axis L1', as shown in FIG. 48.

When the axis L1' is inclined to separate from the wall W2 in the direction x toward the lower side in the direction z as shown in FIG. 48, the detection range C1' can be easily prevented from overlapping with the wall W2. The detection range C1' is closer to the side opposite to the wall W2 than the detection range C1, and the aforementioned problem hardly arises.

Figure 50:
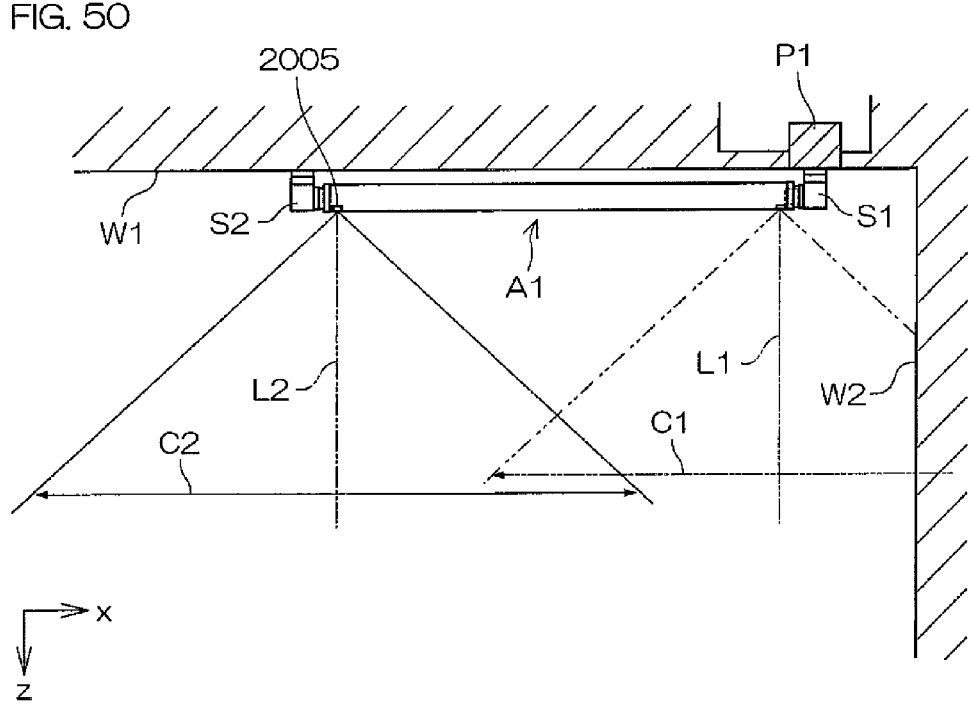
FIG. 50 is a diagram showing a second used state of the LED lamp with a motion sensor shown in FIG. 39.
Figure 51:
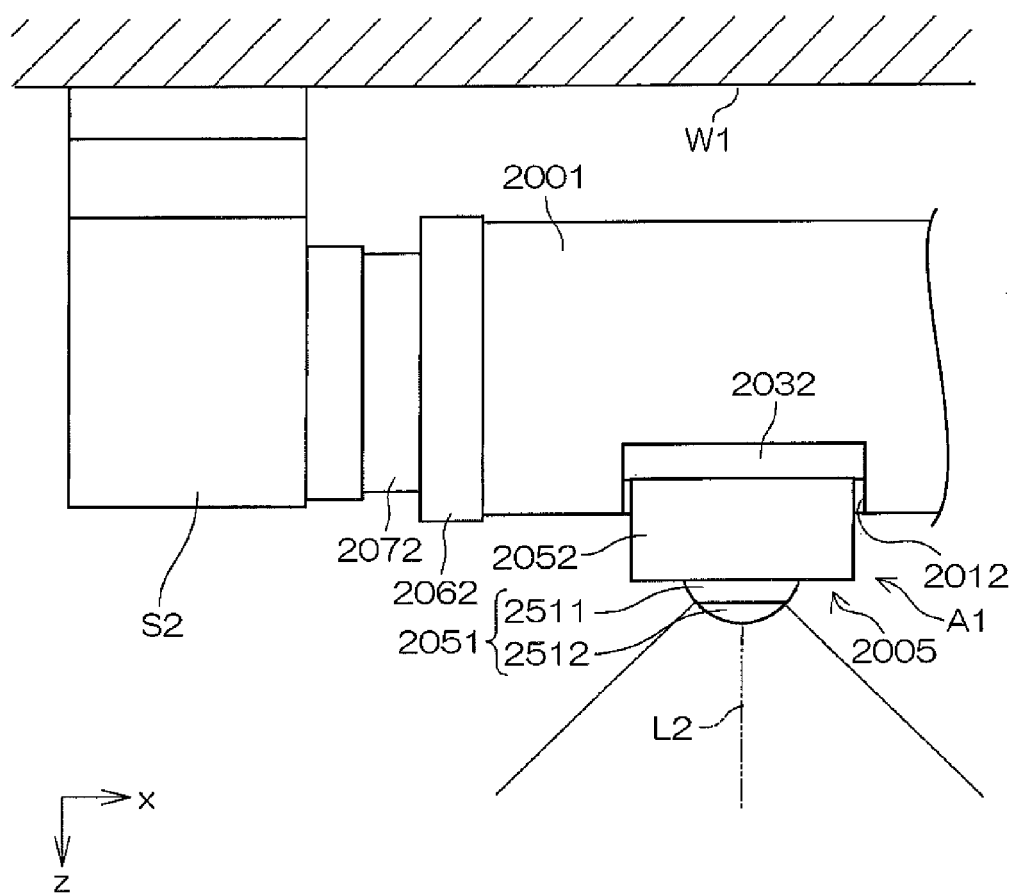
FIG. 51 is an enlarged view of a principal portion of the LED lamp with a motion sensor shown in FIG. 50.

The aforementioned problem can also be solved by bringing the LED lamp A1 with a motion sensor into the second used state, as shown in FIGS. 50 and 51.

The motion sensor 2005 is coupled to the second connector 2032, as shown in FIG. 51. The holding portion 2052 is in the first holding state, and the main detecting direction of the motion sensor 2005 is directed toward the direction z. At this time, the motion sensor 2005 has a detection range C2 centering on an axis L2 directed toward the direction z. The detection range C2 corresponds to that obtained by horizontally moving the detection range C1 in the direction x by the length of the space between the first and second connectors 2031 and 2032. The detection range C2 includes a region not included in the detection range C1, as a matter of course. As shown in FIG. 50, the second connector 2032 is on a position farther from the wall W2 as compared with the first connector 2031, and the detection range C2 hardly overlaps with the wall W2.

If the room elongates in the direction x, however, the detection range C2 may not cover the whole room when the motion sensor 2005 is simply horizontally moved. In this case, the problem can be solved by bringing the holding portion 2052 into the second holding state, as shown in FIGS. 52 and 53.

Figure 53:
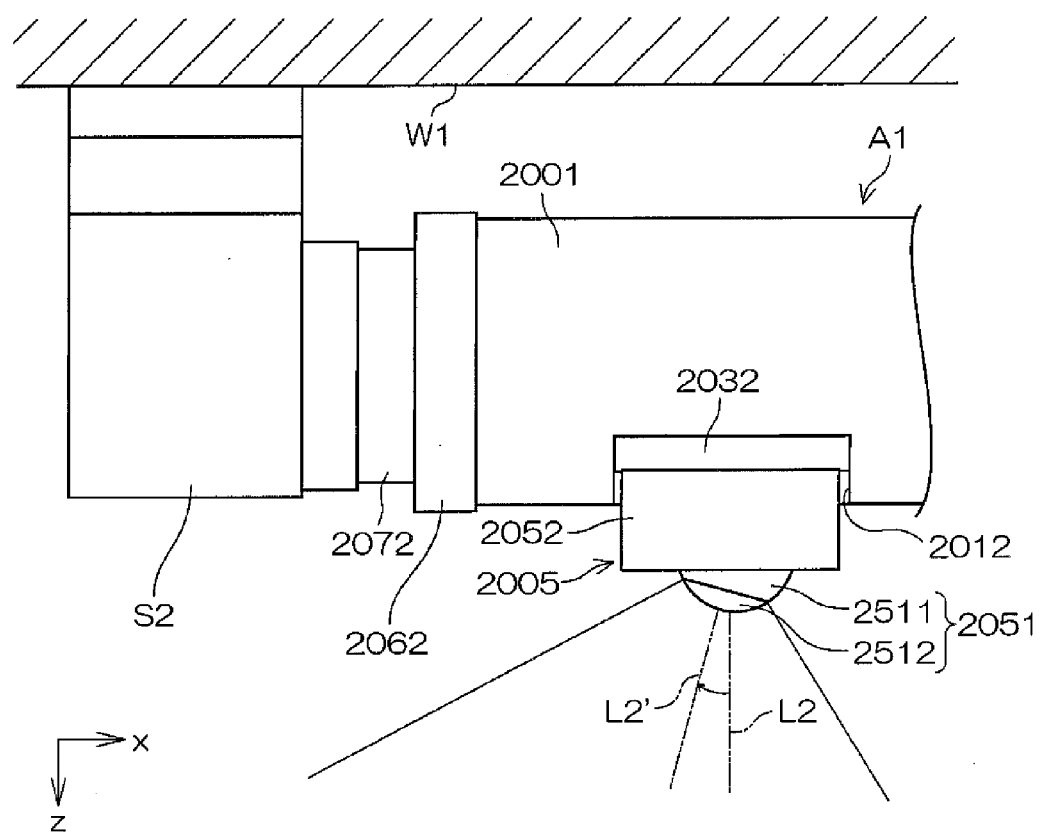
FIG. 53 is an enlarged view of a principal portion of the LED lamp with a motion sensor shown in FIG. 52.

When the spherical member 2051 is pivoted so that the holding portion 2052 enters the second holding state as shown in FIG. 53, the motion sensor 2005 has a detection range C2' centering on an axis L2' directed toward a main detecting direction inclined with respect to the direction z.

Figure 52:
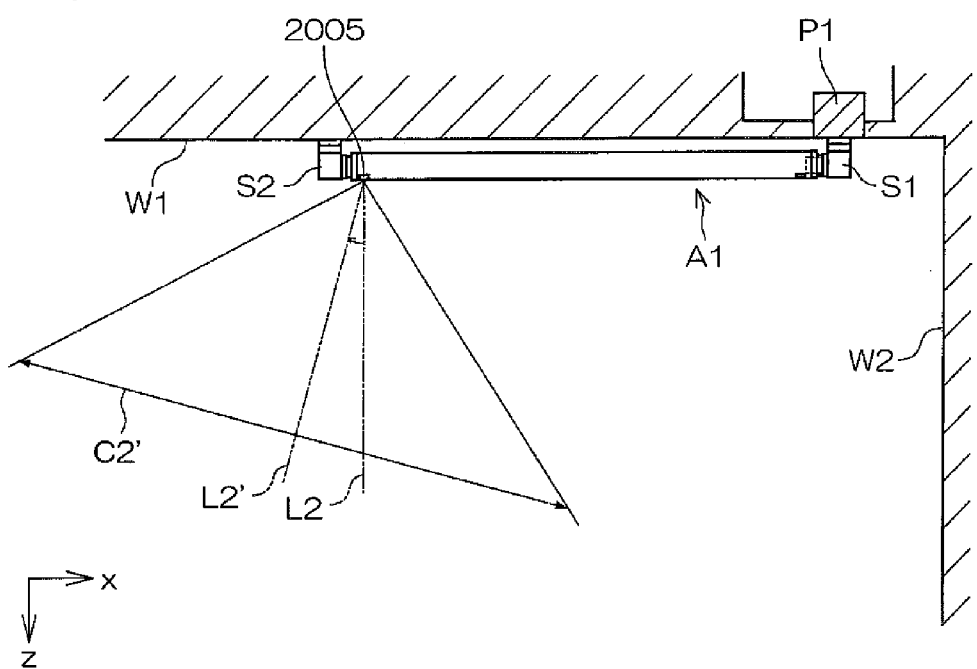
FIG. 52 is a diagram showing a state after changing a detection range from the state shown in FIG. 50.

When the axis L2' is set to separate from the wall W2 in the direction x toward the lower side in the direction z as shown in FIG. 52, the detection range C2' can be more easily prevented from overlapping with the wall W2. The detection range C2' is closer to the side opposite to the wall W2 than the detection range C2, and the aforementioned problem hardly arises.

As hereinabove described, the detection range of the motion sensor 2005 of the LED lamp A1 with a motion sensor is changeable in various ways, whereby a detection range hardly influenced by a wall can be selected even if the LED lamp A1 with a motion sensor must be set close to the wall. A proper detection range is so selected that the motion sensor 2005 of the LED lamp A1 with a motion sensor can more correctly determine the presence or absence of a human being.

FIGS. 54 to 61 show further embodiments of the third structural example of the present invention. Referring to FIGS. 54 to 61, elements identical or similar to those of the aforementioned first embodiment of the third structural example are denoted by the same reference signs.

Figure 54:
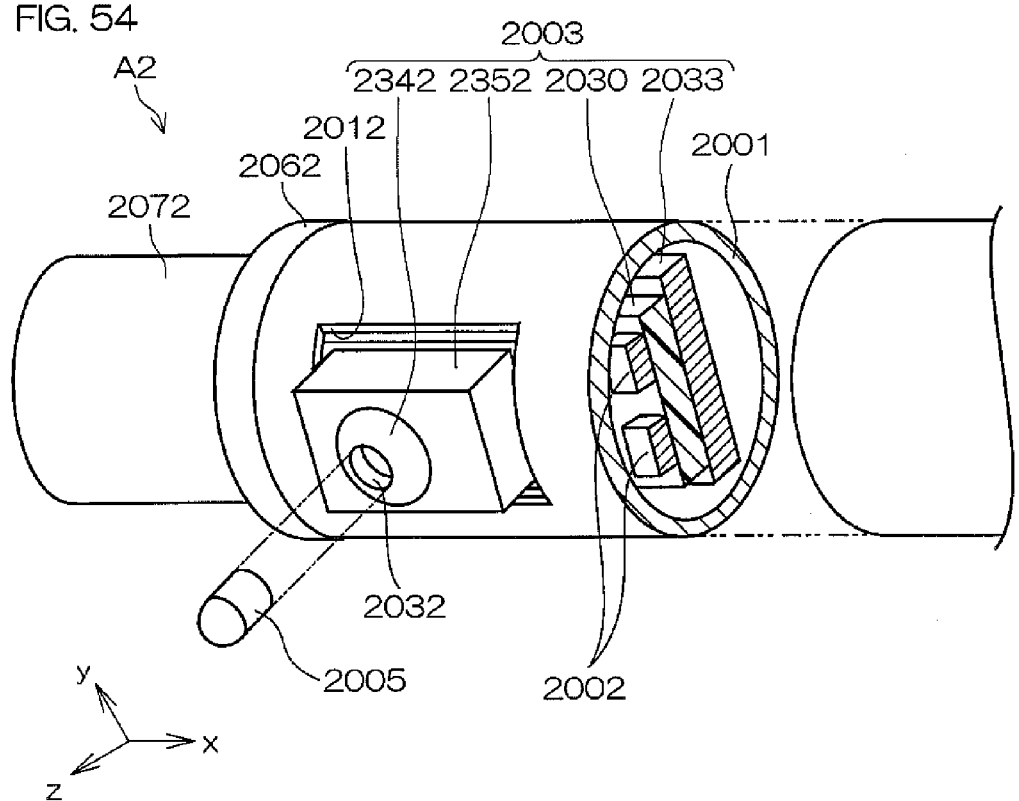
FIG. 54 is a perspective view showing a second end portion of an LED lamp with a motion sensor according to a second embodiment of the third structural example of the present invention.
Figure 55:
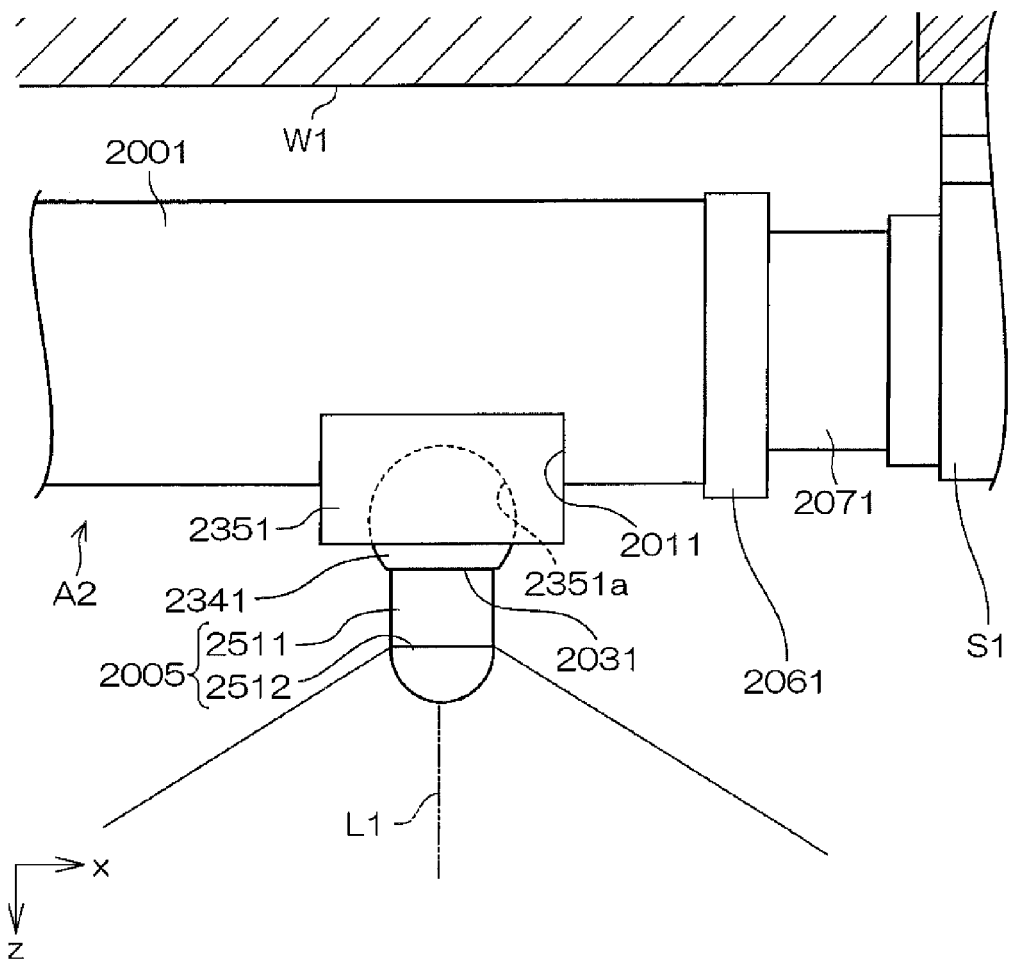
FIG. 55 is a perspective view showing a first end portion of the LED lamp with a motion sensor shown in FIG. 54.

FIGS. 54 and 55 show an LED lamp A2 with a motion sensor according to a second embodiment of the third structural example of the present invention. In the LED lamp A2 with a motion sensor shown in FIGS. 54 and 55, a mechanism for changing a main detecting direction of a motion sensor 2005 is different from that in the LED lamp A1 with a motion sensor, while the remaining structure is similar to that of the LED lamp A1 with a motion sensor.

According to the second embodiment, the motion sensor 2005 includes a cylindrical body portion 2511 and a semispherical condensing portion 2512 mounted on the forward end of the body portion 2511. A sensor portion similar to the sensor portion 2053 of the LED lamp A1 with a motion sensor is provided in the body portion 2511.

According to the second embodiment, a support member 2033 includes a first movable portion 2341, a second movable portion 2342, a first holding portion 2351, and a second holding portion 2352. The first holding portion 2351 holds the first movable portion 2341 to be displaceable, while the second holding portion 2352 holds the second movable portion 2342 to be displaceable. The first holding portion 2351 is set on a first end portion of a substrate 2030 in a direction x to protrude from an opening 2011 in a direction z, as shown in FIG. 55. The second holding portion 2352 is set on a second end portion of the substrate 2030 in the direction x to protrude from an opening 2012 in the direction z, as shown in FIG. 54. The first and second holding portions 2351 and 2352, set on different positions, are identical in structure to each other. The first and second movable portions 2341 and 2342, set on different positions, are also identical in structure to each other.

The first and second movable portions 2341 and 2342 are spherically formed. The first movable portion 2341 is provided with a first connector 2031, while the second movable portion 2342 is provided with a second connector 2032. The first holding portion 2351 is provided with a recess portion 2351a engaging with the first movable portion 2341. The second holding portion 2352 is provided with a recess portion engaging with the second movable portion 2342.

Figure 56:
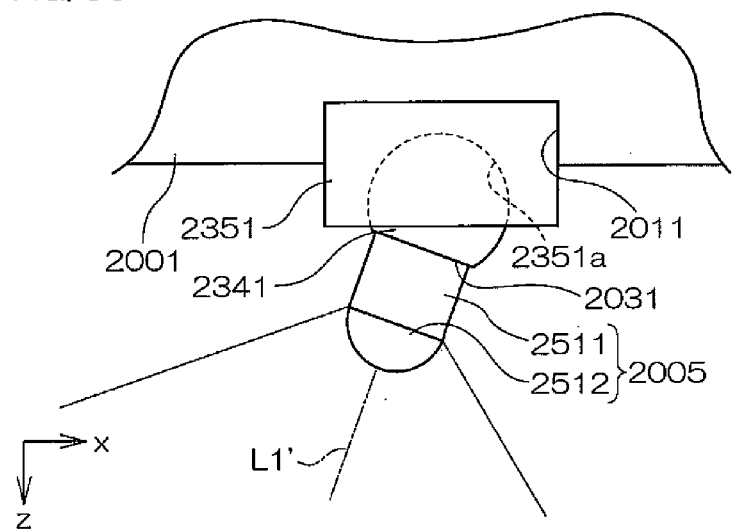
FIG. 56 is a diagram showing a state after rotation of a first movable portion shown in FIG. 55.

Referring to FIG. 55, the first movable portion 2341 is in a first displaced state. In the first displaced state of the first movable portion 2341, the motion sensor 2005 coupled to the first connector 2031 has a detection range centering on an axis L1 directed toward the direction z. Referring to FIG. 56, on the other hand, the first movable portion 2341 is in a second displaced state different from the first displaced state. The first movable portion 2341 is rotated in the recess portion 2351a, to be switched from the first displaced state to the second displaced state. In the second displaced state of the first movable portion 2341, the motion sensor 2005 coupled to the first connector 2031 has a detection range centering on an axis L1' inclined with respect to the direction z.

The second movable portion 2342 and the second holding portion 2352 are identical in structure to the first movable portion 2341 and the first holding portion 2351 respectively, and hence the second movable portion 2342 can also enter first and second displaced states.

The LED lamp A2 with a motion sensor can be enter a first used state where the motion sensor 2005 is coupled to the first connector 2031 and a second used state where the motion sensor 2005 is coupled to the second connector 2032, similarly to the LED lamp A1 with a motion sensor.

In the LED lamp A2 with a motion sensor, further, the motion sensor 2005 itself has no function of changing a main detecting direction, but the first and second movable portions 2341 and 2342 provided with the first and second connectors 2031 and 2032 are formed to be displaceable, as described above. Also according to this structure, the detection range of the motion sensor 2005 can be properly selected.

Figure 57:
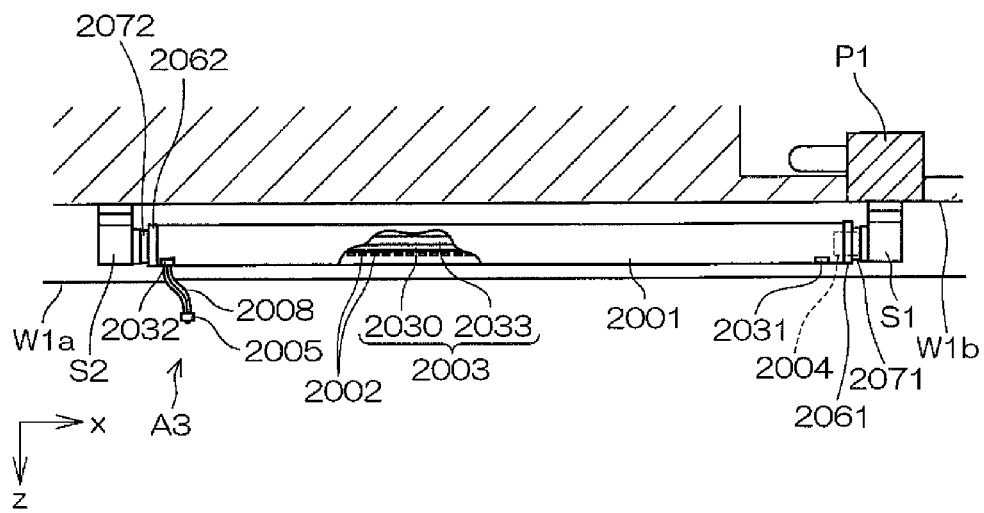
FIG. 57 is a diagram showing a state where an LED lamp with a motion sensor according to a third embodiment of the third structural example of the present invention is set to be recessed in a ceiling.

FIGS. 57 and 58 show an LED lamp A3 with a motion sensor according to a third embodiment of the third structural example of the present invention. The LED lamp A3 with a motion sensor shown in FIGS. 57 and 58 includes a flexible member 2008, while the details of a motion sensor 2005 thereof are different from those in the LED lamp A1 with a motion sensor. The remaining structure of the LED lamp A3 with a motion sensor is similar to that of the LED lamp A1 with a motion sensor. FIGS. 57 and 58 show a state where the LED lamp A3 with a motion sensor is mounted on a stepped ceiling W1a. As shown in FIGS. 57 and 58, the ceiling W1a is partially recessed to separate from the floor, and the LED lamp A3 with a motion sensor is mounted in a recess portion W1b.

When the motion sensor 2005 is directly coupled to a first connector 2031 or a second connector 2032 in such positional relation, the side surface of the recess portion W1b may limit a detection range of the motion sensor 2005. According to the third embodiment, therefore, the motion sensor 2005 fixed to the ceiling W1a is coupled to the first connector 2031 or the second connector 2032 with the flexible member 2008, as shown in FIG. 57.

The flexible member 2008 has a longitudinal direction, and includes first and second coupling portions 2081 and 2082 separating from each other in the longitudinal direction. More specifically, the flexible member 2008 is obtained by forming the first coupling portion 2081 couplable to the motion sensor 2005 on a first end portion of a member prepared by covering a plurality of copper wires with protective resin and forming the second coupling portion 2082 couplable to the first connector 2031 or the second connector 2032 on a second end portion. In the LED lamp A3 with a motion sensor, the second coupling portion 2082 is coupled to the first connector 2031 in a first used state, and the second coupling portion 2082 is coupled to the second connector 2032 in a second used state.

The motion sensor 2005 of the LED lamp A3 with a motion sensor according to the third embodiment includes a spherical member 2051 and a holding portion 2052. The holding portion 2052 is formed to be fixable to the ceiling W1a.

FIGS. 59 and 60 show an LED lamp A4 with a motion sensor according to a fourth embodiment of the third structural example of the present invention. The LED lamp A4 with a motion sensor shown in FIG. 59 is employed as the substitution of an annular fluorescent lamp. The basic structure of the LED lamp A4 with a motion sensor is similar to that of the LED lamp A1 with a motion sensor, while some points of the LED lamp A4 with a motion sensor are different from those of the LED lamp A1 with a motion sensor, in order to implement the annular structure. The points of the LED lamp A4 with a motion sensor different from those of the LED lamp A1 with a motion sensor are now described.

The LED lamp A4 with a motion sensor includes a base 2073 connected to a socket Sa coupled to a power supply device P1, and is provided with a diffusing cover 2001 annular as viewed along a direction z. The diffusing cover 2001 is set to link both ends of the base 2073 with each other. The diffusing cover 2001 stores a plurality of LED modules arrayed along the circumferential direction, and a support member supporting the plurality of LED modules. The support member includes a substrate, annular as viewed along the direction z, having a section similar to that of the substrate 2030 of the LED lamp A1 with a motion sensor, for example, and the plurality of LED modules are set on a set surface of the substrate. The base 2073 stores a control circuit controlling the plurality of LED modules.

According to this structure, it follows that both ends of the support member are positioned in the vicinity of both ends of the base 2073, to reduce the significance of providing connectors in the vicinity of both ends of the support member respectively as in the LED lamp A1 with a motion sensor. According to the fourth embodiment, therefore, the support member includes one connector 2036. The diffusing cover 2001 is provided with an opening exposing the connector 2036. The opening is formed on a position, such as that immediately close to the base 2073, for example, not overlapping with the plurality of LED modules as viewed along the direction z.

The motion sensor 2005 in the fourth embodiment is identical to the motion sensor 2005 of the LED lamp A1 with a motion sensor. The motion sensor 2005 is coupled to the connector 2036, and connected to the control circuit through the connector 2036.

The motion sensor 2005 is capable of changing a detection range thereof by rotating the spherical member 2051, as described with reference to the LED lamp A1 with a motion sensor. FIG. 60 illustrates a detection range C1 centering on an axis L1 directed toward the direction z and a detection range C2 centering on an axis L2 inclined with respect to the direction z. When a direction toward which the axis L1 is directed is regarded as a first main detecting direction, a direction toward which the axis L2 is directed can be regarded as a second main detecting direction.

A used state of the LED lamp A4 with a motion sensor cannot be varied with the position of the connector 2036, dissimilarly to the case of the LED lamp A1 with a motion sensor. Substitutionally, it follows that the used state of the LED lamp A4 with a motion sensor is changed by rotating the spherical member 2051. The LED lamp A4 with a motion sensor can enter a first used state where the motion sensor 2005 has the detection range C1, and a second used state where the motion sensor 2005 has the detection range C2.

Figure 61:
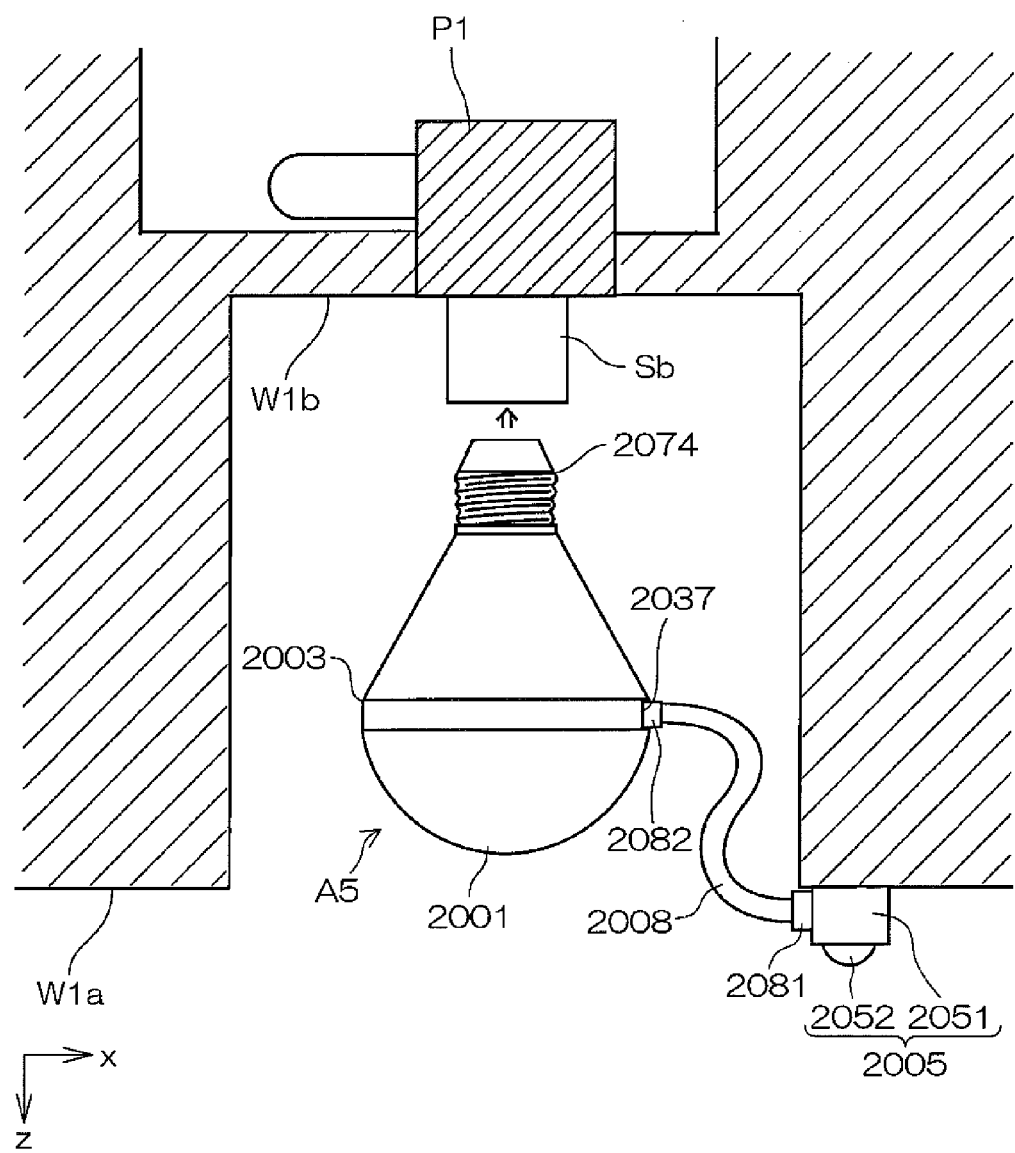
FIG. 61 illustrates an LED lamp with a motion sensor according to a fifth embodiment of the third structural example of the present invention.

FIG. 61 shows an LED lamp A5 with a motion sensor according to a fifth embodiment of the third structural example of the present invention. The LED lamp A5 with a motion sensor shown in FIG. 61 is employed as the substitution of an incandescent lamp. Referring to FIG. 61, a socket Sb is set in a recess portion W1b provided on a ceiling W1a. The socket Sb is connected to a power supply device P1 set on the ceiling W1a.

The LED lamp A5 with a motion sensor includes a generally semispherical diffusing cover 2001, a support member 2003, a base 2074, and a flexible member 2008, for example. A plurality of LED modules are set on the support member 2003. The diffusing cover 2001 covers the LED modules. The support member 2003 also stores a control circuit for controlling the LED modules. The base 2074 is fixed to an upper end portion of the support member 2003 in a direction Z in FIG. 61, and fitted into the socket Sb. The plurality of LED modules and the control circuit are connected to the power supply device P1 through the base 2074 and the socket Sb. The flexible member 2008 is similar to the flexible member 2008 of the LED lamp A3 with a motion sensor, for example. The motion sensor 2005 is similar to the motion sensor 2005 of the LED lamp A3 with a motion sensor, for example.

The support member 2003 includes a connector 2037, connected to the aforementioned control circuit, on a position not overlapping with the diffusing cover 2001 as viewed along a direction x. A second coupling portion 2082 of the flexible member 2008 is coupled to the connector 2037.

Such an LED lamp A5 with a motion sensor tends to elongate in the direction z, and is often stored in the recess portion W1b, as shown in FIG. 61. In this case, there is a possibility that the side surface of the recess portion W1b limits a detection range of the motion sensor 2005, even if the motion sensor 2005 is arranged on the diffusing cover 2001 relatively close to the floor in the direction z. Also in this case, the motion sensor 2005 can be set in a state pulled out of the recess portion W1b due to the flexible member 2008 provided on the LED lamp A5 with a motion sensor, and the detection range of the motion sensor 2005 can be prevented from narrowing.

The LED lamp with a motion sensor according to the third structural example of the present invention is not restricted to the aforementioned embodiments. The specific structures of the respective portions of the LED lamp with a motion sensor according to the third structural example of the present invention can be changed in design in various ways.

For example, the motion sensor 2005 has a function of changing the main detecting direction in each of the LED lamps A3 and A5 with motion sensors, similarly to that of the LED lamp A1 with a motion sensor. According to the structure of each of the LED lamps A3 and A5 with motion sensors, however, the motion sensor 2005 can be set on a relatively free position with the flexible member 2008. Therefore, the motion sensor 2005 may be brought into a simple structure similar to that of the motion sensor 2005 of the LED lamp A2 with a motion sensor, so that each of the LED lamps A3 and A5 with motion sensors is brought into a first used state and a second used state by changing the set position of the motion sensor 2005. The set position of the motion sensor 2005 can be easily changed by deforming the flexible member 2008.

The first and second connectors 2031 and 3032, fixed in the LED lamp A1 with a motion sensor, may alternatively be provided on first and second movable portions 2341 and 2342, similarly to the first and second connectors 2031 and 2032 of the LED lamp A2 with a motion sensor. In this case, it follows that the holding portion 2052 holding the spherical member 2051 is fitted into the first or second movable portion 2341 or 2342. In this case, the detection range can be more widely changed.

In the LED lamp A1 with a motion sensor, the first and second connectors 2031 and 2032 may be formed to be movable in the direction z. The LED lamp A1 with a motion sensor may also be set on a recessed portion of the ceiling W1, as in the situation described with reference to the LED lamp A3 with a motion sensor. When the first and second connectors 2031 and 2032 are so formed that the same can be pulled out to approach the floor face in the direction z in this case, the detection range of the motion sensor 2005 is hardly narrowed by the recess in the ceiling W1. The motion sensor 2005 itself may have a function of moving the condensing portion 2512 to approach the floor face in the direction z.

In the LED lamp A1 with a motion sensor, the control circuit provided in the electrical circuit portion 2004 may have a switching function, to be capable of turning on the plurality of LED modules 2002 regardless of a signal received from the motion sensor 2005. In this case, the first and second connectors 2031 and 2032 are preferably covered with a cover similar in appearance to the diffusing cover 2001. This is also applicable to the LED lamps A2 to A4 with motion sensors.

The present invention may be embodied in other ways in the range of the scope of claims for patent.

From the description of this specification and the attached drawings, the following characteristics are extractable, in addition to those described in the scope of claims for patent:

A1. An LED lamp mounted on a lighting fixture, including:
an LED source portion including a plurality of LED chips;
a motion sensor having a sensitivity region centering on a sensitivity axis; and a case holding the LED source portion and the motion sensor in common, wherein an illumination axis passing through the center of a light-emitting area of the LED source portion and the sensitivity axis of the motion sensor are unparallel to each other.

According to this structure, the LED lamp stores the motion sensor, whereby an illuminator having a function capable of sensing human entrance into the periphery of an illuminated region can be provided also when the lighting fixture includes no motion sensor. Further, the illumination axis and the sensitivity axis of the motion sensor are unparallel to each other, whereby the illumination axis and the sensitivity axis can be independently set. Therefore, the sensitivity region of the motion sensor can be set so that the motion sensor can excellently sense human entrance into the periphery of the illuminated region, while improving the appearance of the LED lamp in a lighting-up state by arranging the motion sensor on a position avoiding the center of the light-emitting area of the LED source portion, for example. Thus, an LED lamp compatibly attaining an improved appearance in the lighting-up state and an excellent human sensing function can be provided.

The case may be provided in the form of a bulb, or may be in the form of a straight pipe. In other words, the LED lamp may be provided in the form of a bulb employable as the substitution of a bulb, or may be provided in the form of a straight pipe employable as a straight fluorescent lamp.

A2. The LED lamp according to Item A1, wherein the case is provided in the form of a straight pipe extending in a prescribed longitudinal direction, the plurality of LED chips are arrayed to extend in the prescribed direction, and the motion sensor is arranged on a position separating from the longitudinal center of the case.

According to this structure, the motion sensor is arranged on the position separating from the longitudinal center of the case, whereby the longitudinal center is not darkened when the LED lamp is turned on. Therefore, a straight LED lamp appearing excellent in a lighting-up state can be provided.

A3. The LED lamp according to Item A2, wherein the illumination axis is orthogonal to the longitudinal direction of the case, and the sensitivity axis of the motion sensor is inclined in a direction approaching the illumination axis from the motion sensor.

According to this structure, the illuminated region spreading around the illumination axis and the sensitivity region of the motion sensor can be conformed to each other. Thus, an LED lamp capable of excellently sensing human entrance into the periphery of the illuminated region and exhibiting an excellent appearance with no dark portion at the longitudinal center can be provided.

A4. The LED lamp according to Item A2 or A3, wherein the motion sensor is arranged on a longitudinal end portion of the case.

According to this structure, no dark portion resulting from the motion sensor is formed on an intermediate portion of the light-emitting area of the LED source portion extending along the longitudinal direction of the case. Therefore, the appearance of the LED lamp in a lighting-up state can be more improved.

A5. The LED lamp according to Item A4, further including a pair of connectors provided on both longitudinal end portions of the case for detachably holding the motion sensor and electrically connected to the motion sensor.

According to this structure, the motion sensor can be attached to or detached from either connector provided on the LED lamp, whereby a human sensing function can be arbitrarily added to the LED lamp. In other words, an LED lamp designed to be applicable to a specification with no human sensing function and that with a human sensing function in common can be provided. In addition, a motion sensor having a proper structure can be selected and used in response to the type or the arrangement of the lighting fixture. The connectors are provided on both longitudinal end portions of the case respectively, whereby the motion sensor can be arranged on either end portion. Therefore, the arrangement of the motion sensor can be arbitrarily selected in response to individual circumstances such as the arrangement of the lighting fixture.

A6. The LED lamp according to any one of Items A1 to A5, wherein the sensitivity axis of the motion sensor and the illumination axis intersect with each other on a position separating from the LED source portion toward the illuminated region by a prescribed distance.

According to this structure, the LED lamp can excellently sense human entrance into the periphery of the illuminated region also when the motion sensor is arranged to avoid the center of the light-emitting area of the LED source portion.

A7. The LED lamp according to any one of Items A1 to A6, wherein the center of the sensitivity region of the motion sensor on the position separating from the LED source portion toward the illuminated region by the prescribed distance conforms to a virtual center of the sensitivity region in a case of conforming the illumination axis and the sensitivity axis of the motion sensor to each other by arranging the motion sensor at the center of the light-emitting area of the LED source portion.

According to this structure, the LED lamp can excellently sense human entrance into the periphery of the illuminated region also when the motion sensor is arranged to avoid the center of the light-emitting area of the LED source portion. In other words, a human sensing function equivalent that in a case of arranging the motion sensor at the center of the light-emitting area can be implemented.

A8. The LED lamp according to any one of Items A1 to A7, further including a connector provided on the case for detachably holding the motion sensor and electrically connected to the motion sensor.

According to this structure, the motion sensor can be attached to/detached from the connector provided on the LED lamp, whereby a human sensing function can be arbitrarily added to the LED lamp. In other words, an LED lamp designed to be applicable to a specification with no human sensing function and that with a human sensing function in common can be provided. In addition, a motion sensor having a proper structure can be selected and used in response to the type or the arrangement of the lighting fixture.

A9. The LED lamp according to Item A8, wherein the motion sensor includes a sensor body, a lead wire extending from the sensor body, and a plug fixed to an end portion of the lead wire and couplable to the connector.

According to this structure, the sensor body can be arranged on a position separating from the case of the LED lamp, whereby the sensitivity region of the motion sensor can be more freely set. When the LED lamp is applied to a recessed lighting fixture, for example, a proper sensitivity region may not be obtainable from the position of the case. More specifically, the sensitivity region may be narrowed due to the structure of the lighting fixture. In this case, an excellent sensitivity region can be obtained by arranging the sensor body on the position separating from the case.

A10. The LED lamp according to any one of Items A1 to A9, further including a sensor mounting structure mounting the motion sensor to the case so that the direction of the sensitivity axis is changeable.

According to this structure, the sensitivity region of the motion sensor can be more freely set, whereby an excellent appearance in the lighting-up state and an excellent human sensing function can be easily compatibly attained.

A11. The LED lamp according to any one of Items A1 to A10, wherein the motion sensor includes a pyroelectric infrared sensor, and the LED lamp further includes a shutter unit opening/closing an infrared incidence path to a photoreceiving surface of the pyroelectric infrared sensor.

If the shutter unit opens/closes (e.g. periodically shuts) the infrared incidence path when a human being is present in the sensitivity region of the pyroelectric infrared sensor, the pyroelectric infrared sensor outputs a signal resulting from a pyroelectric effect even if the human being stands still. When no human being is present in the sensitivity region, no significant change appears in the output of the pyroelectric infrared sensor even if the shutter unit opens/closes the infrared incidence path. Thus, a stationary human body sensing function can be provided with the pyroelectric infrared sensor at a remarkably lower cost as compared with a temperature sensor. Further, the pyroelectric infrared sensor provided on the motion sensor can also be employed for sensing a stationary human body, whereby the cost for the LED lamp can be effectively reduced.

A12. The LED lamp according to any one of Items A1 to A10, further including:

a pyroelectric infrared sensor having a predetermined sensitivity region:

a shutter unit opening/closing an infrared incidence path to a photoreceiving surface of the pyroelectric infrared sensor; and a controller which is formed to determine the presence or absence of a human being in the sensitivity region on the basis of an output signal received from the pyroelectric infrared sensor and to control the LED source portion in response to the result of the determination.

Also according to this structure, a stationary human body sensing function can be provided due to a similar principle, without employing a temperature sensor. Further, the pyroelectric infrared sensor is provided separately from the motion sensor, whereby the sensitivity regions of the pyroelectric infrared sensor and the motion sensor can be individually set. Thus, the LED lamp can more properly sense the presence or absence of a stationary human being and properly control the LED source portion in response to the result of the sensing.

B1. An LED lamp including:

a plurality of LED chips;

a control portion controlling power supplied to the plurality of LED chips; and a radio wave sensing portion sensing a radio wave transmitted from a radio wave transmission means carried by a user and outputting a sensing signal to the control portion.

According to this structure, the radio wave sensing portion senses the radio wave transmitted from the radio wave transmission means carried by the user when the user stays around the LED lamp, so that the LED lamp can recognize the presence of the user. When the user stays around the LED lamp, therefore, the LED lamp can be prevented from being turned off against the intension of the user.

B2. The LED lamp according to Item B1, wherein the control portion continues a lighting-up state if the sensing signal transmitted from the radio wave sensing portion is input therein when keeping the plurality of LED chips in the lighting-up state.

B3. The LED lamp according to Item B2, wherein the control portion continues the lighting-up state of the plurality of LED chips when radio wave strength based on the sensing signal from the radio wave sensing portion is higher than reference radio wave strength.

B4. The LED lamp according to any one of Items B1 to B3, wherein the radio wave transmission means is a portable telephone.

B5. The LED lamp according to Item B4, wherein the radio wave sensing portion senses a positional information radio wave from the portable telephone.

B6. The LED lamp according to Item B4, wherein the radio wave sensing portion senses a load completion information radio wave from the portable telephone.

B7. The LED lamp according to any one of Items B1 to B6, further including a motion sensor sensing entrance of the user into a sensing range and outputting a sensing signal to the control portion, wherein the control portion brings the plurality of LED chips into the lighting-up state if the sensing signal from the motion sensor is input therein when keeping the plurality of LED chips in a lighting-out state.

B8. The LED lamp according to Item B7, wherein the motion sensor senses infrared rays emitted by the user.

B9. The LED lamp according to Item B7 or B8, wherein the control portion has a timer circuit counting the running time of the plurality of LED chips, and brings the plurality of LED chips, kept in the lighting-up state, into a lighting-out state when the running time exceeds a prescribed level.

B10. The LED lamp according to Item B9, wherein the control portion resets the timer circuit counting the running time if the sensing signal from the motion sensor is input therein when the plurality of LED chips are in the lighting-up state.

B11. The LED lamp according to Item B9 or B10, wherein the control portion resets the timer circuit counting the running time if the sensing signal from the radio wave sensing portion is input therein when the plurality of LED chips are in the lighting-up state.

B12. The LED lamp according to any one of Items B1 to B11, further including an illuminance sensor sensing the illuminance of external light and outputting a sensing signal to the control portion, wherein the control portion is capable of selecting an all-night running mode of bringing the plurality of LED chips into an all-night running state darker than a total lighting-up state when the illuminance based on the sensing signal from the illuminance sensor is lower than predetermined reference illuminance.

B13. The LED lamp according to Item B12, further including a storage portion storing the illuminance based on the sensing signal from the illuminance sensor, wherein the reference illuminance is illuminance obtained by adding constant illuminance to illuminance at a time of bringing the plurality of LED chips into the all-night running state when receiving no external light.

B14. The LED lamp according to Item B13, wherein the control portion is capable of selecting an initial setting mode of storing the illuminance in the storage portion.

B15. The LED lamp according to Item B14, wherein the control portion inhibits new storage in the storage portion when the initial setting mode is not selected.

B16. The LED lamp according to any one of Items B13 to B15, wherein the control portion is capable of selecting a reset mode of erasing the illuminance stored in the storage portion.

C1. An LED lamp with a motion sensor, including:

a plurality of LED modules;

a control circuit connected with the plurality of LED modules; and a motion sensor connected to the control circuit and having a prescribed detection range, and entering:

a first used state where the motion sensor has a first detection range; and a second used state where the motion sensor has a second detection range including a region not included in the first detection range.

The LED lamp with a motion sensor provided according to the present invention is set on a ceiling, and employed for illuminating a room, for example. The motion sensor determines the presence or absence of a human being in the detection range by sensing infrared rays, for example, and transmits a signal to the control circuit. The control circuit turns off the plurality of LED modules when receiving a signal indicating absence of a human being in the detection range. Depending on the set position of the LED lamp with a motion sensor, a partial region of the room may be out of the detection range. The LED lamp with a motion sensor provided according to the present invention is used in the second state when the partial region of the room gets out of the first detection range in the first used state, for example, so that the problem can be solved. In the second used state, the motion sensor has the second detection range including the region not included in the first detection range. Therefore, there is a sufficient possibility that the partial region of the room having been out of the first detection range is included in the second detection range. Even if the presence or absence of a human being cannot be correctly determined in the first used state, there is a possibility that the presence or absence of a human being can be correctly determined when the LED lamp with a motion sensor is brought into the second used state. Therefore, the LED lamp with a motion sensor provided according to the present invention can more correctly determine the presence or absence of a human being as compared with a case where the detection range of the motion sensor is fixed to only one detection range.

C2. The LED lamp with a motion sensor according to Item C1, wherein the plurality of LED modules are arrayed along a first direction, the LED lamp with a motion sensor further includes a support member elongating along the first direction for supporting the plurality of LED modules, the support member includes a first connector connected to the control circuit and a second connector, separating from the first connector in the first direction, connected to the control circuit, the motion sensor is connected to the control circuit through the first connector in the first used state, and the motion sensor is connected to the control circuit through the second connector in the second used state.

C3. The LED lamp with a motion sensor according to Item C2, wherein the first detection range centers on an axis directed toward a first main detecting direction, and the motion sensor further has an additional first detection range centering on an axis directed toward a second main detecting direction inclined with respect to the first main detecting direction in the first used state.

C4. The LED lamp with a motion sensor according to Item C3, wherein the second detection range centers on an axis directed toward the first main detecting direction, and the motion sensor further has an additional second detection range centering on an axis directed toward the second main detecting direction in the second used state.

C5. The LED lamp with a motion sensor according to Item C3 or C4, wherein the motion sensor includes a sensor portion and a holding portion holding the sensor portion, and the holding portion enters a first holding state of holding the sensor portion so that the motion sensor has a detection range centering on an axis directed toward the first main detecting direction and a second holding state of holding the sensor portion so that the motion sensor has a detection range centering on an axis directed toward the second main detecting direction.

C6. The LED lamp with a motion sensor according to Item C5, wherein the motion sensor further includes a spherical member, the sensor portion is provided on the spherical member, a recess portion engaging with the spherical member is formed in the holding portion, and the spherical member is rotated in the recess portion, thereby switching the first holding state and the second holding state.

C7. The LED lamp with a motion sensor according to any one of Items C3 to C6, wherein the support member includes a first movable portion provided with the first connector and a first holding portion holding the first movable portion to be displaceable, and the first movable portion enters a first displaced state where the motion sensor connected to the first connector has a detection range centering on an axis directed toward the first main detecting direction and a second displaced state where the motion sensor connected to the first connector has a detection range centering on an axis directed toward the second main detecting direction.

C8. The LED lamp with a motion sensor according to Item C7, wherein the first movable portion is spherically formed, and a recess portion engaging with the first movable portion is formed in the first holding portion, and the first movable portion is rotated in the recess portion, thereby switching the first displaced state and the second displaced state of the first movable portion.

C9. The LED lamp with a motion sensor according to Item C7 or C8, wherein the support member includes a second movable portion provided with the second connector and a second holding portion holding the second movable portion to be displaceable, and the second movable portion enters a first displaced state where the motion sensor connected to the second connector has a detection range centering on an axis directed toward the first main detecting direction and a second displaced state where the motion sensor connected to the second connector has a detection range centering on an axis directed toward the second main detecting direction.

C10. The LED lamp with a motion sensor according to Item C9, wherein the second movable portion is spherically formed, and a recess portion engaging with the second movable portion is formed in the second holding portion, and the second movable portion is rotated in the recess portion, thereby switching the first displaced state and the second displaced state of the second movable portion.

C11. The LED lamp with a motion sensor according to any one of Items C2 to C10, further including a flexible member having a longitudinal direction, wherein the flexible member includes a first coupling portion and a second coupling portion separating from each other in the longitudinal direction, the first coupling portion is coupled to the motion sensor, and the second coupling portion is coupled to the first connector in the first used state, and coupled to the second connector in the second used state.

C12. The LED lamp with a motion sensor according to any one of Items C2 to C11, wherein the first connector and the second connector are set on positions not overlapping with the plurality of LED modules as viewed along a second direction orthogonal to the first direction.

C13. The LED lamp with a motion sensor according to Item C12, wherein the first connector is set on a first end portion of the support member in the first direction, and the second connector is set on a second end portion of the support member in the first direction.

C14. The LED lamp with a motion sensor according to any one of Items C2 to C13, further including a diffusing cover, covering the plurality of LED modules, elongating in the first direction, wherein a first opening exposing the first connector and a second opening exposing the second connector are formed in the diffusing cover.

C15. The LED lamp with a motion sensor according to Item C1, wherein the first detection range centers on an axis directed toward a first main detecting direction, and the second detection range centers on an axis directed toward a second main detecting direction inclined with respect to the first main detecting direction.

C16. The LED lamp with a motion sensor according to Item C15, further including a support member supporting the plurality of LED modules, wherein the support member includes a connector connected to the control circuit, and the motion sensor is connected to the control circuit through the connector.

C17. The LED lamp with a motion sensor according to Item C16, wherein the motion sensor has a sensor portion and a holding portion holding the sensor portion, and the holding portion holds the sensor portion so that the motion sensor has the first detecting range in the first used state, and holds the sensor portion so that the motion sensor has the second detection range in the second used state.

C18. The LED lamp with a motion sensor according to Item C17, wherein the motion sensor further includes a spherical member, the sensor portion is provided on the spherical member, a recess portion engaging with the spherical member is formed in the holding portion, and the spherical member is rotated in the recess portion, thereby switching the first used state and the second used state.

C19. The LED lamp with a motion sensor according to any one of Items C16 to C18, wherein the support member has a movable portion provided with the connector and a holding portion holding the movable portion to be displaceable, and the movable portion enters a first displaced state where the motion sensor connected to the connector has the first detection range and a second displaced state where the motion sensor connected to the connector has the second detection range.

C20. The LED lamp with a motion sensor according to Item C19, wherein the movable portion is spherically formed, and a recess portion engaging with the movable portion is formed in the holding portion, and the movable portion is rotated in the recess portion, thereby switching the first displaced state and the second displaced state of the movable portion.

C21. The LED lamp with a motion sensor according to any one of Items C16 to C20, further including a flexible member having a longitudinal direction, wherein the flexible member includes a first coupling portion and a second coupling portion separating from each other in the longitudinal direction, the first coupling portion is coupled to the motion sensor, and the second coupling portion is coupled to the connector.

C22. The LED lamp with a motion sensor according to Item C1, further including:

a support member supporting the plurality of LED modules and including a connector connected to the control circuit; and a flexible member having a longitudinal direction, wherein the flexible member includes a first coupling portion and a second coupling portion separating from each other in the longitudinal direction, the first coupling portion is coupled to the motion sensor, the second coupling portion is coupled to the connector, and the flexible member is deformed, thereby switching the first used state and the second used state.

C23. The LED lamp with a motion sensor according to any one of Items C16 to C22, further including a diffusing cover covering the plurality of LED modules, wherein an opening exposing the connector is formed in the diffusing cover.

C24. The LED lamp with a motion sensor according to any one of Items C16 to C23, wherein the plurality of LED modules are at least partially set on a set surface including a first direction, and the connector is arranged on a position not overlapping with the plurality of LED modules as viewed along a direction perpendicular to the set surface.

According to the present invention, an LED lamp having a function capable of sensing human entrance into the periphery of an illuminated region and exhibiting an excellent appearance in a lighting-up state can be provided.

The present invention also relates to an LED lamp storing a plurality of LED chips and switching a lighting-up state and a lighting-out state in response to the presence or absence of a user.

Figure 38:
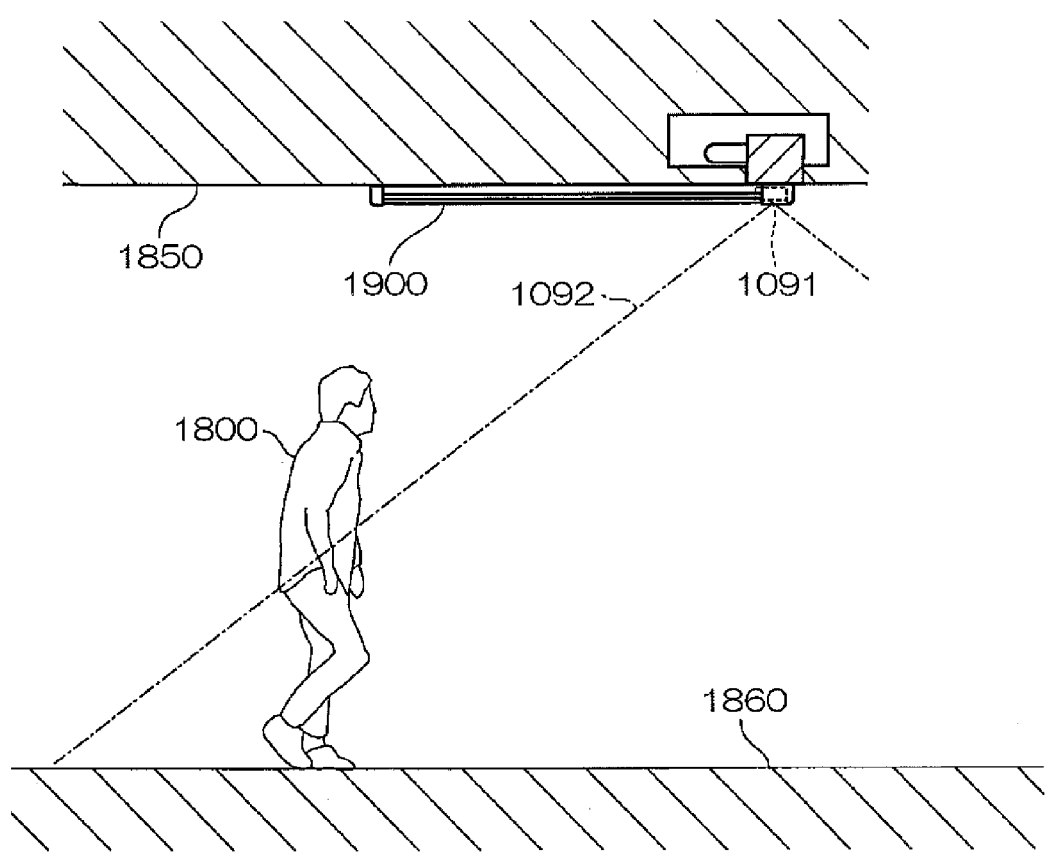
FIG. 38 is a schematic side elevational view showing a used state of an example of a conventional LED lamp.

FIG. 38 shows an example of a conventional LED lamp (refer to Japanese Unexamined Patent Publication No. 2009-16093, for example). An LED lamp 1900 shown in FIG. 38 stores a plurality of LED chips (not shown) as a light source, and is mounted on a ceiling 1850. The LED lamp 1900 includes a motion sensor 1091. The motion sensor 1091 is an infrared sensor generating electromotive force by receiving infrared rays, for example, and outputs a sensing signal when a user 1800 walking on a floor 1860 enters a detection range 1092. The LED lamp 1900 turns on the plurality of LED chips on the basis of the sensing signal received from the motion sensor 1091.

The motion sensor 1091 utilizing the electromotive force generated by receiving infrared rays is capable of sensing entrance of the user 1800 into the sensing range 1092, while the same is incapable of sensing continuous presence of the user 1800 in the sensing range 1092 in principle. Therefore, the LED lamp 1900 turns off the plurality of LED chips after a lapse of a constant time from the output of the sensing signal from the motion sensor 1091. If the user 1800 is still present in a range illuminated with the LED lamp 1900 at this time, it follows that he/she is unintentionally brought into a dark environment.

The present invention has been proposed under the aforementioned circumstances, and can provide an LED lamp inhibited from being turned off against the intention of a user.

The present invention also relates to an LED lamp with a motion sensor storing a plurality of LED chips and employed for indoor illumination, for example.

Figure 62:
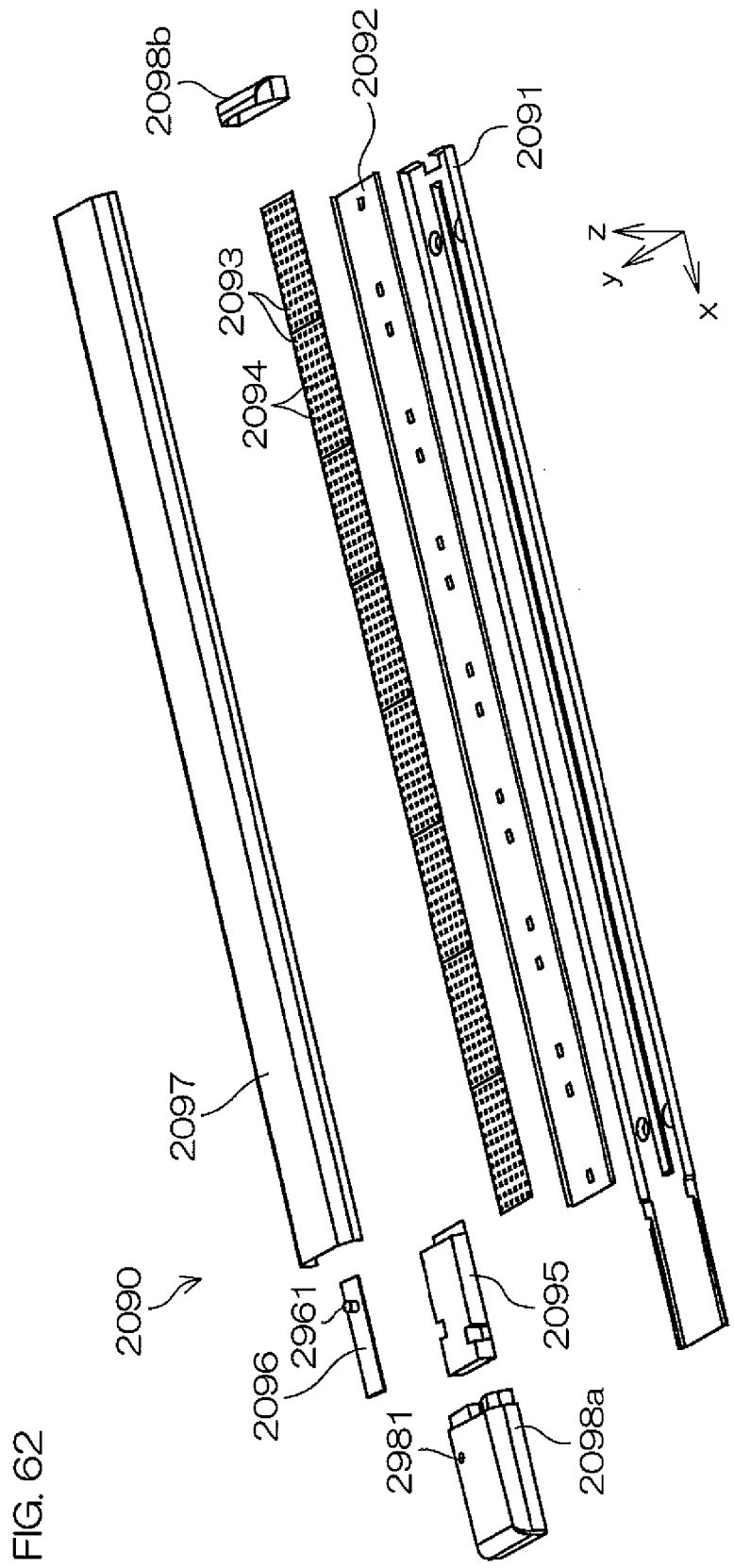
FIG. 62 is an exploded perspective view of a conventional LED lamp with a motion sensor.

FIG. 62 shows an example of a conventional LED lamp with a motion sensor (refer to Japanese Unexamined Patent Publication No. 2009-16093, for example). An LED lamp 2090 with a motion sensor shown in FIG. 62 includes a frame 2091, a radiator plate 2092, a plurality of substrates 2093, a plurality of LED modules 2094 set on each substrate 2093, an electrical circuit component 2095, a motion sensor 2096, a diffusing cover 2097, and end caps 2098*a* and 2098*b*.

As shown in FIG. 62, the LED lamp 2090 with a motion sensor is formed to elongate in a direction x. Directions y and z shown in FIG. 62 are orthogonal to the direction x. The radiator plate 2092 is made of aluminum, for example, and arranged to be held between the plurality of substrates 2093 and the frame 2091 in the direction z. The plurality of substrates 2093 are arrayed along the direction x, and mounted on the frame 2091 with screws, for example. The plurality of LED modules 2094 are arranged on each substrate 2093 at prescribed intervals from one another. Heat generated by the LED modules 2094 in a lighting-up state is transmitted to the radiator plate 2092. The electrical circuit component 2095 includes a control circuit rectifying external alternating current to direct current and supplying constant current to the plurality of LED modules 2094. The electrical circuit component 2095 is set on a first end portion of the frame 2091 in the direction x. The motion sensor 2096 includes a generally cylindrical sensor portion 2961 receiving infrared rays. The motion sensor 2096 is fixed to the electrical circuit component 2095. The diffusing cover 2097 is made of white resin, and formed to elongate in the direction x with a U-shaped section, for example. The diffusing cover 2097 is mounted on the frame 2091 to cover the plurality of LED modules 2094. The end cap 2098*a* is inserted into first end portions of the frame 2091 and the diffusing cover 2097 in the direction x, and the end cap 2098*b* is inserted into second end portions. An opening 2981 for exposing the sensor portion 2961 of the motion sensor 2096 is formed in the end cap 2098*a*.

Such an LED lamp 2090 with a motion sensor is mounted on a ceiling so that the diffusing cover 2097 is directed toward a floor face and connected to a commercial power source as the substitution of a straight fluorescent lamp, for example. When power is supplied, direct current rectified by the electrical circuit component 2095 is supplied to the plurality of LED modules 2094, to turn on the plurality of LED modules 2094. The motion sensor 2096 has a detection range centering on an axis directed toward a direction from the ceiling to the floor, for example. The motion sensor 2096 detects the body temperature of a human being present in the detection range, thereby determining the presence or absence of the human being in the detection range. When determining that no human being is present in the detection range, the motion sensor 2096 transmits a signal indicating absence of a human being to the control circuit provided in the electrical circuit component 2095. When receiving the signal, the control circuit stops supplying the current to the plurality of LED modules 2094. Therefore, the LED lamp 2090 with a motion sensor is naturally turned off when no human being is present in the room even if a user forgets to turn off the same, to contribute to reduction of power consumption.

FIG. 63 shows a state where the LED lamp 2090 with a motion sensor is set on a region of a ceiling W1 close to a wall W2. In order to bring the LED lamp 2090 with a motion sensor into a usable state, the electrical circuit component 2095 must be connected to the commercial power source. Therefore, a power supply device 2099 connected to the commercial power source is set on the ceiling W1. The LED lamp 2090 with a motion sensor is fixed to the ceiling W1, so that the electrical circuit component 2095 is connected to the power supply device 2099.

As to the mode of application of the LED lamp 2090 with a motion sensor, such a case is assumed that the same is used as the substitution of an existing fluorescent lamp. In this case, the power supply device 2099 for supplying power to the fluorescent lamp is already set on the ceiling W1. The electrical circuit component 2095 must be connected to the existing power supply device 2099, and hence the LED lamp 2090 with a motion sensor cannot be fixed to an arbitrary position of the ceiling W1 in an arbitrary direction, but it follows that the same is fixable to only a specific position in a specific direction. When the power supply device 2099 is set on a position relatively close to the wall W2 as shown in FIG. 63, the following problem may arise.

As described above, the motion sensor 2096 of the LED lamp 2090 with a motion sensor is fixed to the electrical circuit component 2095. When the power supply device 2099 is set on the position relatively close to the wall W2, therefore, the LED lamp 2090 with a motion sensor is fixed to the ceiling W1 in such a direction that the electrical circuit component 2095 is arranged close to the wall W2. The motion sensor 2096 is fixed to the electrical circuit component 2095 as described above, and it follows that the motion sensor 2096 is also arranged close to the wall W2. At this time, it follows that only part of a range originally detectable by the motion sensor 2096 is effectively put to practical use in a detection range Cx of the motion sensor 2096, due to the presence of the wall W2. When the range originally detectable by the motion sensor 2096 is similar to the magnitude of a room where the LED lamp 2090 with a motion sensor is assumed to be set, it follows that the detection range Cx limited by the wall W2 is smaller than the magnitude of the room. When a human being is present in the vicinity of a wall of the room opposite to the wall W2 in this case, for example, there is a possibility that the motion sensor 2096 cannot detect him/her but outputs a signal indicating absence of a human being to the control circuit to turn off the LED lamp 2090 with a motion sensor. The LED lamp 2090 with a motion sensor cannot be set in a room where the power supply device 2099 is provided on a position close to a wall, or an operation must be performed in order to change the position of the power supply device 2099, due to the aforementioned problem.

The present invention has been thought out under the aforementioned circumstances, and can provide an LED lamp with a motion sensor capable of more correctly determining the presence or absence of a human being.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

This application corresponds to Japanese Patent Application No. 2011-96345 filed with the Japan Patent Office on Apr. 22, 2011, Japanese Patent Application No. 2011-99779 filed with the Japan Patent Office on Apr. 27, 2011, Japanese Patent Application No. 2011-132339 filed with the Japan Patent Office on Jun. 14, 2011, Japanese Patent Application No. 2011-144585 filed with the Japan Patent Office on Jun. 29, 2011, Japanese Patent Application No. 2011-144714 filed with the Japan Patent Office on Jun. 29, 2011, and Japanese Patent Application No. 2012-87644 filed with the Japan Patent Office on Apr. 6, 2012, the disclosures of which are incorporated herein by reference.

What is claimed is:

1. An LED lamp mounted on a lighting fixture, comprising:
an LED source portion including a plurality of LED chips;
an illuminance sensor detecting ambient illuminance; and
a controller controlling the LED source portion in response to the illuminance of ambient light other than light emitted by the LED source portion on the basis of an output signal received from the illuminance sensor when the LED source portion is in a lighting-up state, wherein
the controller includes:
a spontaneous light illuminance calculating means calculating spontaneous light illuminance contributed to the output signal of the illuminance sensor by the light emitted by the LED source portion on the basis of a driven state of the LED source portion; and
an on-off control means turning on the LED source portion when ambient light illuminance obtained by subtracting the spontaneous light illuminance from the output signal of the illuminance sensor is less than or equal to a prescribed threshold and turning off the LED source portion when the ambient light illuminance is in excess of the threshold.

2. The LED lamp according to claim 1, wherein the illuminance sensor is arranged to detect the light emitted by the LED source portion and the ambient light.

3. The LED lamp according to claim 1, wherein
the controller further includes an illuminance-adaptive driving means driving the LED source portion with power responsive to the ambient light illuminance when the ambient light illuminance is less than or equal to the threshold.

4. The LED lamp according to claim 1, further including a noncontact temperature sensor detecting the temperature of an object present in a predetermined temperature-sensing area in a noncontact manner, wherein
the controller is formed to control the LED source portion in response to the temperature detected by the noncontact temperature sensor.

5. An LED lamp mounted on a lighting fixture, comprising:
an LED source portion including a plurality of LED chips;
an illuminance sensor detecting ambient illuminance; and
a controller controlling the LED source portion in response to the illuminance of ambient light other than light emitted by the LED source portion on the basis of an output signal received from the illuminance sensor when the LED source portion is in a lighting-up state, wherein
the controller includes:
a storage means storing the output signal received from the illuminance sensor;
a comparison means comparing the output signal of the illuminance sensor and the value stored in the storage means with each other; and
an on-off control means turning on/off the LED source portion in response to the result of the comparison of the comparison means.

6. The LED lamp according to claim 5, wherein
the storage means is formed to store the output signal received from the illuminance sensor when the LED source portion is in a predetermined lighting-up state.

7. The LED lamp according to claim 5, further including a writing instruction means operated by an operator for writing the output signal of the illuminance sensor in the storage means, wherein
the controller further includes a writing means writing the output signal of the illuminance sensor in the storage means in response to an operation of the writing instruction means.

8. The LED lamp according to claim 7, wherein
the writing instruction means includes a lighting-up instruction means for turning on the LED source portion in a predetermined state, and
the controller further includes a writing control means inhibiting the writing means from writing the output signal when the output signal of the illuminance sensor has already been written in the storage means and allowing the writing means to write the output signal when the output signal of the illuminance sensor is not yet written in the storage means.

9. The LED lamp according to claim 8, further including an inhibition canceling operation means operated by the operator for canceling inhibition of the writing operation by the writing means, wherein
the writing control means is formed to allow the writing means to write the output signal in the storage means once in response to the operation of the inhibition canceling operation means.

10. The LED lamp according to claim 5, wherein
the comparison means includes a means determining whether or not the ambient light illuminance obtained by subtracting the value stored in the storage means from the output signal of the illuminance sensor is less than or equal to the prescribed threshold, and
the on-off control means is formed to turn on the LED source portion when the ambient light illuminance is less than or equal to the threshold and to turn off the LED source portion when the ambient light illuminance is in excess of the threshold.

11. The LED lamp according to claim 5, further including a noncontact temperature sensor detecting the temperature of an object present in a predetermined temperature-sensing area in a noncontact manner, wherein
the controller is formed to control the LED source portion in response to the temperature detected by the noncontact temperature sensor.

12. An LED lamp mounted on a lighting fixture, comprising:
an LED source portion including a plurality of LED chips;
an illuminance sensor detecting ambient illuminance; and
a controller controlling the LED source portion in response to the illuminance of ambient light other than light emitted by the LED source portion on the basis of an output signal received from the illuminance sensor when the LED source portion is in a lighting-up state, wherein the controller includes a PWM control means PWM-controlling the LED source portion, and a sampling means sampling the output signal of the illuminance sensor as ambient light illuminance in an OFF-period when power supply to the LED source portion is stopped in a PWM cycle when the PWM control means PWM-controls the LED source portion, and is formed to control the LED source portion in response to the ambient light illuminance sampled by the sampling means.

13. The LED lamp according to claim 12, wherein
the controller further includes a duty ratio setting means setting a duty ratio in the PWM control on the basis of the ambient light illuminance sampled by the sampling means.

14. The LED lamp according to claim 12, further including a noncontact temperature sensor detecting the temperature of an object present in a predetermined temperature-sensing area in a noncontact manner, wherein
the controller is formed to control the LED source portion in response to the temperature detected by the noncontact temperature sensor.

15. An LED lamp mounted on a lighting fixture, comprising:
an LED source portion including a plurality of LED chips;
an illuminance sensor detecting ambient illuminance;
a controller controlling the LED source portion in response to the illuminance of ambient light other than light emitted by the LED source portion on the basis of an output signal received from the illuminance sensor when the LED source portion is in a lighting-up state; and
a motion sensor having a predetermined sensitivity region, wherein
the controller is formed to control the LED source portion in response to an output signal received from the motion sensor, wherein
the motion sensor includes a pyroelectric infrared sensor, and
the LED lamp further includes a shutter unit opening/closing an infrared incidence path to a photoreceiving surface of the pyroelectric infrared sensor.

16. The LED lamp according to claim 15, wherein
the controller is formed to increase driving power for the LED source portion in response to detection of a human being by the motion sensor.

17. The LED lamp according to claim 15, further including a noncontact temperature sensor detecting the temperature of an object present in a predetermined temperature-sensing area in a noncontact manner, wherein
the controller is formed to control the LED source portion in response to the temperature detected by the noncontact temperature sensor.

18. An LED lamp mounted on a lighting fixture, comprising:
an LED source portion including a plurality of LED chips;
an illuminance sensor detecting ambient illuminance;
a controller controlling the LED source portion in response to the illuminance of ambient light other than light emitted by the LED source portion on the basis of an output signal received from the illuminance sensor when the LED source portion is in a lighting-up state;
a pyroelectric infrared sensor having a predetermined sensitivity region; and
a shutter unit opening/closing an infrared incidence path to a photoreceiving surface of the pyroelectric infrared sensor, wherein
the controller is formed to determine the presence or absence of a human being in the sensitivity region on the basis of an output signal received from the pyroelectric infrared sensor and to control the LED source portion in response to the result of the determination.

19. The LED lamp according to claim 18, further including a noncontact temperature sensor detecting the temperature of an object present in a predetermined temperature-sensing area in a noncontact manner, wherein
the controller is formed to control the LED source portion in response to the temperature detected by the noncontact temperature sensor.

* * * * *